(12) United States Patent
Crosby

(10) Patent No.: US 11,969,391 B2
(45) Date of Patent: Apr. 30, 2024

(54) ROBOTIC SIGHTED GUIDING SYSTEM

(71) Applicant: Smart Guider, Inc., San Diego, CA (US)

(72) Inventor: Kelvin William Crosby, San Diego, CA (US)

(73) Assignee: Smart Guider, Inc., San Diego, CA (US)

( * ) Notice: Subject to any disclaimer, the term of this patent is extended or adjusted under 35 U.S.C. 154(b) by 878 days.

(21) Appl. No.: 16/963,241

(22) PCT Filed: Feb. 12, 2019

(86) PCT No.: PCT/US2019/017671
§ 371 (c)(1),
(2) Date: Jul. 19, 2020

(87) PCT Pub. No.: WO2019/157511
PCT Pub. Date: Aug. 15, 2019

(65) Prior Publication Data
US 2021/0154086 A1 May 27, 2021

Related U.S. Application Data

(60) Provisional application No. 62/629,407, filed on Feb. 12, 2018.

(51) Int. Cl.
 *A61H 3/06* (2006.01)
 *A61H 3/04* (2006.01)
(52) U.S. Cl.
 CPC .............. *A61H 3/061* (2013.01); *A61H 3/04* (2013.01); *A61H 2003/065* (2013.01);
(Continued)

(58) Field of Classification Search
CPC ...................................................... A61H 3/061
See application file for complete search history.

(56) References Cited

U.S. PATENT DOCUMENTS

| | | | | |
|---|---|---|---|---|
| 1,494,508 A | * | 5/1924 | Smith | A61H 3/066 135/85 |
| 3,158,851 A | * | 11/1964 | Ruthven | A61H 3/068 340/407.1 |

(Continued)

FOREIGN PATENT DOCUMENTS

JP 2010213670 9/2010

OTHER PUBLICATIONS

International Search report, PCT/US19/017671 Filing date Feb. 12, 2019, US as search authority.

*Primary Examiner* — Noah Chandler Hawk

(57) ABSTRACT

Devices and methods for assisting and guiding a person with visual and/or hearing impairment. In various embodiments there is a computer-guided, motorized walking stick. Preferably, at least one wheel at the distal end of the stick, and in contact with the ground, can be steered or pivoted over a range of angles, and thus establish a desired direction. In yet other embodiments there are one or more powered wheels that further drive the walking stick in the desired direction. Various algorithms are disclosed for providing instructions to the computer controller by way of various input devices. Still further embodiments include various types of sensors that provide data to the computer with regards to objects proximate to the walking stick.

17 Claims, 76 Drawing Sheets

(52) U.S. Cl.
CPC ............ *A61H 2201/0153* (2013.01); *A61H 2201/0165* (2013.01); *A61H 2201/0184* (2013.01); *A61H 2201/5007* (2013.01); *A61H 2201/503* (2013.01); *A61H 2201/5048* (2013.01); *A61H 2201/5092* (2013.01)

(56) References Cited

U.S. PATENT DOCUMENTS

| | | | | |
|---|---|---|---|---|
| 3,251,371 | A * | 5/1966 | Croker | A61H 3/068 |
| | | | | 280/47.32 |
| 5,097,856 | A * | 3/1992 | Chi-Sheng | G01S 7/4813 |
| | | | | 704/271 |
| 5,687,136 | A | 11/1997 | Borenstein | |
| 7,706,212 | B1 * | 4/2010 | Campbell | G01S 15/04 |
| | | | | 367/116 |
| 9,062,986 | B1 | 6/2015 | Ellis | |
| 9,646,514 | B2 * | 5/2017 | Rizzo | A61H 3/04 |
| 10,098,807 | B1 * | 10/2018 | Terrell | A45B 3/00 |
| 2004/0173985 | A1 | 9/2004 | Bruhl | |
| 2005/0236208 | A1 | 10/2005 | Runkles | |
| 2008/0251110 | A1 * | 10/2008 | Pede | A61H 3/068 |
| | | | | 701/532 |
| 2013/0041507 | A1 * | 2/2013 | Ota | A61H 3/04 |
| | | | | 901/46 |
| 2013/0332018 | A1 | 12/2013 | Kim | |
| 2014/0168061 | A1 | 6/2014 | Hyundai | |
| 2014/0299168 | A1 | 10/2014 | Crowhurst | |
| 2015/0294597 | A1 | 10/2015 | Nyu | |
| 2018/0041746 | A1 | 2/2018 | Google | |

\* cited by examiner

| | | |
|---|---|---|
| | Trunk | 22, 1.1 |
| | Motor Wheel | 46, 50, 1.2 |
| | Sensor / Camera / Laser / Lidar / Radar / Ultrasonic | 38, 1.3 |
| | Steering Motor | 48, 2.0 |
| | Motor Controller | 54, 2.1 |
| | Computer 1 | 56, 2.2 |
| | Battery | 2.3 |
| | Throttle/On and off switch | 26, 1.4 |
| | Handle | 24, 1.5 |
| | Motor computer | 56, 2.5 |
| | End Cap | 1.6 |

FIG. 15

| Part Name | Picture | Notes |
|---|---|---|
| Servo Mount 44c | 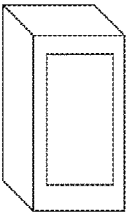 | Connects to End Cap of the Smart Guider Cane |
| Servo 48 | 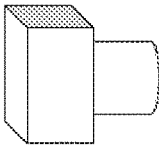 | Nests inside the Servo Mount with the bottom cylindrical feature sticking out. |
| Wheel Hydraulics Springs Mounts 44a | 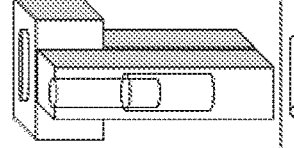 | The bottom cylindrical feature sticks out from the Servo Mount and fastens and connects to the top of the Wheel Mount. The Hydraulics springs are inside the side wheel Mount allowing for the wheel to jump |
| In-Hub Brushless DC Motor Wheel 50 | 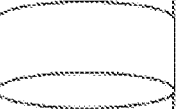 | The Wheel Mount connects to the In-Hub Brushless DC Motor Wheel with an axle. |

FIG. 20

| Part Name | Pictorial Representation | Note |
|---|---|---|
| Wheel mount | | Connects to End Cap of the Smart Guider Cane. |
| In-Hub Brushless DC Motor Wheel (with Servos attached) | | The Wheel Mount connects to the In-Hub Brushless DC Motor Wheel with the axle feature. Servos are built into the wheels to allow turning. |

3 wheels - Servo Attached

- The 3-wheel assembly is comprised of the following components:
  - Wheel Mount
  - Front Wheel Mount
  - Front In-Hub Brushless DC Motor Wheel
  - Rear In-Hub Brushless DC Motor Wheels (2)
- The Front Wheel Mount is attached to the In-Hub Brushless DC Motor wheel which has a brushless motor inside and two servos, each one of which is attached to each side of the In-Hub Brushless DC Motor wheel. The built-in servos allow the wheel to turn.
- The Front Wheel Mount is inserted inside the larger Wheel Mount, which is attached to two In-Hub Brushless DC Motor wheels, each of which has a brushless motor inside and one servo. The built-in servo allows each of the wheel to turn.

FIG. 37

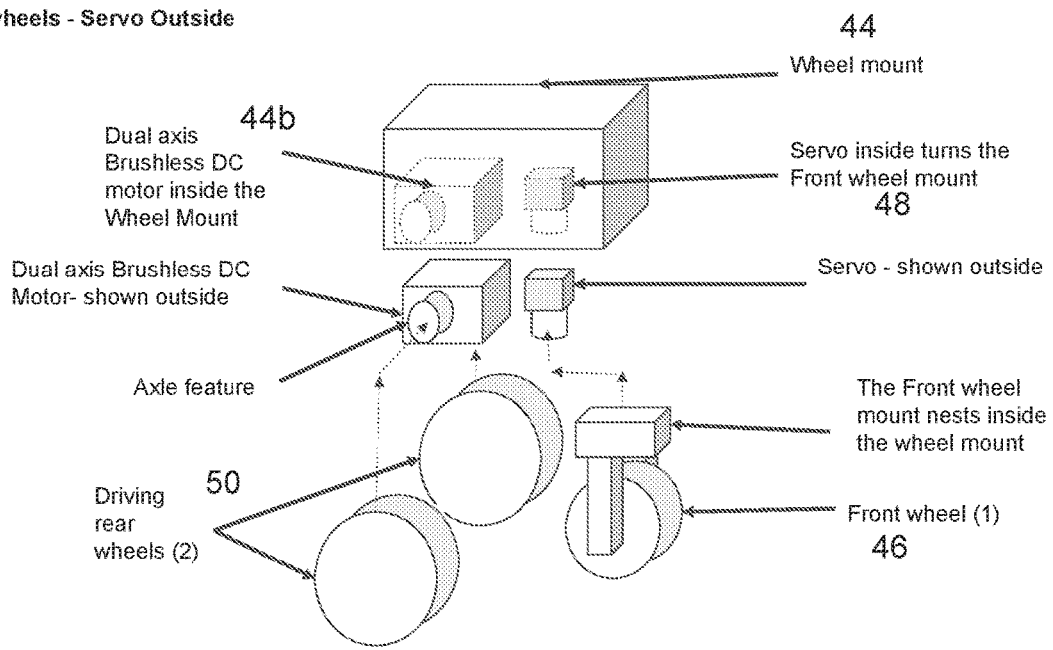

FIG. 38

| Part Name | Pictorial Representation | Note |
|---|---|---|
| Wheel Mount | | The End Cap fastens and connects to the top of the Wheel Mount. |
| In-Hub Brushless DC Motor Wheels (4) | | The Four Servos connect to the the Front Wheels with their axle feature. |

4 wheels

- The 4-wheel assembly would be comprised of the following components:
  - Wheel Mount
  - In-Hub Brushless DC Motor Wheel (4)
- The each one of the four In-Hub Brushless DC Motor Wheel has a built-in Brushless DC Motor, axle feature and a built-in servo that allows the wheels to turn.

FIG. 41

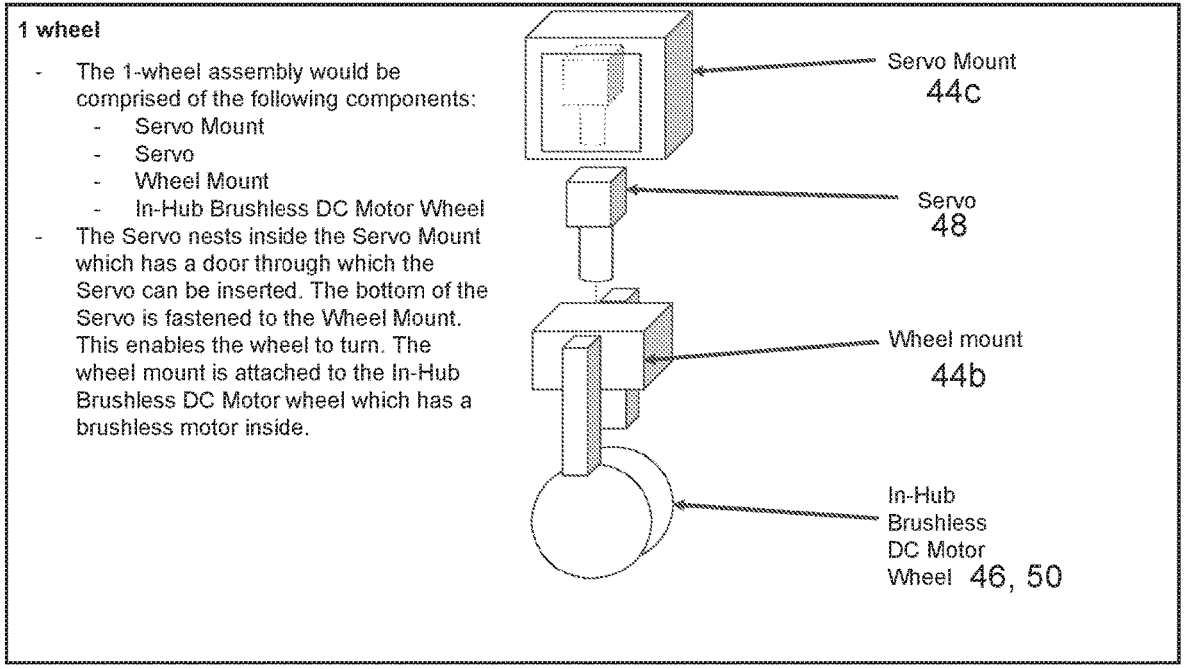

FIG. 42

| Component names, and Pictures (1-Wheel) | Part Name | Pictorial Representation | Note |
|---|---|---|---|
| | Servo Mount | | Connects to End Cap of the Smart Guider Cane |
| | Servo | | Nests inside the Servo Mount with the bottom cylindrical feature sticking out. |
| | Wheel mount | | The bottom cylindrical feature sticks out from the Servo Mount and fastens and connects to the top of the Wheel Mount. |
| | In-Hub Brushless DC Motor Wheel | | The Wheel Mount connects to the In-Hub Brushless DC Motor Wheel with an axle. |

FIG. 43

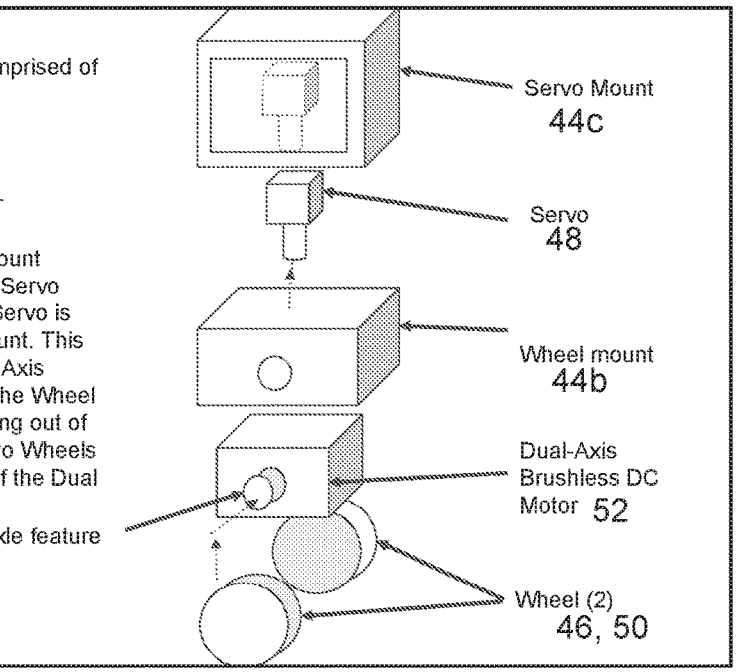

2 wheels
- The 2-wheel assembly would be comprised of the following components:
  - Servo Mount
  - Servo
  - Wheel Mount
  - Dual-Axis Brushless DC Motor
  - Wheels (2)
- The Servo nests inside the Servo Mount which has a door through which the Servo can be inserted. The bottom of the Servo is fastened to the top of the Wheel Mount. This enables the wheel to turn. The Dual Axis Brushless DC Motor mounts inside the Wheel Mount and has its axle feature sticking out of the hole of the Wheel Mount. The two Wheels will be attached to the axle feature of the Dual Axis Brushless DC Motor.

Axle feature

Servo Mount 44c
Servo 48
Wheel mount 44b
Dual-Axis Brushless DC Motor 52
Wheel (2) 46, 50

FIG. 44

| Component names, and Pictures (2-Wheel) | Part Name | Pictorial Representation | Note |
|---|---|---|---|
| | Servo Mount | | Connects to End Cap of the Smart Guider Cane |
| | Servo | | Nests inside the Servo Mount with the bottom cylindrical feature sticking out. |
| | Wheel mount | | The bottom cylindrical feature sticks out from the Servo Mount and fastens and connects to the top of the Wheel Mount. |
| | Dual-Axis Brushless DC Motor | | Mounts inside the wheel mount. Axle feature connects to the two Wheels. |
| | Wheel (2) | | Axle feature connects to the two Wheels. |

FIG. 45

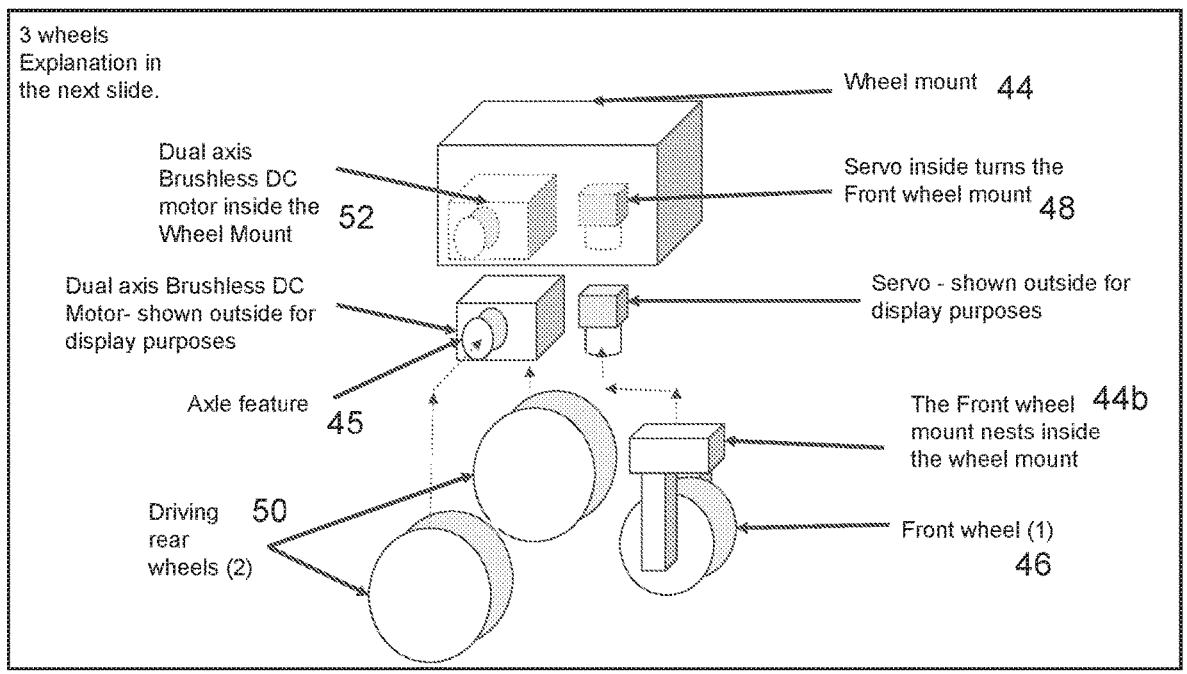

FIG. 46

3 wheels
- The 3-wheel assembly would be comprised of the following components:
  - Servo Mount
  - Servo
  - Front Wheel Mount
  - Front Wheel
  - Dual-Axis Brushless DC Motor
  - Driving Rear Wheels (2)
- The Servo nests inside the Servo Mount which has a door at the Servo Mount's back end through which the Servo can be inserted. The bottom cylindrical feature of the Servo is fastened to the Front Wheel Mount. This enables the Front Wheel to turn. The wheel mount is attached to the Front Wheel. The Dual Axis Brushless DC Motor mounts inside the back end of the Wheel Mount and its axle features stick out of the back two holes of the Wheel Mount. The two Driving Rear Wheels will be attached to the axle features of the Dual Axis Brushless DC Motor.

FIG. 47

| Part Name | Pictorial Representation | Note |
|---|---|---|
| Servo Mount | 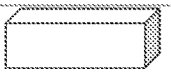 | Connects to End Cap of the Smart Guider Cane |
| Servo |  | Nests inside the front end of the Servo Mount with the bottom cylindrical feature sticking out. |
| Wheel mount | 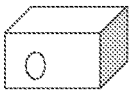 | The bottom cylindrical feature sticks out from the Servo Mount and fastens and connects to the top of the Wheel Mount. |
| Dual-Axis Brushless DC Motor |  | Mounts inside the wheel mount. Axle feature connects to the two Driving Rear Wheels. |
| Driving Rear Wheels (2) |  | Axle feature connects to the two Wheels. |
| Front Wheel Mount |  | The bottom cylindrical feature sticks out from the Servo Mount and fastens and connects to the top of the Front Wheel Mount. |
| Front Wheels |  | The Front Wheel Mount connects to the Front Wheel with an axle. |

FIG. 48

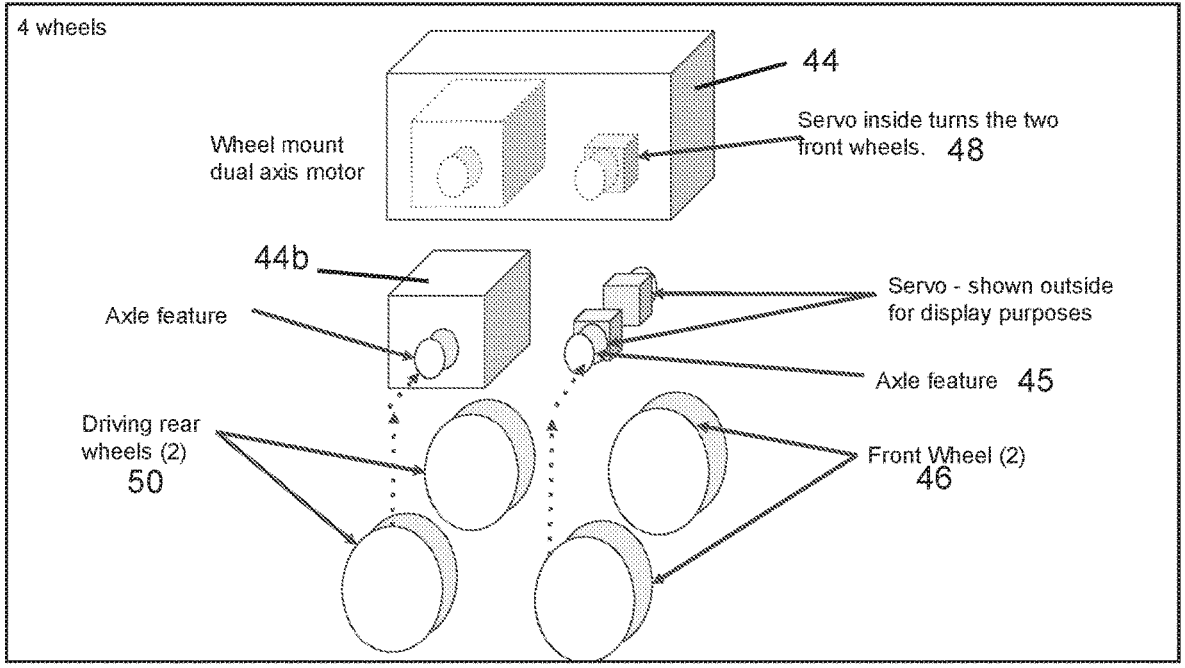

FIG. 49

4 wheels
- The 4-wheel assembly would be comprised of the following components:
  - Wheel Mount
  - Servo (2)
  - Dual-Axis Brushless DC Motor
  - Front Wheel (2)
  - Driving Rear Wheels (2)
- The two front Servos nests inside the Wheel Mount which allows the two Front Wheels to turn the Smart Guider. The Dual-Axis Brushless DC Motor mounts inside the back end of the Wheel Mount and its axle features stick out of the back two holes of the Wheel Mount. The two Driving Rear Wheels will be attached to the axle features of the Dual Axis Brushless DC Motor.

FIG. 50

| Component names, and Pictures (4-Wheel) | Part Name | Pictorial Representation | Note |
|---|---|---|---|
| | Wheel Mount | | The End Cap fastens and connects to the top of the Wheel Mount. |
| | Servo (2) | | Nests inside the front end of the Wheel Mount with the axle feature sticking out. |
| | Dual Axis Brushless DC Motor | | Mounts inside the Wheel Mount. Axle feature connects to the two Driving Rear Wheels. |
| | Driving Rear Wheels (2) | | Axle feature connects to the two Driving Rear Wheels. |
| | Front Wheels (2) | | The two Front Servos connect to the the Front Wheels with their axle feature. |

FIG. 51

Wheel 1
In-hub motor sits inside the wheel. The in-hub motor connects to the electronics housing inside the Smart Guider through a wire. The servo that helps turn the wheel mount to any direction sits on top of the mount.

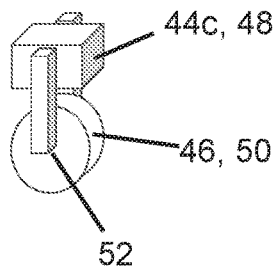

Wheel 2

In-housing dual-axis motor drives both wheels. The motor connects to the electronics housing inside the Smart Guider through a wire. The servo that helps turn the wheel mount to any direction sits on top of the mount.

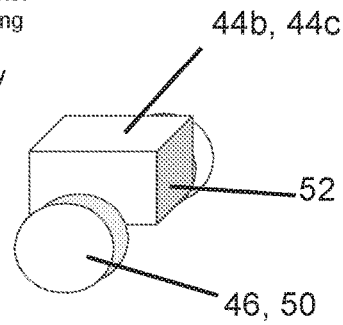

FIG. 53

Wheel 3

Like the two wheel configuration, the three wheel mount has a dual axis motor for its two rear wheels, which drives the Smart Guider Cane. The front lone wheel has treads that assist in climbing ledges. The front wheel have servos inside the wheel mount that allows them and the Smart Guider to turn.

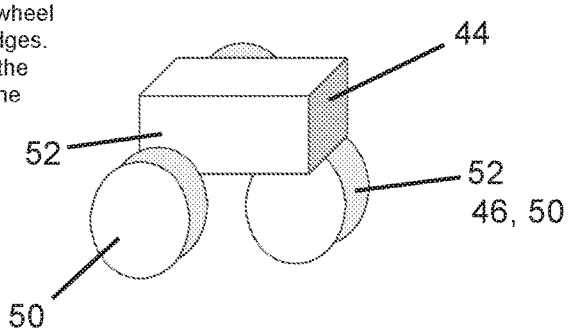

FIG. 54

Wheel 4

Like the two wheel configuration, the three wheel mount has a dual axis motor for its two rear wheels, which drives the Smart Guider Cane. The front two wheels has treads that assist in climbing ledges. The front two wheels have servos inside the wheel mount that allows them and the Smart Guider to turn

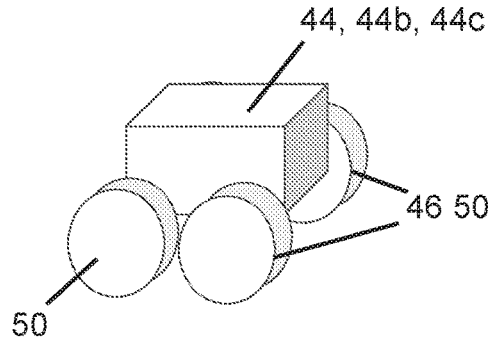

1 wheel

Servo Mount  44c
- Servo nests inside the servo mount

Servo  48

Wheel mount  44b

In-Hub Motor Wheel  46, 50, 52

FIG. 56

Speaking commands
- Left (Top View Only)
  - User say "Left"
  - Smart Guider picks up Command
  - Smart Guider turns wheel mount and wheel(s) to the left and then accelerates, pulling the user
  - Smart guider will stop after a covering a certain amount of distance.

Top View

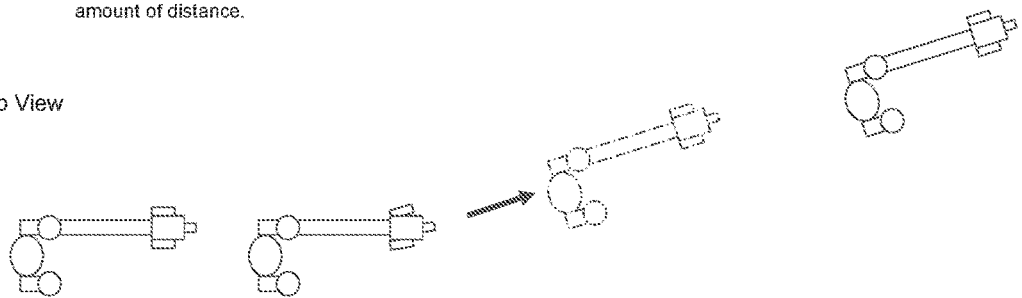

FIG. 65

Speaking commands
- Say Location
  - User say name of Location preceded by the word "Find."
  - Smart Guider picks up Command
  - Smart Guider calculates the route to said Location
  - Smart guider will stop after stopping in front of intended location.

Top View

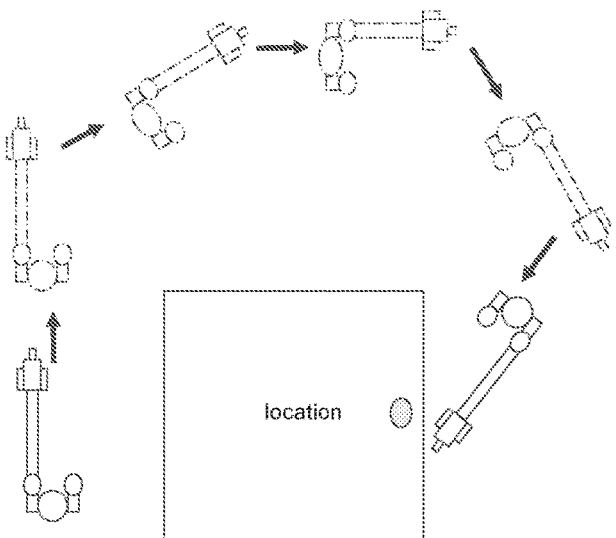

FIG. 66

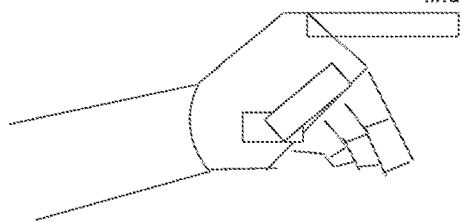
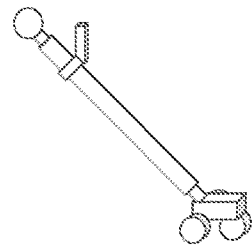
FIG. 77
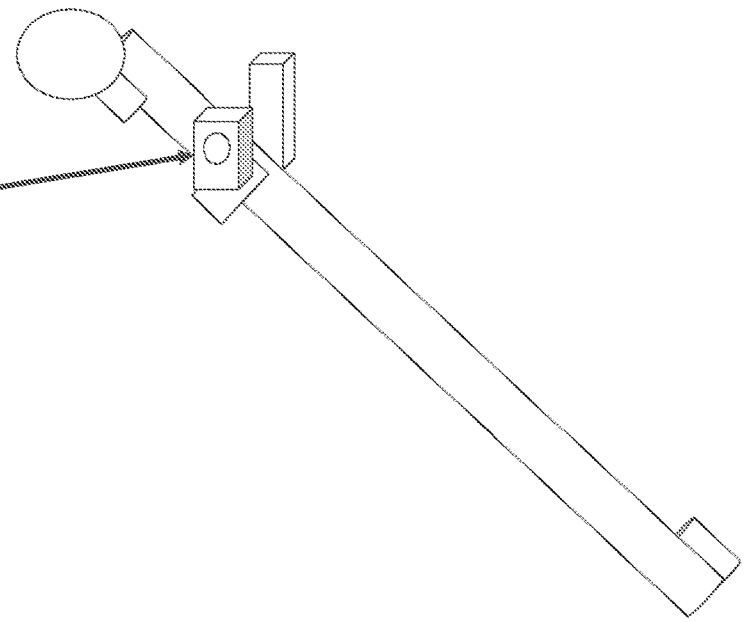
FIG. 78

- Two Wheel
- Cylinder Body
- LIDAR
- Ball Handle

ROBOTIC SIGHTED GUIDING SYSTEM

CROSS REFERENCE TO RELATED APPLICATION

This application claims the benefit of priority to U.S. Provisional Patent Application Ser. No. 62/629,407, filed Feb. 12, 2018, entitled ROBOTIC SIGHTED GUIDING SYSTEM (RSGS), incorporated herein by reference.

FIELD OF THE INVENTION

The present invention pertains to various embodiments of methods and devices useful for guiding persons and animals, and in one embodiment pertains to a cane to assist a person with visual and hearing impairment.

SUMMARY OF THE INVENTION

Various embodiments of the inventions shown herein provide device and methods to assist a person with vision or hearing impairment in walking around objects. Various embodiments safely guide the user from point A to point B, detect and avoid objects in the way, and seamlessly interact with the user.

In one embodiment, a device receives User inputs of desired GPS locations from smart phone. A Computer collects current and nearby GPS location and distance from obstacles. An Algorithm analyzes data and identifies a desired direction of travel. A Guide wheel is servo controlled to turn to a correct direction. A motorized Wheel pulls the cane and user forward when a throttle is pressed. The can further provide a safety alert and beeps or provide a tactile input to the user when people or objects come too close It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein includes schematic representations of various components. Persons of ordinary skill will recognize the usefulness of these schematic representations, along with the text, for providing a complete disclosure many of various embodiments.

FIG. 15 is a table showing schematic representations of various components useful in interpreting FIGS. 17, 18, and 19.

FIG. 20 is a table showing components for the apparatus of FIG. 19.

FIGS. 35, 36, 37, 38, and 39 show various aspects of the configuration and mounting of 3 wheels to an assistance device.

FIGS. 40 and 41 show various aspects of the configuration and mounting of 4 wheels to an assistance device.

FIGS. 42 and 43 show various aspects of the manner in which a single wheel can be attached to an assistance device.

FIGS. 44 and 45 show various aspects of the configuration and mounting of 2 wheels to an assistance device.

FIGS. 46, 47, and 48 show various aspects of the configuration and mounting of 3 wheels to an assistance device.

FIGS. 49, 50, and 51 show various aspects of the configuration and mounting of 4 wheels to an assistance device.

FIG. 52 shows various aspects of the manner in which a single wheel can be attached to an assistance device.

FIG. 53 shows various aspects of the configuration and mounting of 2 wheels to an assistance device.

FIG. 54 shows various aspects of the configuration and mounting of 3 wheels to an assistance device.

FIG. 55 shows various aspects of the configuration and mounting of 4 wheels to an assistance device.

FIG. 56 shows various aspects of the manner in which a single wheel can be attached to an assistance device.

FIGS. 61, 62, 63, 64, 65, 66, and 67 pertain to assistance algorithms regarding the use of verbal or speaking commands.

FIGS. 72, 73, 74, 75, 76, 77, and 78 pertain to assistance algorithms utilizing hand gestures by the user to command the assistance device, including the use of sideways-facing hand gesture cameras.

ELEMENT NOMENCLATURE

Figure 1:
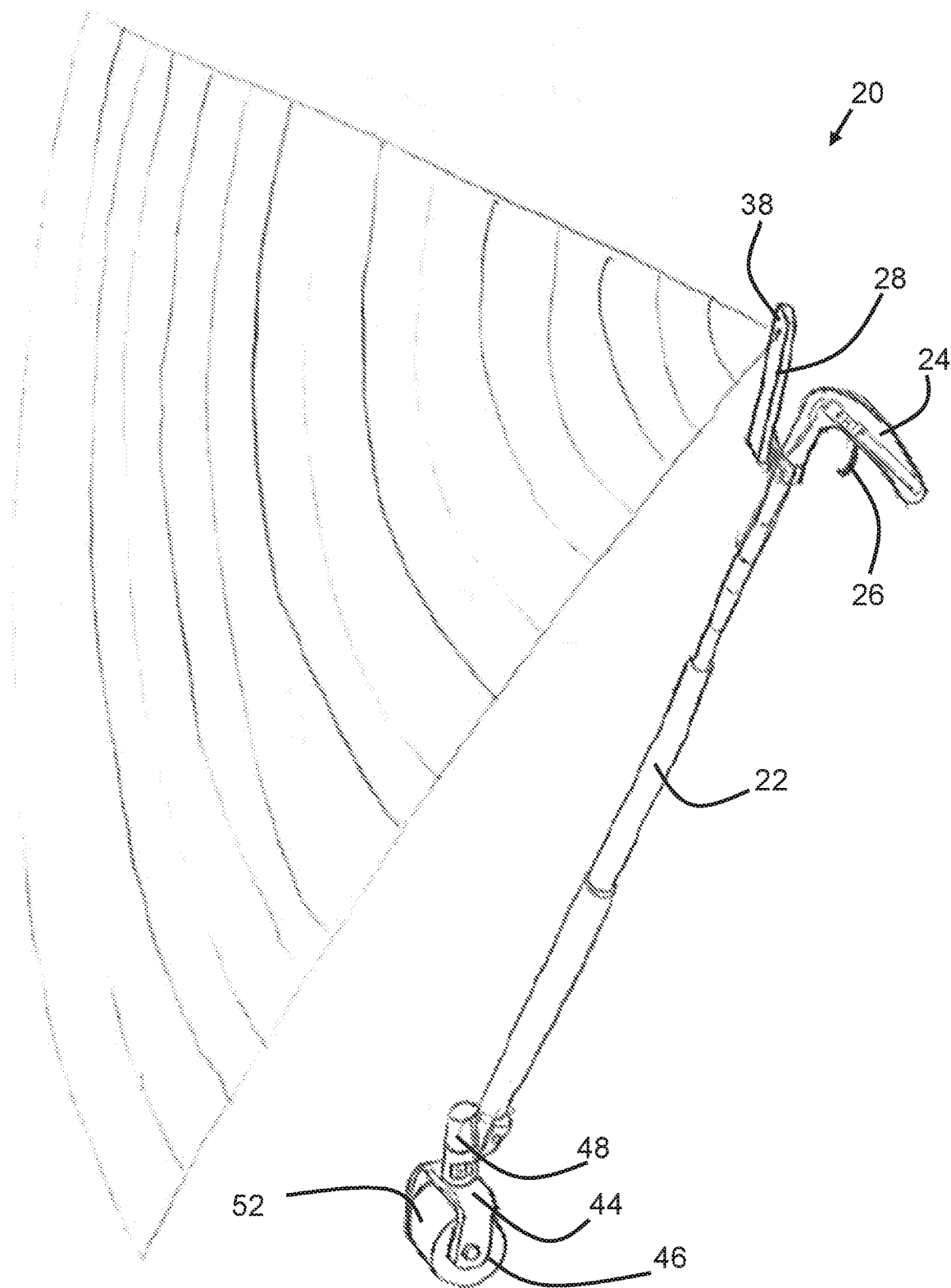
FIG. 1 is hand drawn, side perspective line drawing of a robotic sighted guiding system (RSGS) according to one embodiment of the present invention.
Figure 2:
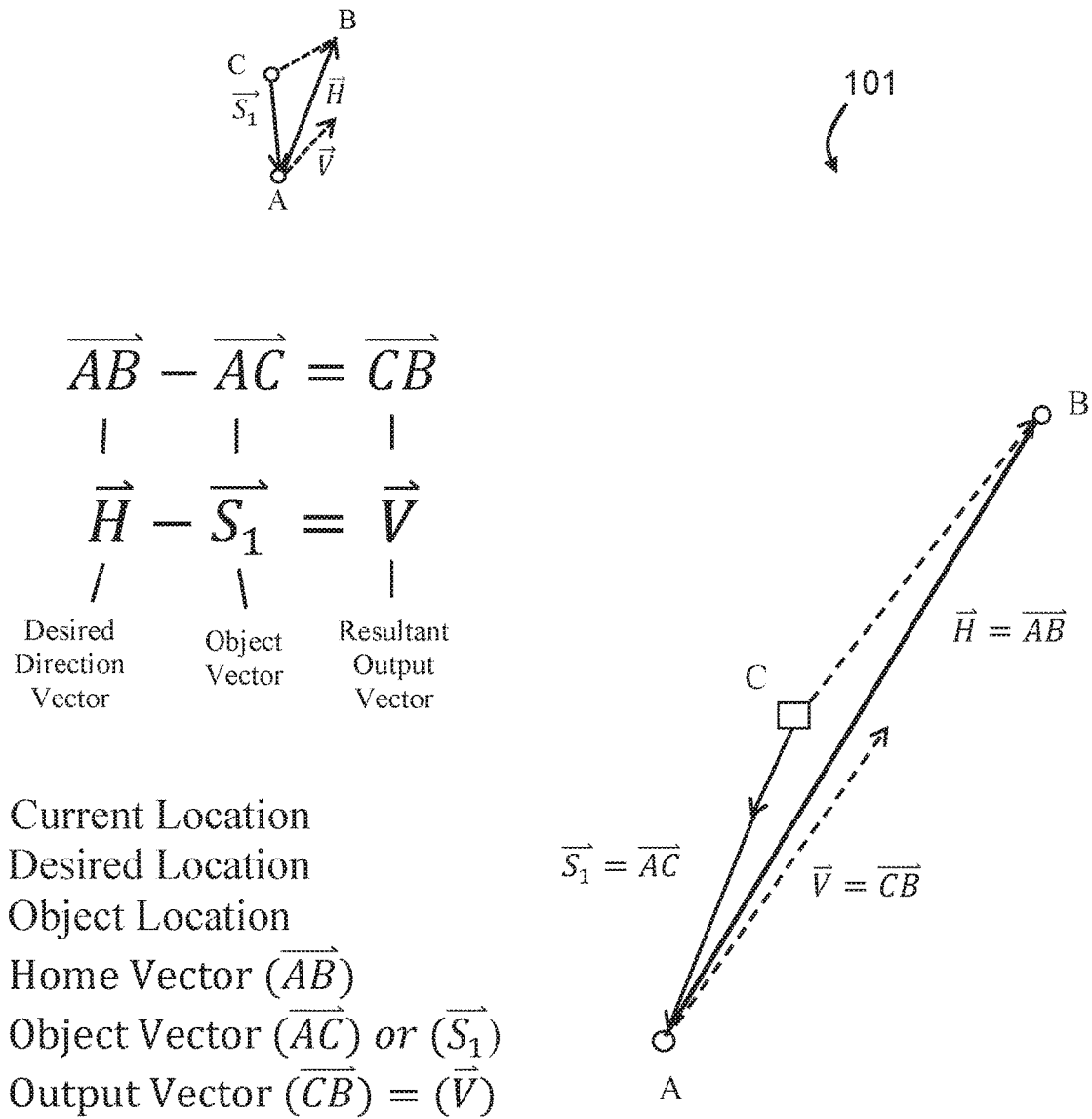
FIG. 2 shows a vector diagram useful in determining a direction toward an object or a path toward an object, according to one embodiment of the present invention.
Figure 3:
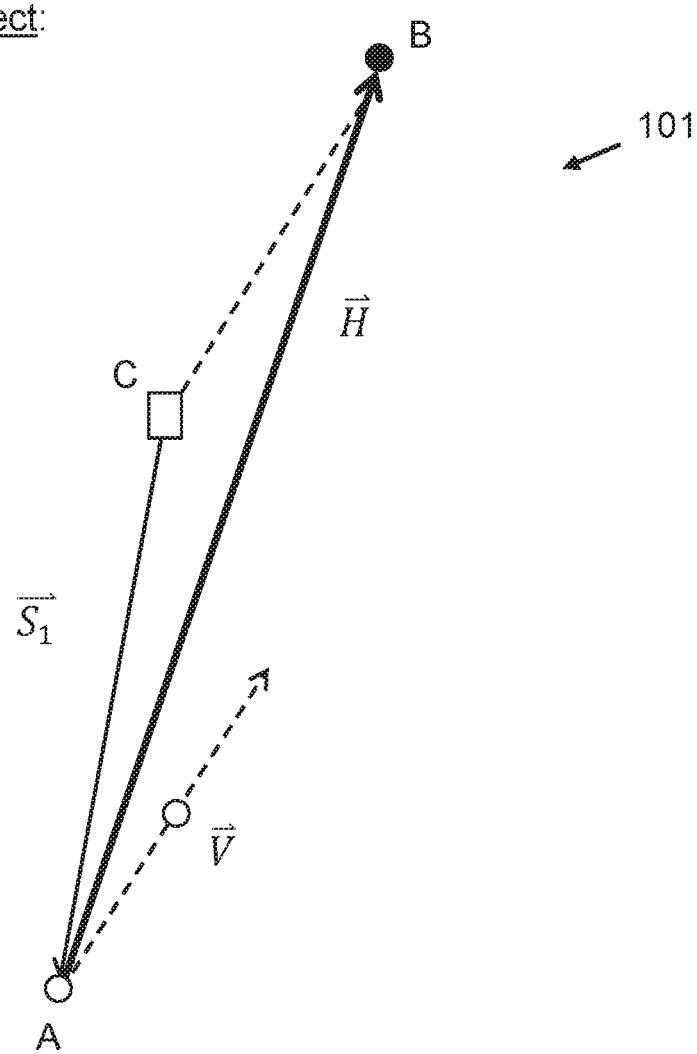
FIG. 3 is a vector diagram useful in the embodiment depicted with FIG. 2.
Figure 4:
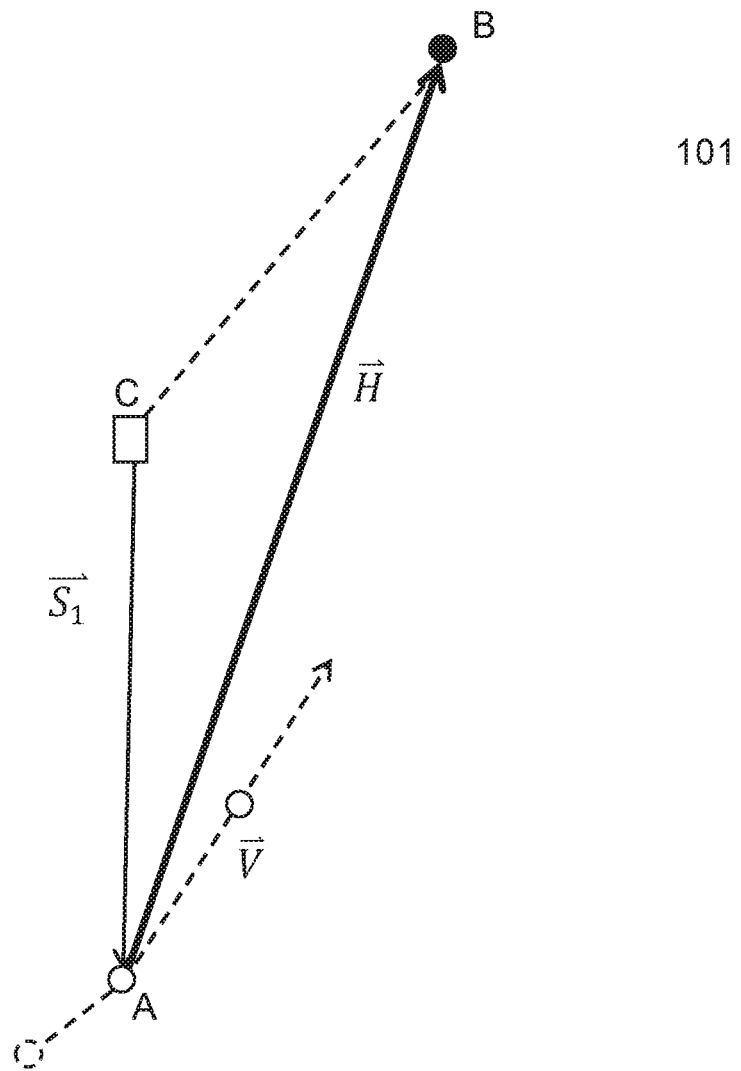
FIG. 4 is a vector diagram useful in the embodiment depicted with FIG. 2.
Figure 5:
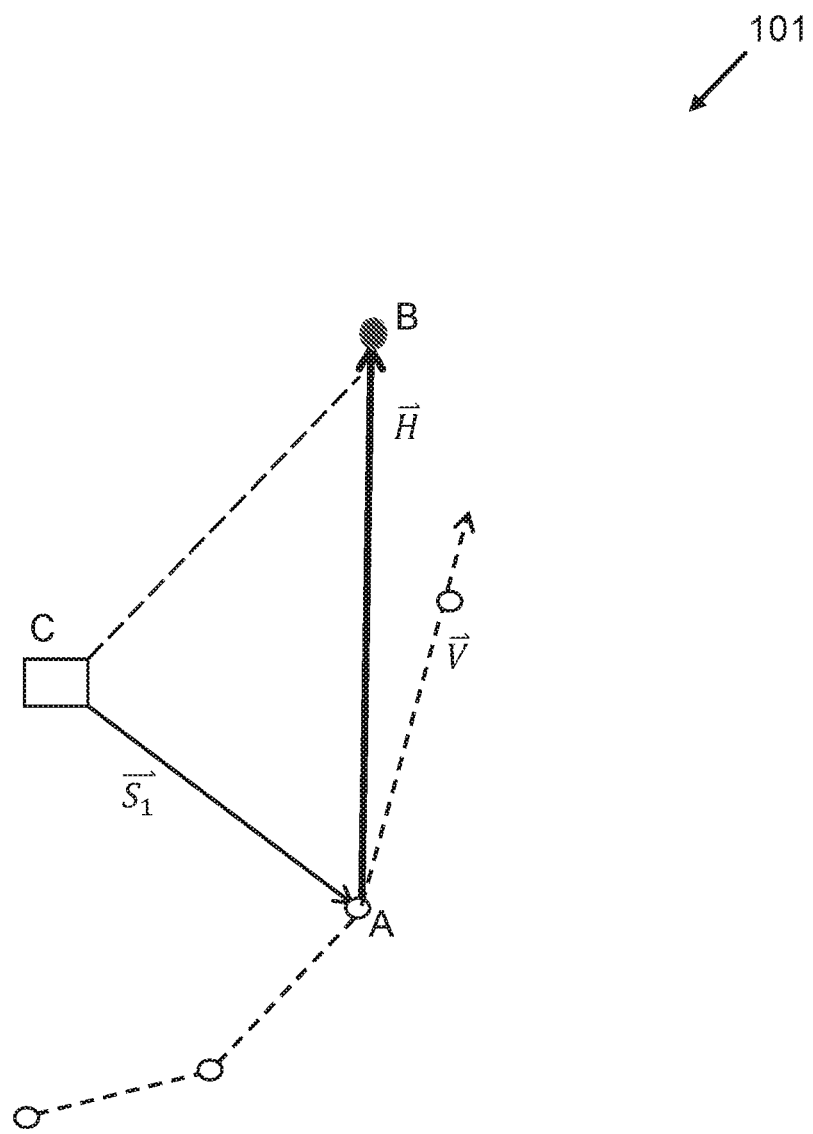
FIG. 5 is a vector diagram useful in the embodiment depicted with FIG. 2.
Figure 6:
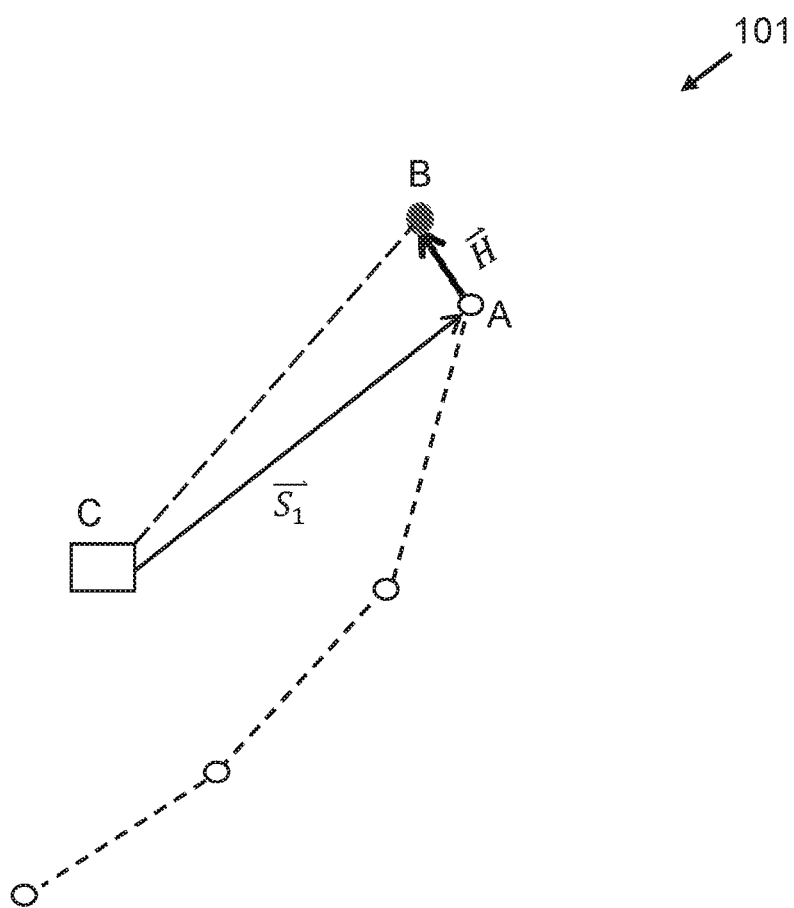
FIG. 6 is a vector diagram useful in the embodiment depicted with FIG. 2.
Figure 7:
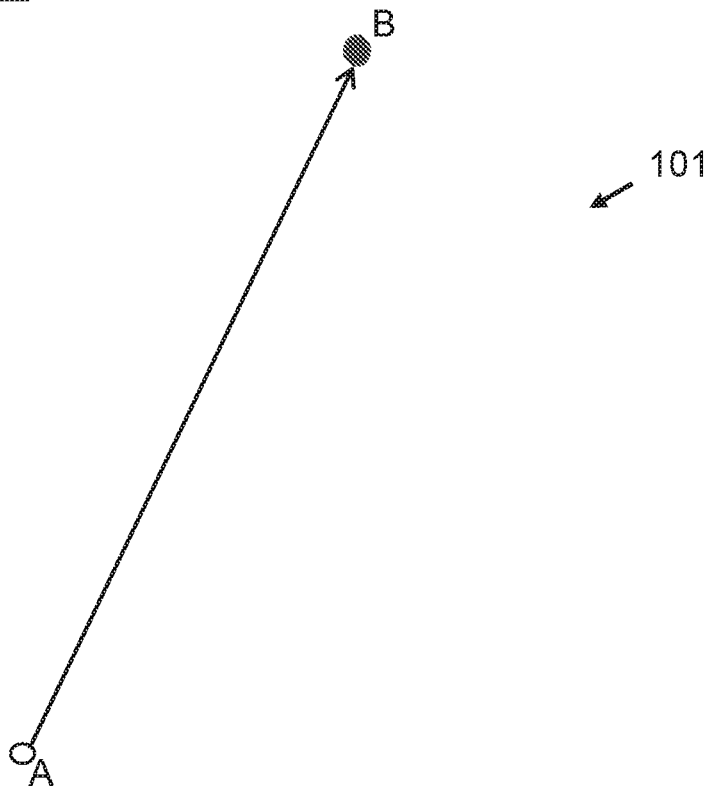
FIG. 7 is a vector diagram useful in the embodiment depicted with FIG. 2.
Figure 8:
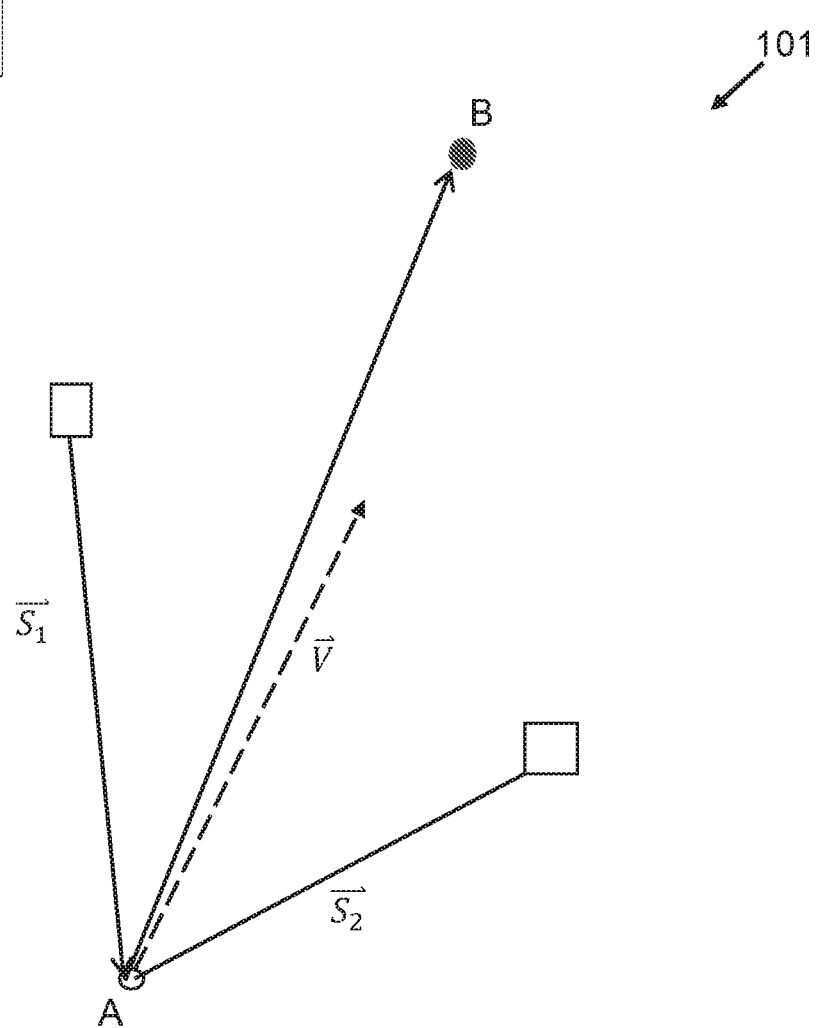
FIG. 8 is a vector diagram useful in the embodiment depicted with FIG. 2.
Figure 9:
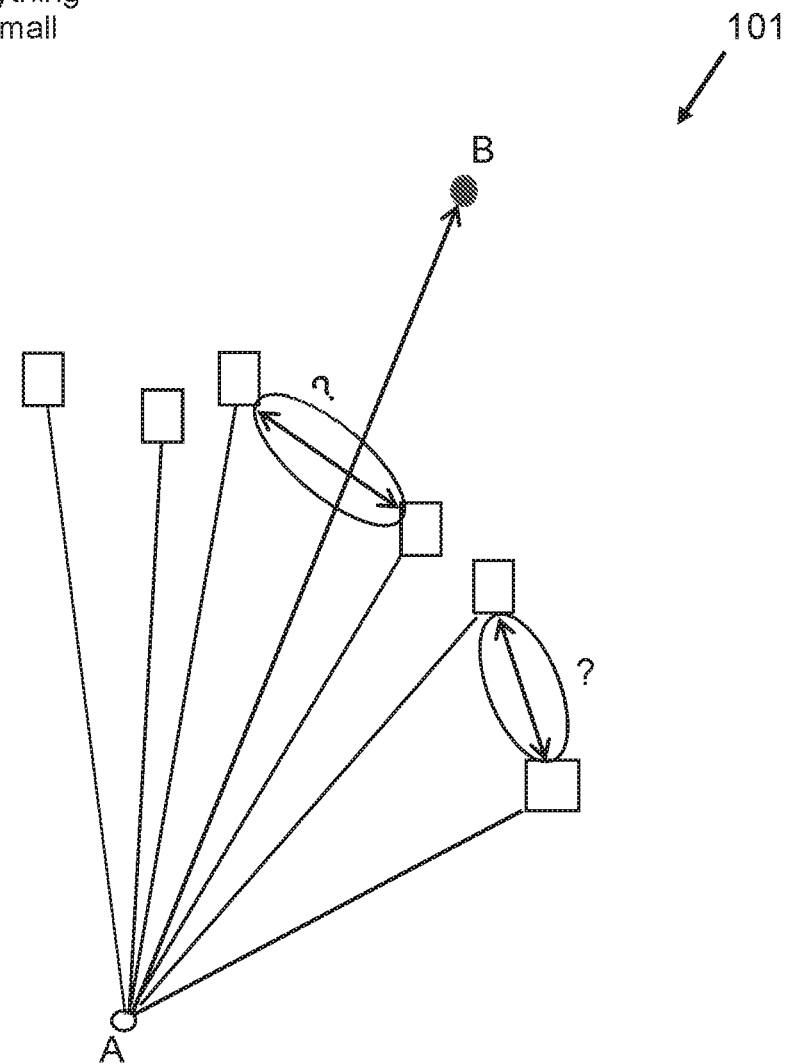
FIG. 9 is a vector diagram useful in the embodiment depicted with FIG. 2.
Figure 10:
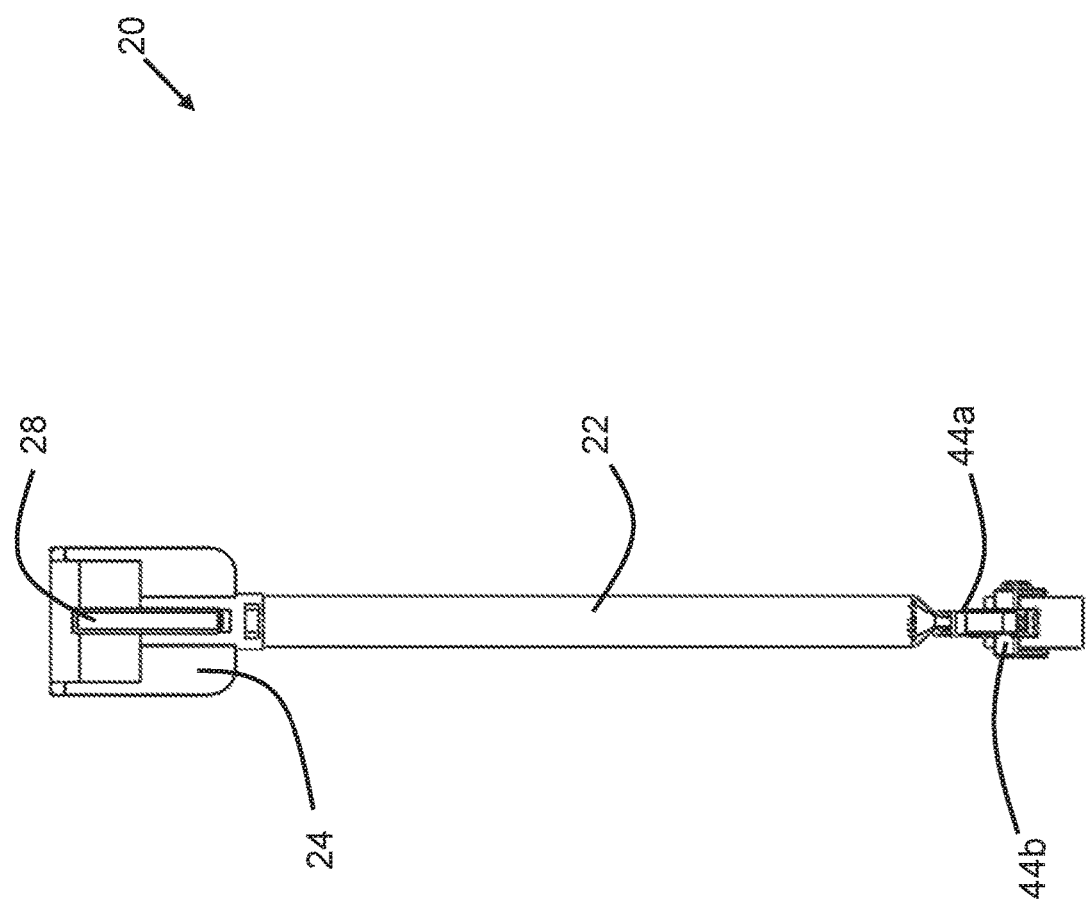
FIG. 10 is a frontal view CAD surface representation of an RSGS according to yet another embodiment of the present invention.
Figure 11:
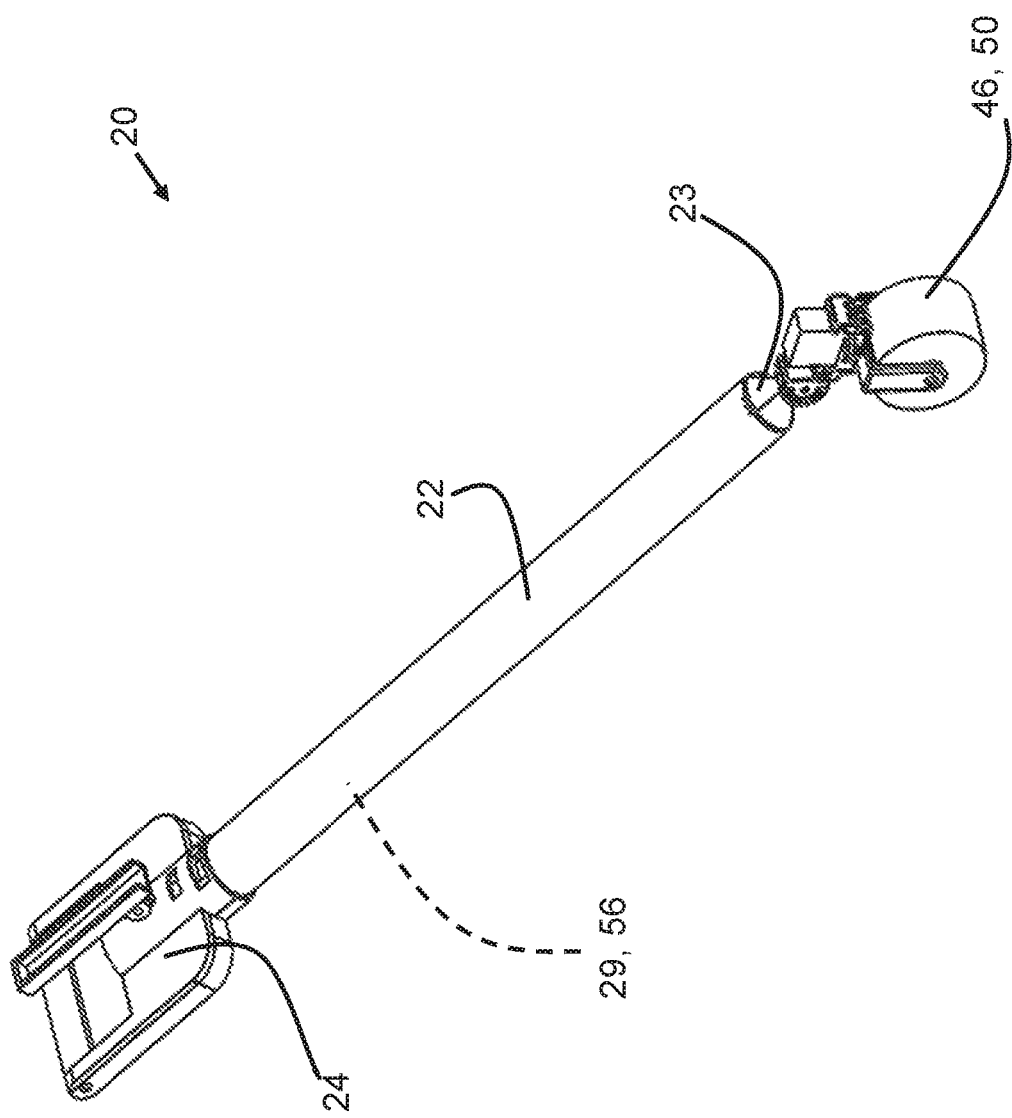
FIG. 11 is a side and top perspective CAD representation of the apparatus of FIG. 10.
Figure 12:
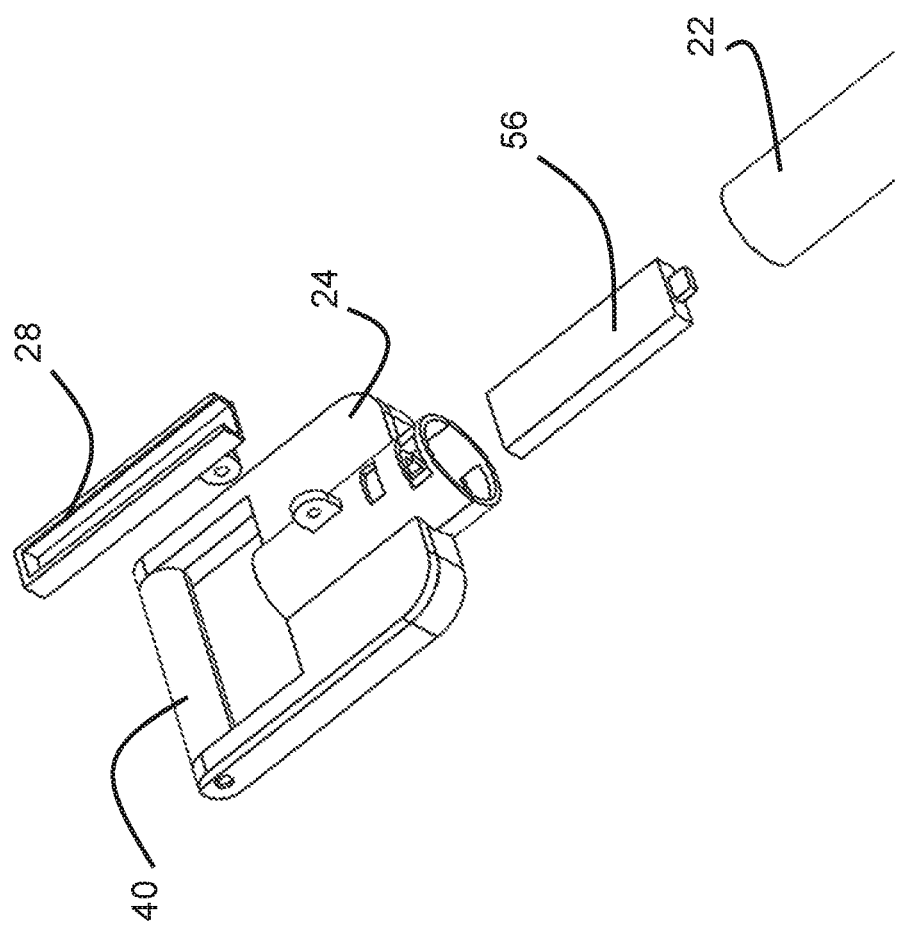
FIG. 12 shows an exploded view of the apparatus of FIG. 11.
Figure 13:
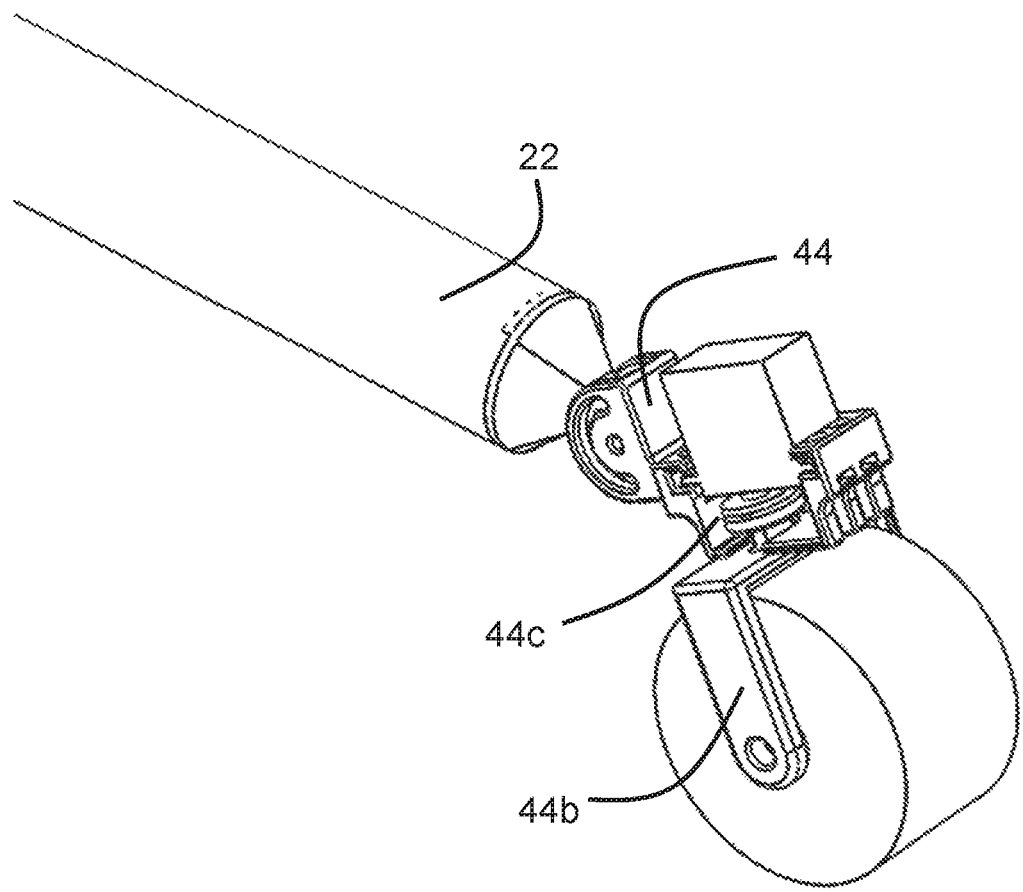
FIG. 13 is a close-up of a portion of the apparatus of FIG. 11.
Figure 14:
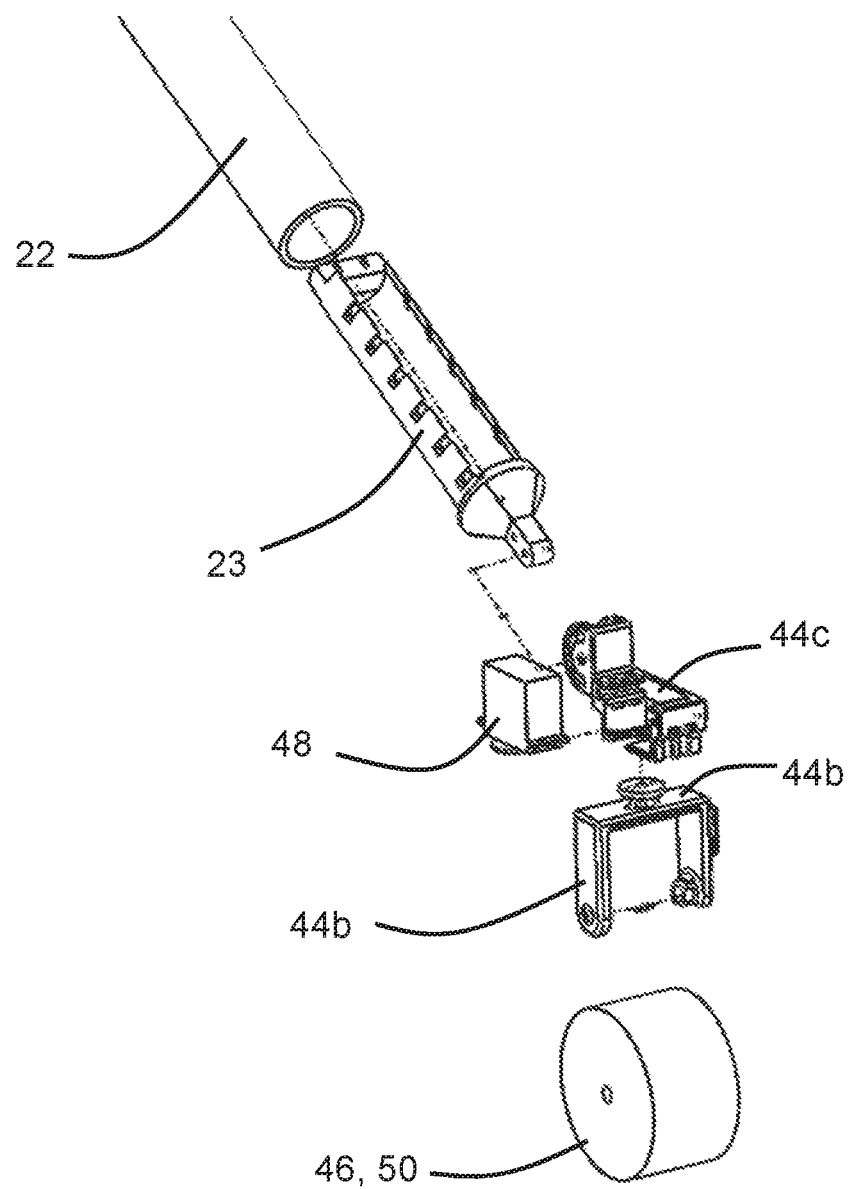
FIG. 14 is an exploded view of the apparatus of FIG. 11.

The following is a list of element numbers and at least one noun used to describe that element. It is understood that none of the embodiments disclosed herein are limited to these nouns, and these element numbers can further include other words that would be understood by a person of ordinary skill reading and reviewing this disclosure in its entirety.

| | |
|---|---|
| 10 | Person; user |
| 20 | Assistance device |
| 22 | Shaft |
| 23 | Shaft to base mount |
| 24 | User handle |
| 25 | Dog handle |
| 26 | Throttle on/off switch |
| 28 | Computer mount; Intel Realsense ® Mount |
| 29 | battery |
| 30 | Input device |
| 31a | Forward facing Camera |
| 31b | Hand-facing camera |
| 32 | Microphone |
| 33 | Keypad |
| 34 | RFID sensor |
| 35 | GPS |
| 36 | Touch pad; fingerprint reader |
| 37 | Bar code reader |
| 38 | Sensor |
| 39 | LIDAR |
| 40 | Tactile actuator |
| 41 | Sound transmitter |
| 42 | Sound receiver |
| 43 | Measurement target |
| 44 | mounting platform |
| 44a | Suspension; spring; hydraulic strut |
| 44b | Wheel mount |
| 44c | Servo mount |
| 45 | axle |
| 46 | Steering wheel |
| 48 | electronic servomotor |
| 50 | Driving wheel |
| 52 | Driving motor |
| 54 | Motor controller |
| 56 | Digital electronic controller |
| 100 | Assistance algorithms |
| 101 | Start up; determination of direction or pathway; selection of predetermined location |
| 102 | Street crossing |
| 103 | Optical or imaging navigation |
| 104 | Car detection and navigation |
| 105 | Curb detection and navigation |
| 106 | Stair, ramp detection and navigation |
| 107 | Stationary object detection and navigation |
| 108 | Street crossing detection and navigation |
| 109 | Electronic navigation by GPS, beacons, RFID, and the like |
| 110 | Hand signal or gesture detection, recognition, and response |

| | |
|---|---|
| 111 | Facial recognition |
| 112 | Speaking commands |
| 113 | Detect, recognize, and maneuver |

DETAILED DESCRIPTION OF ONE OR MORE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" or to the "RSGS" or "Smart Guider" or "the "Guiding System" or "assistance device 20" or the like is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional." The use of any limiting or mandatory language, including words such as "only," "shall," "must" are to be construed with non-limiting and non-mandatory interpretations such as "preferably" or "may."

The use of an N-series prefix for an element number (NXX.XX) refers to an element that is the same as the non-prefixed element (XX.XX), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that some features 1020.1 and 20.1 may be backward compatible, such that a feature of a later discussed embodiment (NXX.XX) may include features compatible with other various embodiments that were discussed earlier (MXX.XX), as would be understood by those of ordinary skill in the art. This description convention also applies to the use of prime ('), double prime ("), and triple prime ("') suffixed element numbers. Therefore, it is not necessary to describe the features of 20.1, 20.1', 20.1", and 20.1'" that are the same, since these common features are apparent to persons of ordinary skill in the related field of technology.

What follows are paragraphs that express particular embodiments of the present invention. In those paragraphs that follow, some element numbers are prefixed with an "X" indicating that the words pertain to any of the similar features shown in the drawings or described in the text. However, those of ordinary skill in the art will recognize various other non-X prefixed element numbers that discuss features applicable to other embodiments.

Various references may be made to one or more processes, algorithms, operational methods, or logic, accompanied by a diagram showing such organized in a particular sequence. It is understood that the order of such a sequence is by example only, and is not intended to be limiting on any embodiment of the invention.

This document may use different words to describe the same element number, or to refer to an element number in a specific family of features (NXX.XX). It is understood that such multiple, different words are not intended to provide a redefinition of any language herein. It is understood that such words demonstrate that the particular feature can be considered in various linguistical ways, such ways not necessarily being additive or exclusive.

Various embodiments of the present invention pertain to an assistance device 20 adapted and configured to help guide a person with vision and/or hearing loss. In one embodiment, the mechanical components of such devices 20 can include:

Collapsible white cane 22;
Drive wheel mount 44b;
Steering servomotor mount 44c;
Cane to drive base mount 44;
Handle 24 with integrated chip computer 56 and throttle 26;
Intel realsense mount 28; and
Batteries 29.

Still other embodiments the device 20 can include one or more of the following electrical components:

Brushless DC drive motor 52 (in wheel 50)+motor controller 54;
Brushless DC steering servomotor 48 with encoder;
Rechargeable lithium ion battery pack 29;
Battery charger;
Throttle switch 26;
Intel realsense camera 31; and
Intel stick computer 56.

Various embodiments of the present invention pertain to a guiding system for the visually impaired that works similarly to a guide dog, by pulling the user toward a desired location while navigating around or through obstacles. In some embodiments the guiding system includes a handle attached to a guide wheel which will turn to the proper direction of travel and effectively pull the user. In some embodiments this system includes a motor powered wheel for moving forward and a second motor used to steer this wheel in the direction of travel. In some embodiments a 3D Depth Camera receives the values of distance between the user and surrounding objects. In some embodiments a computer collects sensor values from the camera, analyzes them in the algorithm and determines the safest direction of travel. An on board computer handles the processing power, while a microcontroller controls the two motors.

Reference herein to a robotic cited guiding system (RSGS), Guiding System, or Smart Guider, refer to various trade names for one or more of the embodiments of the assistance device 10 or the assistance algorithms 100 shown and depicted herein. Reference to an iPhone® refer to any type of wireless personal communication device, including as one example an Android® device. Reference is made herein to the use of brushless DC motors, and persons of ordinary skill in the art will understand that various embodiments of the present invention are not so limited, and contemplate the use of any type of electric motor. Reference is also made herein to the use of servomotors, and persons of ordinary skill in the art will understand that various embodiments of the present invention are not so limited, and contemplate the use of any type of computer-controllable device adapted and configured to swivel or pivot a steerable wheel to a particular angular orientation relative to device 20, or relative to other objects.

Various embodiments of the devices and methods shown herein pertain to assisting and guiding a person that is walking. In some embodiments, the device 20 includes a shaft 22 having a handle 26 at one end, and one or more wheels 46, 50 at the other end. In some embodiments, the shaft 22 is substantially rigid, and preferably collapsible. However, in still other embodiments the shaft incorporates one or more flexible sections which assist the user in pressing down on the motorized wheels and steering wheels in order to achieve higher levels of traction.

In some embodiments, there is at least one steerable wheel 46 intended to contact the ground and swivel or pivot relative to the shaft 22. Preferably, this swiveling is performed by an electrical servomotor 48. The servomotor in some embodiments is coupled to either a wheel mount 44*b*, or to a mounting platform 44 by way of a servo mount 44*c*, which preferably includes at least two separate members, one of which is coupled to the shaft 22, and the other being coupled to either the steerable wheel 46 or to a mounting platform 44 to which the wheel is attached.

Preferably, the actuation of the electrical servomotor is accomplished with a command generated by a digital electronic control 56. The controller 56 receives one or more input signals from one or more input devices 30, and one or more signals from one or more sensors 38. By way of the input devices, the user of the assistance device commands the device to accomplish a particular assistance function or algorithm 100. Various embodiments include input devices such as key pads or other arrays of buttons or switches, touch pads by which the user can tap or swipe a finger in a particular direction as a command, or the like.

The various algorithms stored in memory of the control then use various sensor signals to determine what objects are near the user, and calculate a direction and/or a pathway around these objects in order to accomplish the task requested by the user. Once these calculations are performed, the controller will command the servomotor 48 to steer or swivel the steerable wheel 46, and by doing so indicate to the user what direction should be taken. It is also contemplated in some embodiments that one or more acoustic signal (such as by way of a speaker or sound transmitter 41) or tactile signals (via a tactile actuator 40 mounted to handle 24) can be sent to the user as an additional indication of the direction to which the wheel has been steered. In one embodiment, the tactile actuator 40 includes one or more electromagnetically controlled devices (such as an electromagnetic solenoid core) that can be actuated by the electronic controller in representation of data from the computer being passed to the hand of the user. Further, by steering the front wheel, the user is provided a tactile reference by way of a path of least resistance as to which is the direction in which the steered wheel is able to rotate. The additional acoustic or tactile signals can further indicate to the user a general direction.

Still further embodiments described and depicted herein pertain to assistance devices 20 that include mounting platforms 44 at the distal end of the shaft 22 that can support one or more steerable wheels, one or more powered wheels, and one or more combinations of powered and steerable wheels. In some embodiments each steerable wheel can be steered independently of each other steerable wheel. In still further embodiments, a single servo actuator is used to steer one or more steerable wheels in unison. In still further embodiments a servomotor is used to steer a platform that has multiple driven wheels attached to it. Still further steering functions can be accomplished in yet other embodiments by differentially turning powered wheels, such that one wheel rotates at a different speed or in a different direction than another wheel, such that in some embodiments the wheel platform can be thought of as having a zero turn radius.

In still further embodiments, the steered wheel is further driven by a motor, such as a DC brushless motor. In these embodiments, the controller not only establishes a direction by steering the wheel, but further applies torque to the wheel to rotate it and thereby pull along the shaft, handle, and user in the desired direction.

Figure 16:
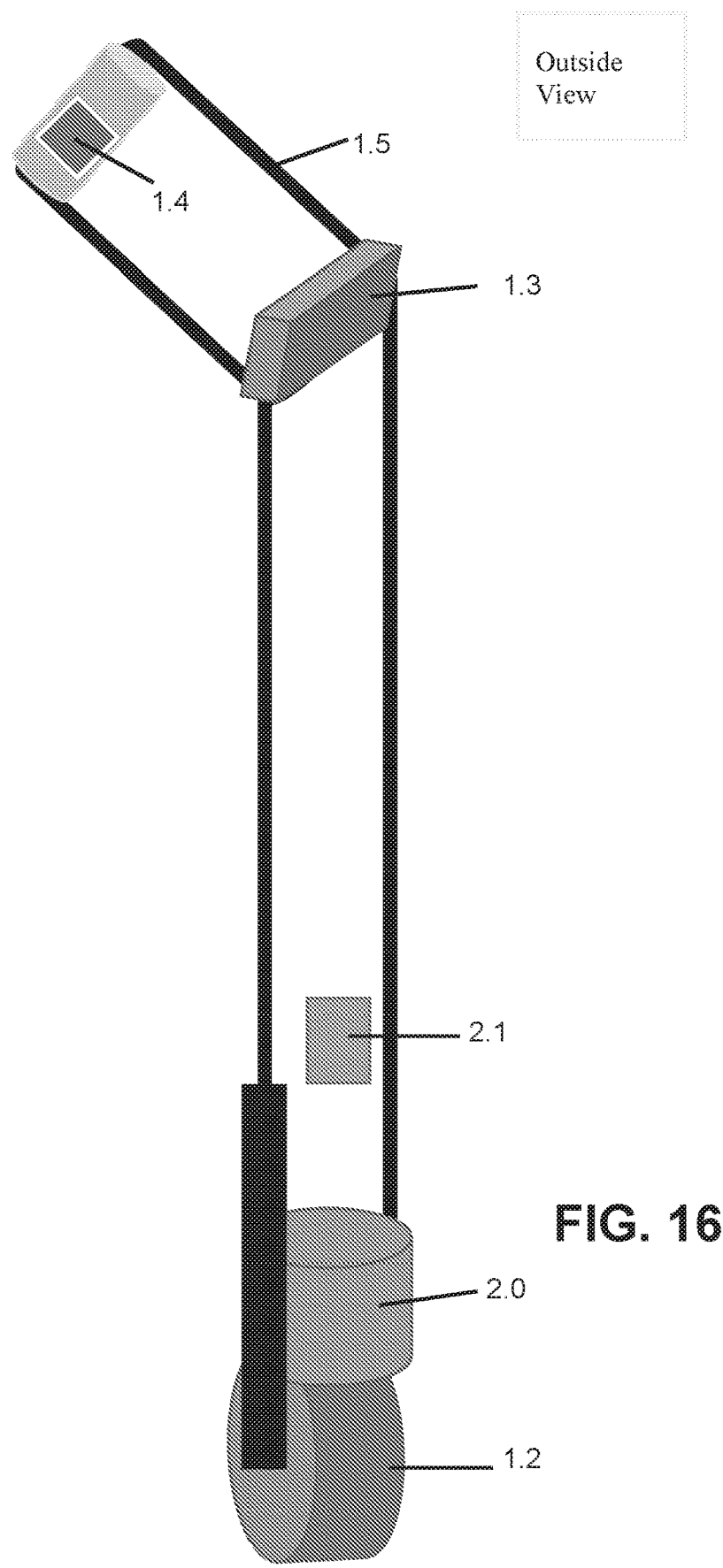
FIG. 16 is an external schematic representation of an RSGS according to yet another embodiment of the present invention.
Figure 17:
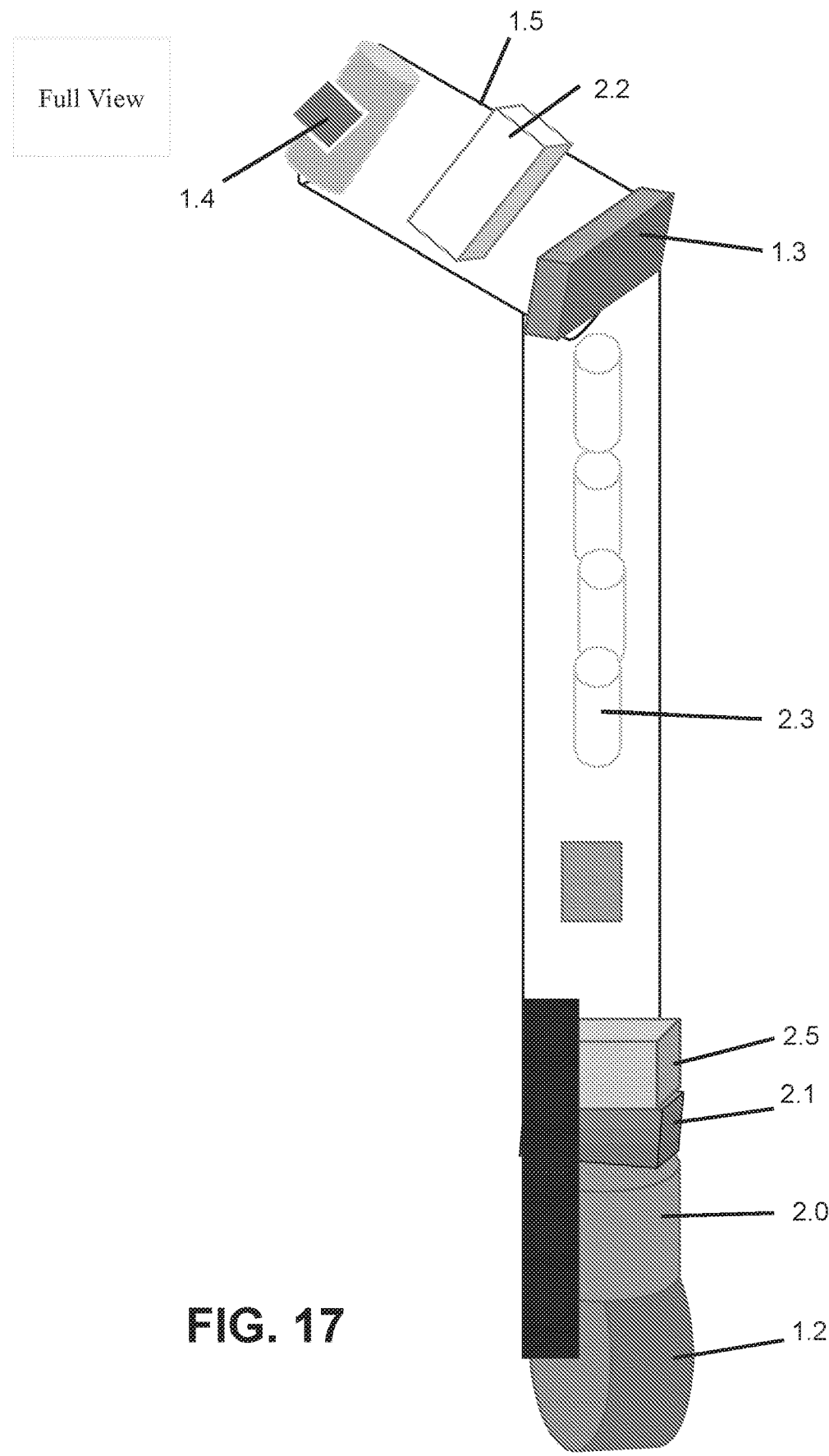
FIG. 17 is a schematic representation of the schematic of FIG. 17, showing internal components.
Figure 18:
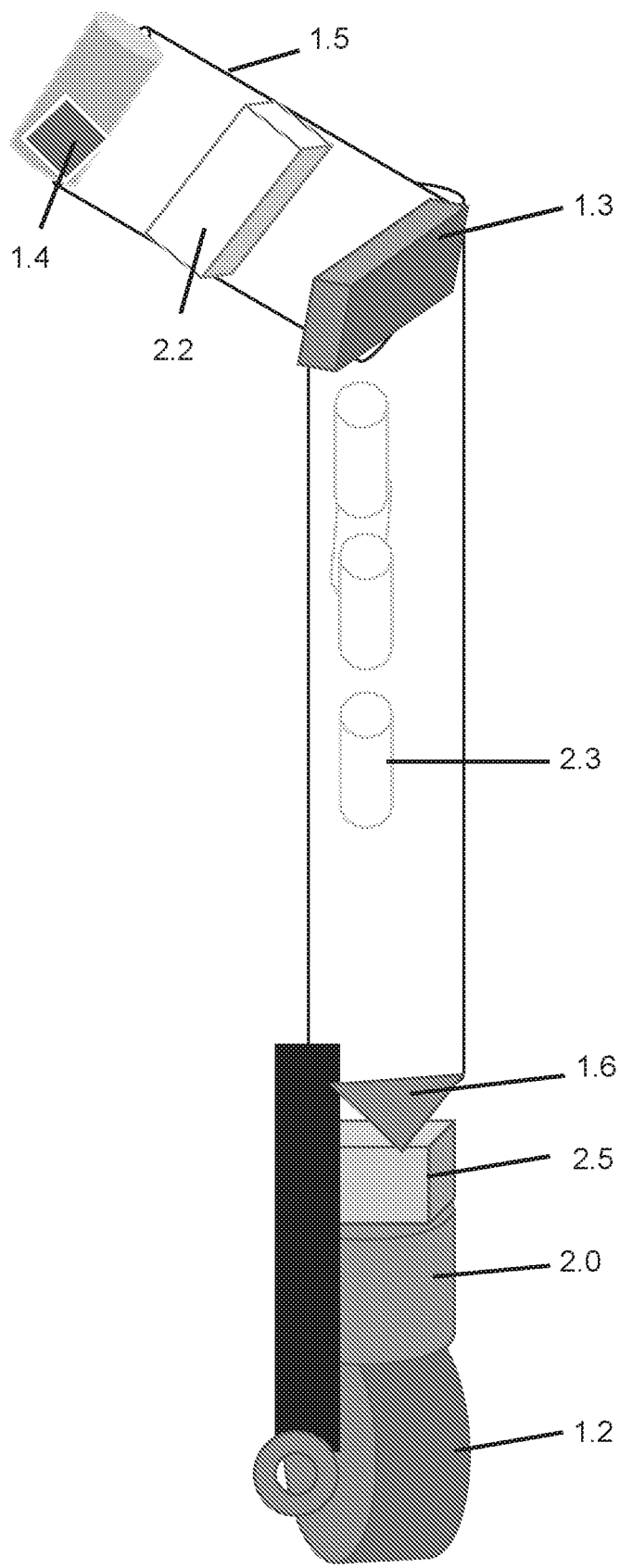
FIG. 18 is a schematic representation of the schematic of FIG. 17, showing internal components.
Figure 19:
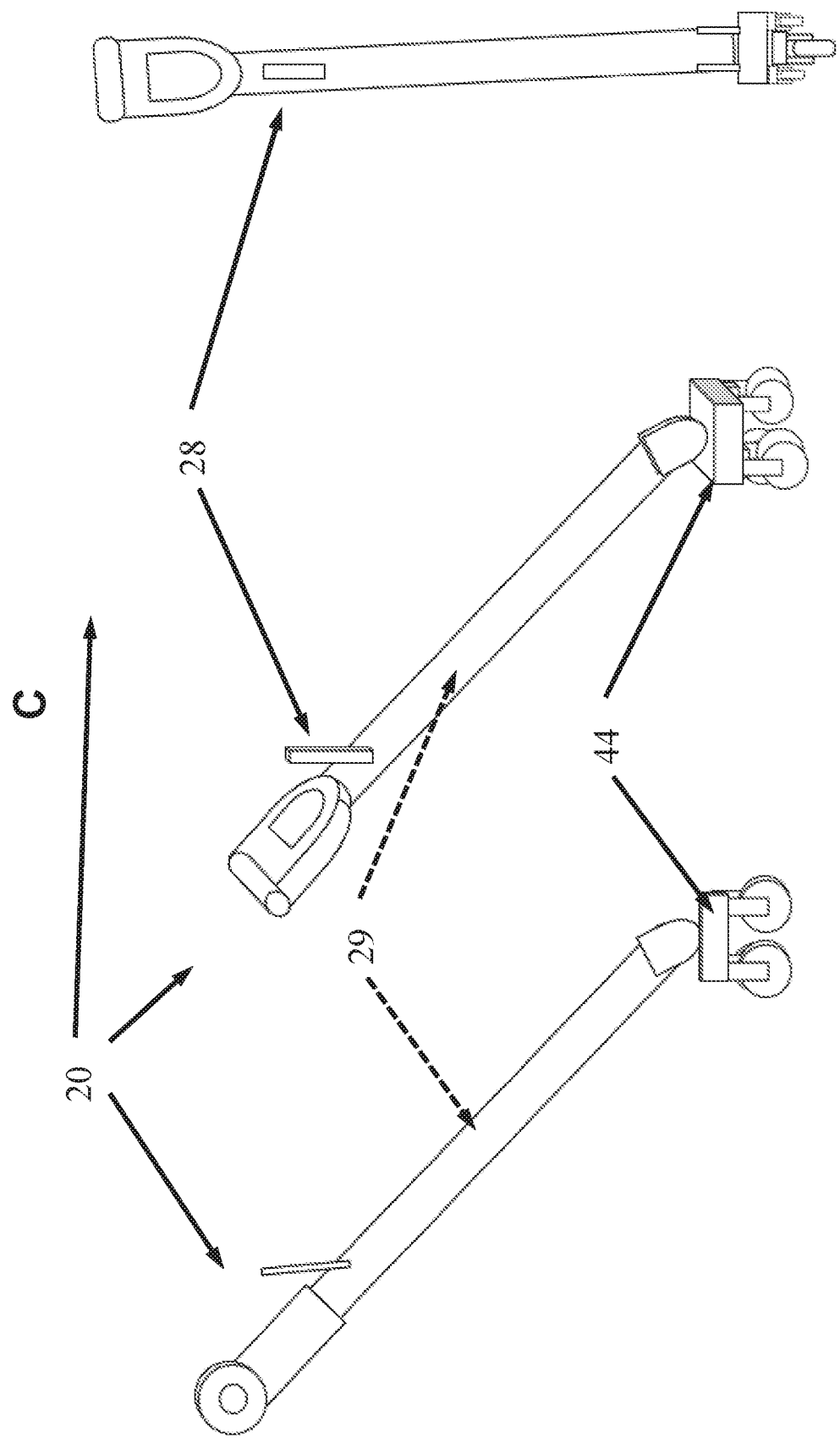
FIG. 19 shows side, perspective, and front schematic views of a multi-wheeled assistance device according to another embodiment of the present invention.
Figures 21, 22:
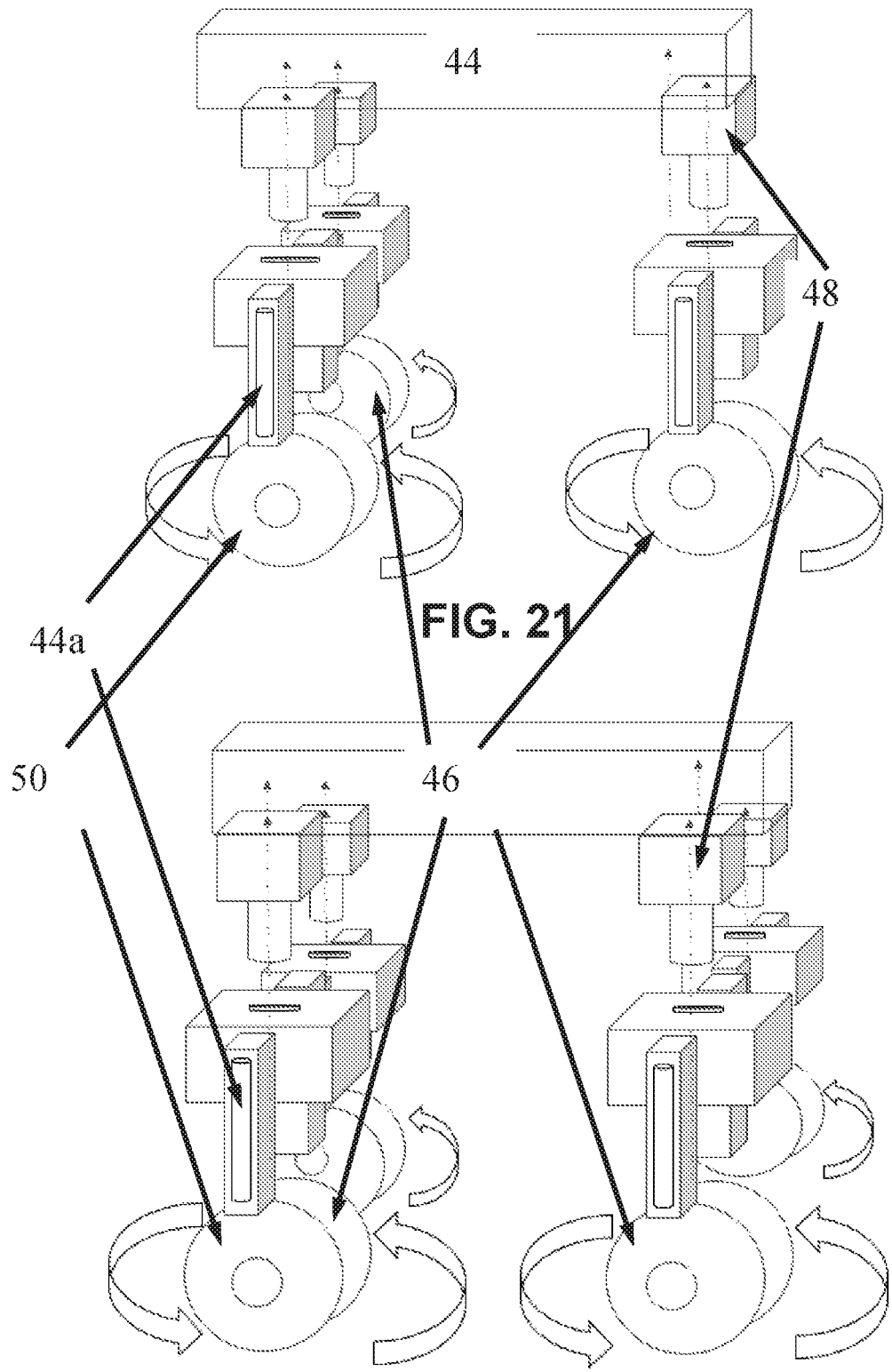
FIG. 21 is a schematic representation of an alternative 3 wheel drive, useful in the apparatus of FIG. 19.
FIG. 22 is a schematic representation of an alternative 4 wheel drive, useful in the apparatus of FIG. 19.
Figure 23:
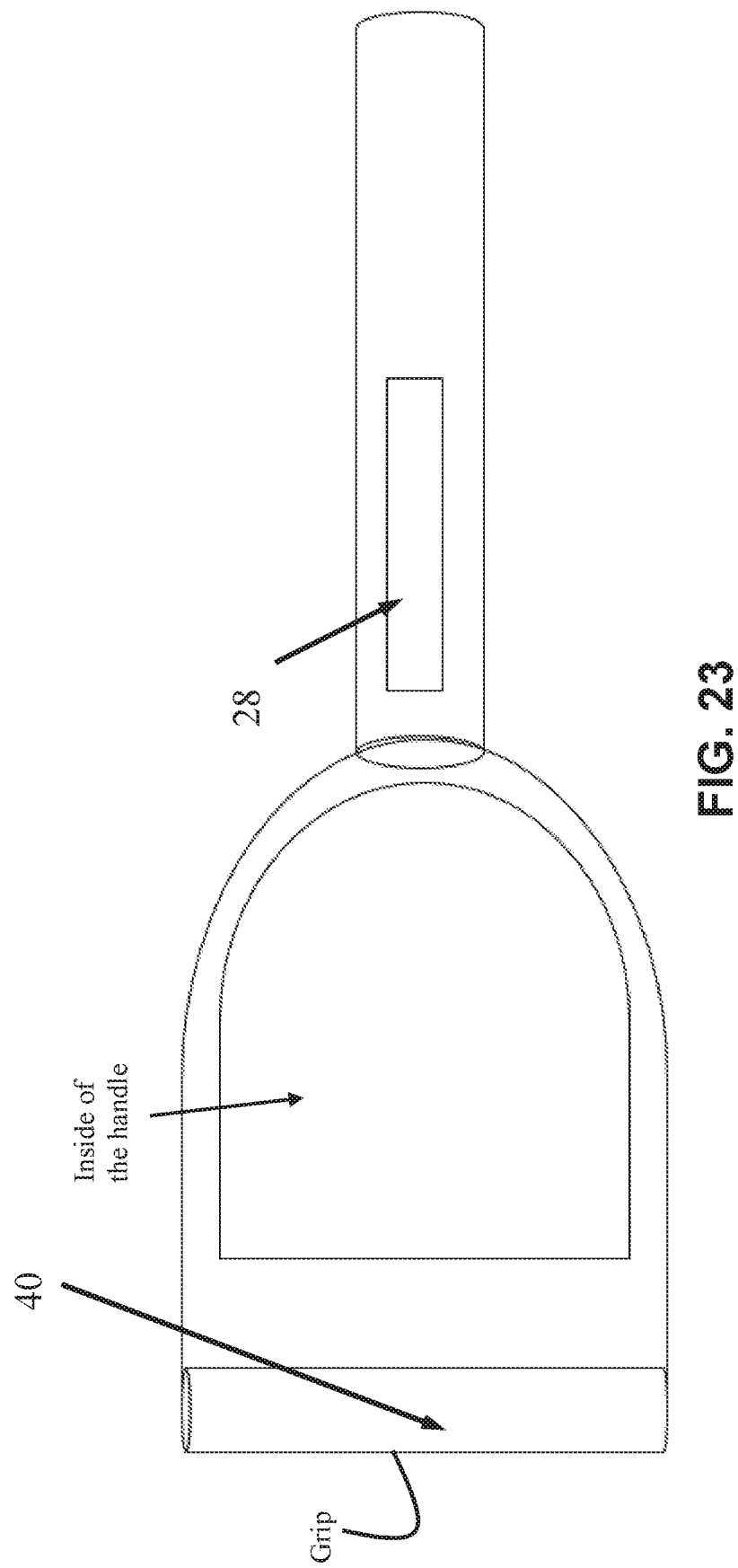
FIG. 23 shows handle shape for the apparatus of FIG. 19.

FIGS. 1 and 10-14 present various views of a device 20 that includes a steerable wheel, which in some embodiments is further motorized. FIGS. 16-17 further depict various aspects of an assistance device 10 having a steered wheel, and further in which in some embodiments the steered wheel is driven to rotate by a motor. FIGS. 19-21 and 23-25 further show various assistance devices that include at least one steerable wheel, and at least two driven wheels. FIG. 22 schematically shows a platform that couples together four wheels. As best seen in FIGS. 21 and 22 in some embodiments all of the wheels coupled to the platform are electrically steerable by servomotors to pivot or steer about an axis that is generally perpendicular to the axis of rotation of the corresponding wheel. Further, various inventions contemplate in which all three wheels (FIG. 21) or all four wheels (FIG. 22) are driven by motors to rotate. It is further appreciated that in some embodiments the wheels (whether powered, steered, or both) are coupled to a platform 44 by a suspension including one or more springs or hydraulic struts 44*a*.

Figure 24:
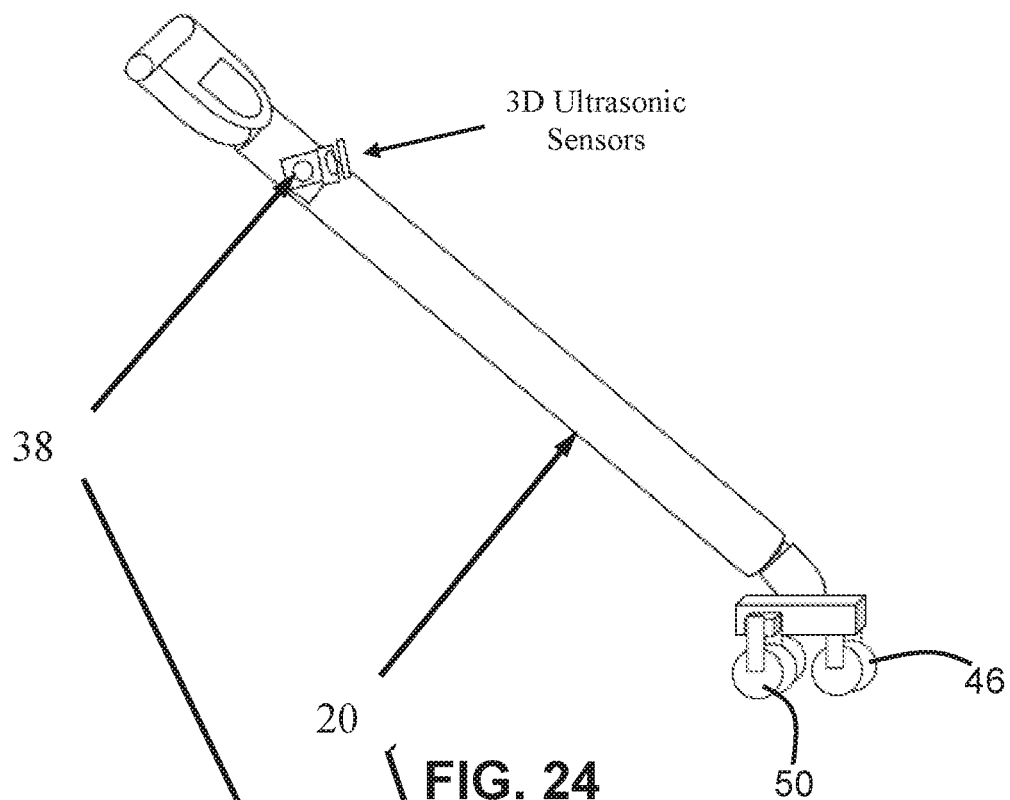
FIG. 24 shows 3D ultrasonic sensors for the apparatus of FIG. 19.
Figure 25:
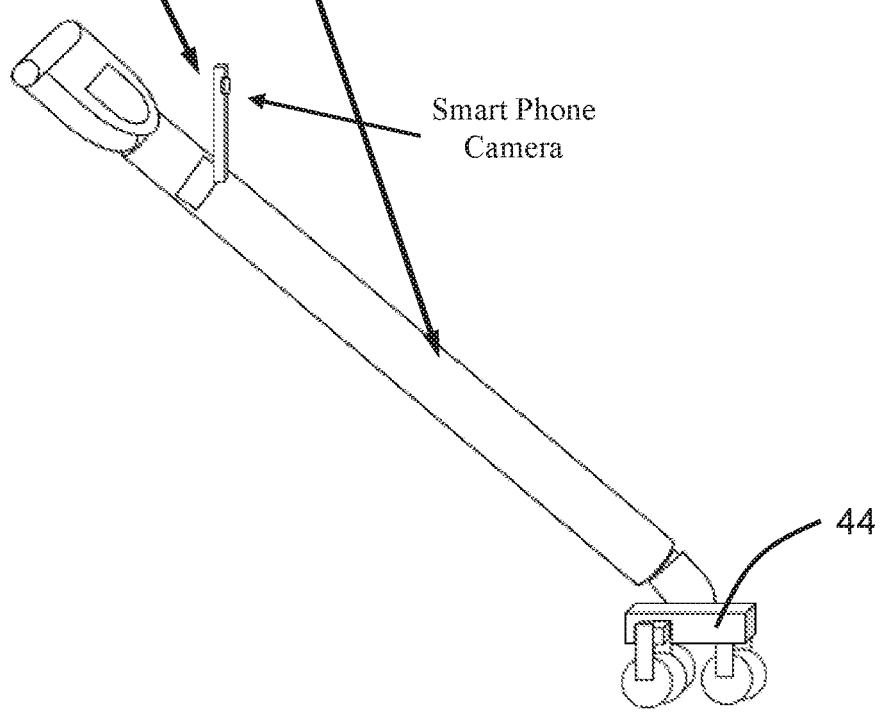
FIG. 25 shows smart phone camera for the apparatus of FIG. 19.

FIGS. 24-28 depict various other aspects and functions of an assistance device 20 and assistance algorithms 100 according to various embodiments of the present invention. FIGS. 24 and 25 show (in the top view) a device 20 including a sensor 38 for 3D ultrasonic scanning, and in FIG. 25 a mount that mechanically and electronically couples a smart phone to the digital electronic controller. The 3D ultrasonic sensor of FIG. 24 includes one or more pressure wave transmitters and one or more pressure wave receivers that provide electronic signals to the digital controller for use by an echo-locating algorithm to determine the position of nearby objects. Similarly, the assistance device of FIG. 25 utilizes a camera from a smart phone to provide a visual image to the digital controller.

Figure 26:
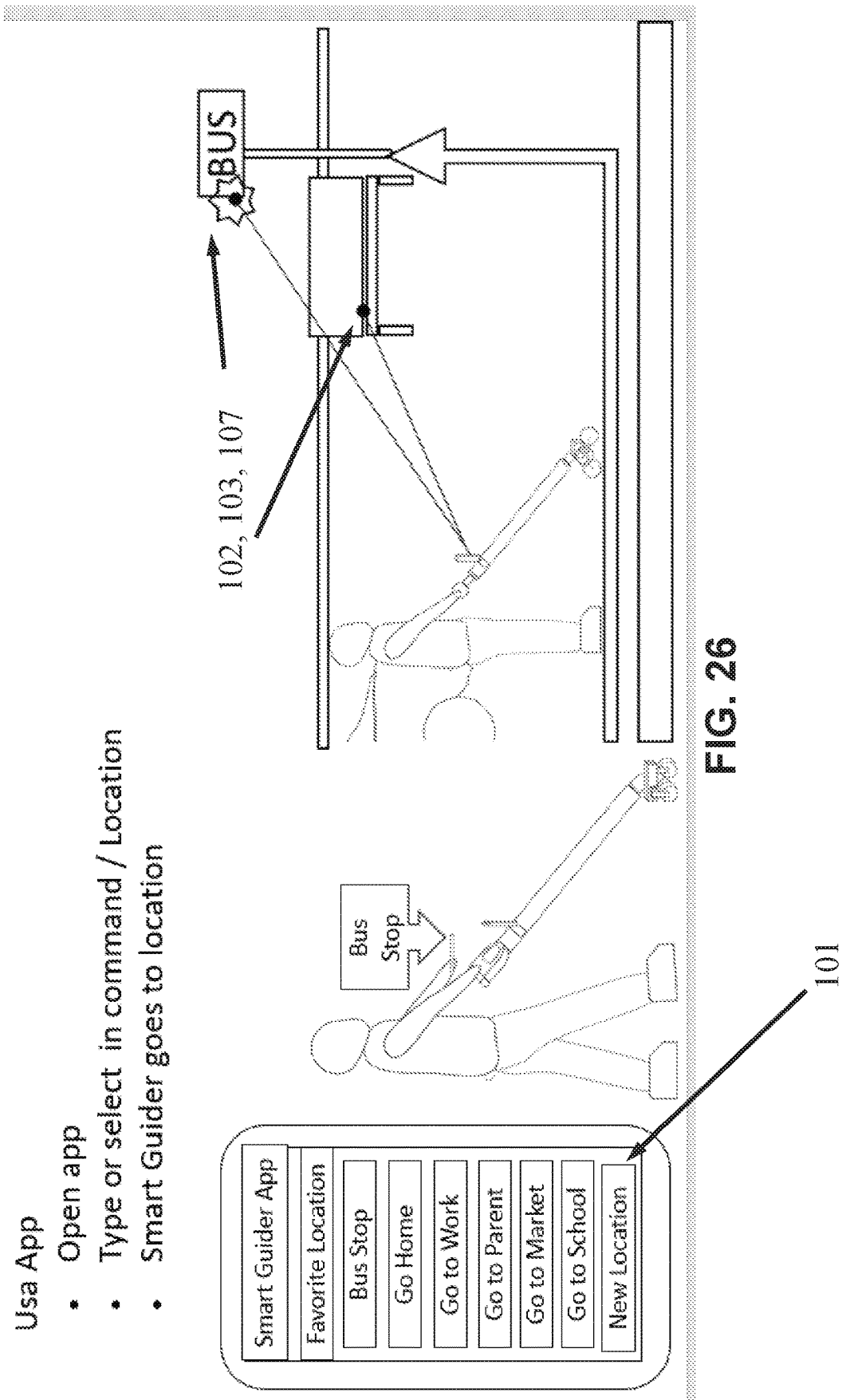
FIG. 26 shows use of an assistance algorithm utilizing software applications according to one embodiment of the present invention, with still other assistance algorithms providing detection and navigation to a destination such as a bench by a bus stop.

Referring to FIG. 26, in some embodiments the controller 56 includes assistance algorithms 101 for determining a direction or pathway selected from a predetermined menu of locations. Based on a selection by the user, the controller will plot a pathway to the preselected location, and steer the steerable wheel 46 to facilitate movement of the user in the initial direction of that pathway. Further, the device 20 shown in FIG. 26 includes driving wheels, and the corresponding motor will be commanded to provide a torque to the driving wheel so as to pull device 20 in the direction of the steered wheel 46.

As the device 20 and the user follow the calculated pathway, yet other assistance algorithms are employed. For example, in one algorithm 102 the crossing of a street is noted, such as by curb detection by algorithm 105, or from knowledge of the GPS location of the device along with an electronic map, and the user is informed of the street crossing. This information may be provided by a tactile actuator attached to the handle that is in contact with the user's hand, by way of a speaker, or other means. In some embodiments, at the detection of a street and a street crossing, algorithm 102 will result in a command at the driving wheels to stop turning, which indicates to the user that the user should stop. Further, the wheels can be driven backwards, to further indicate to the user a more secure location.

Additionally, an assistance algorithm 107 can detect stationary objects, including signs. Based upon the meaning of the sign and the location of the user, appropriate command signals are sent to the various servomotors and driving motors to properly position and/or inform the user of the sign. Still further, an optical navigation and detection algorithm 103 can look for objects likely to be in the vicinity, such as a bench that is near a bus stop. Upon recognizing the bench, the computer issues appropriate commands to guide the user to the bench.

Figure 28:
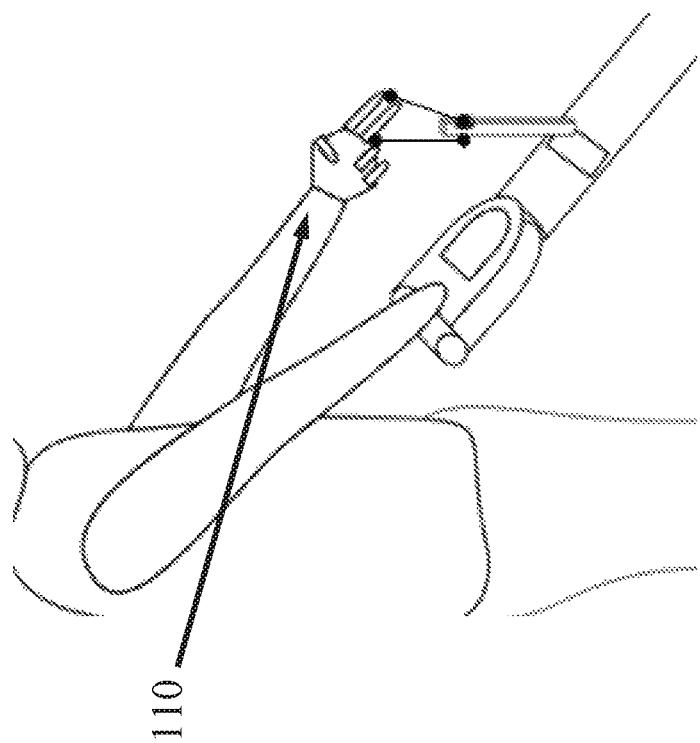
FIG. 28 is a close-up representation of the device and method of FIG. 27.
Figure 27:
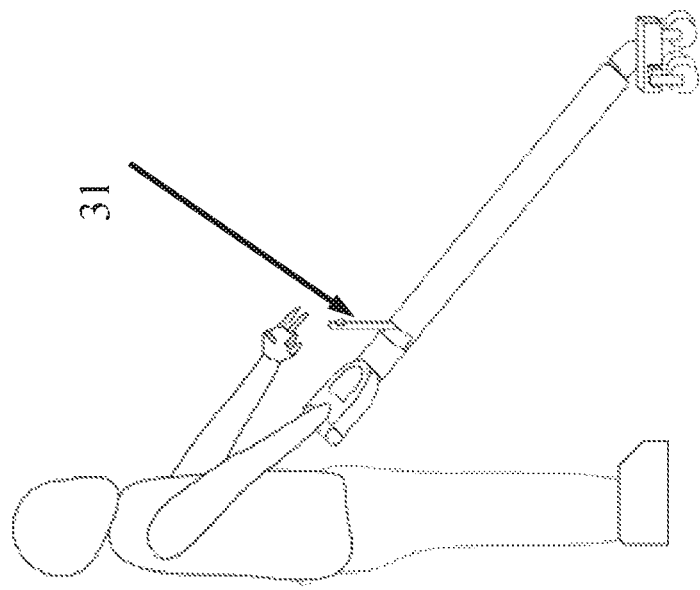
FIG. 27 shows the use of hand gestures or other hand commands useful for providing input to an electronic controller by way of an imaging device, such as a camera, ultrasonic detector, infrared detector, or the like. The smart guider gesture input device detects hand signals and number of fingers and interprets them as non-speech command.
Figure 29:
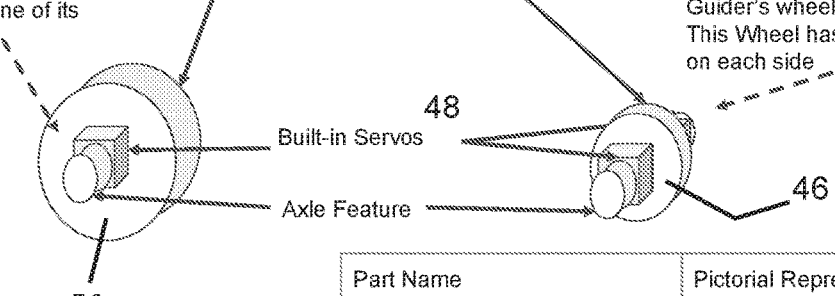
FIG. 29 is a schematic representation explaining various features of the mounting and configuration of multiple wheels to an assistance device.
Figure 30:
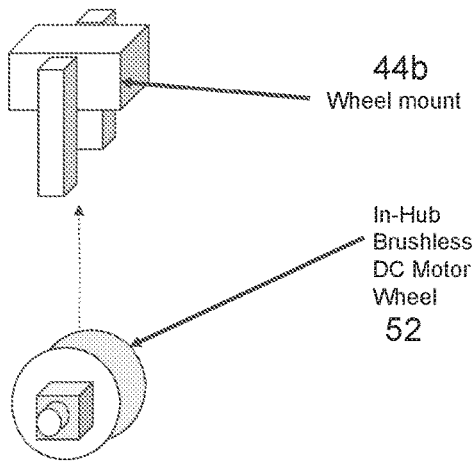
FIGS. 30-32 show various aspects of the manner in which a single wheel can be attached to an assistance device.
Figures 31, 32:
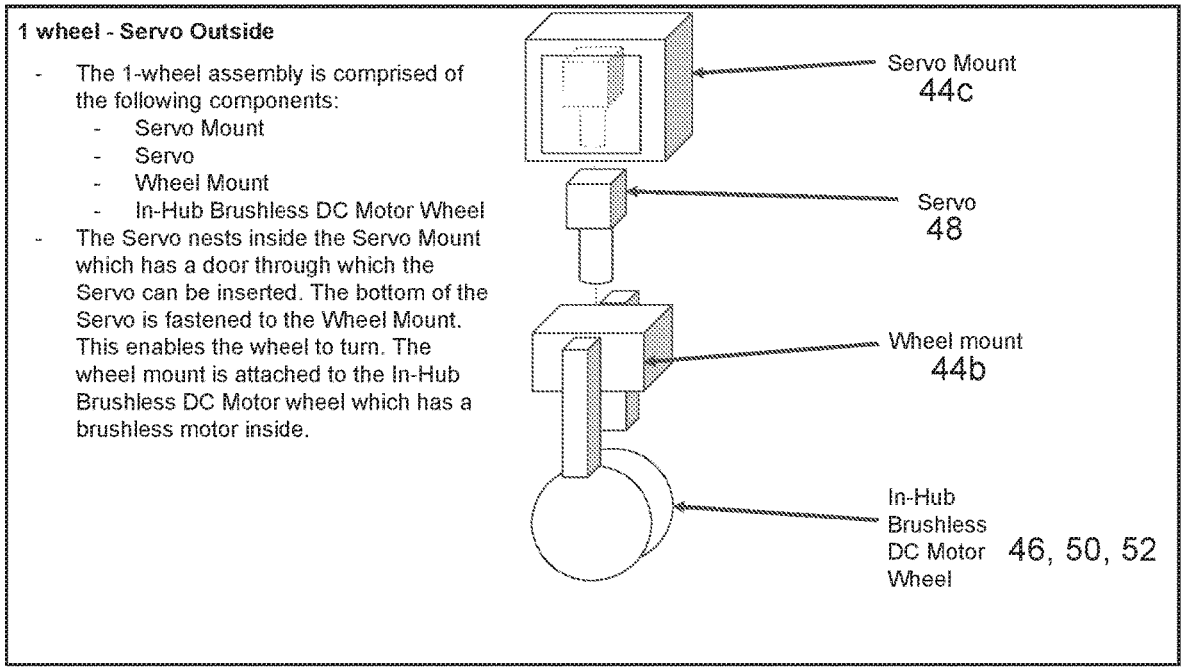
Figures 33, 34:
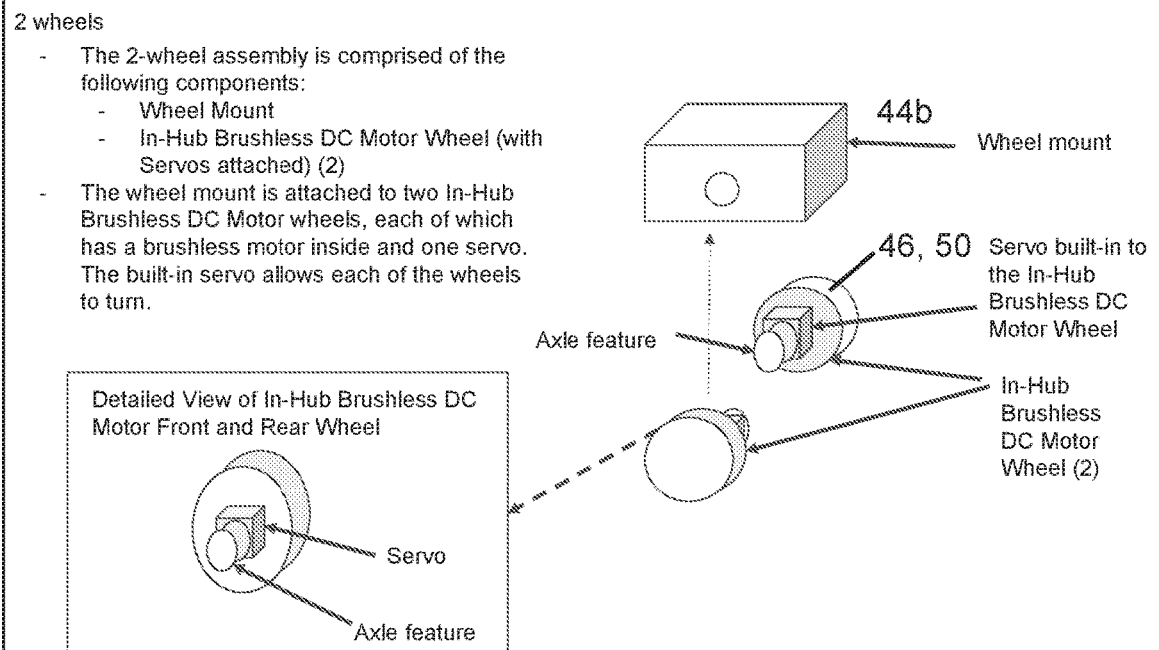
FIGS. 33 and 34 show various aspects of the configuration and mounting of 2 wheels to an assistance device.
Figure 35:
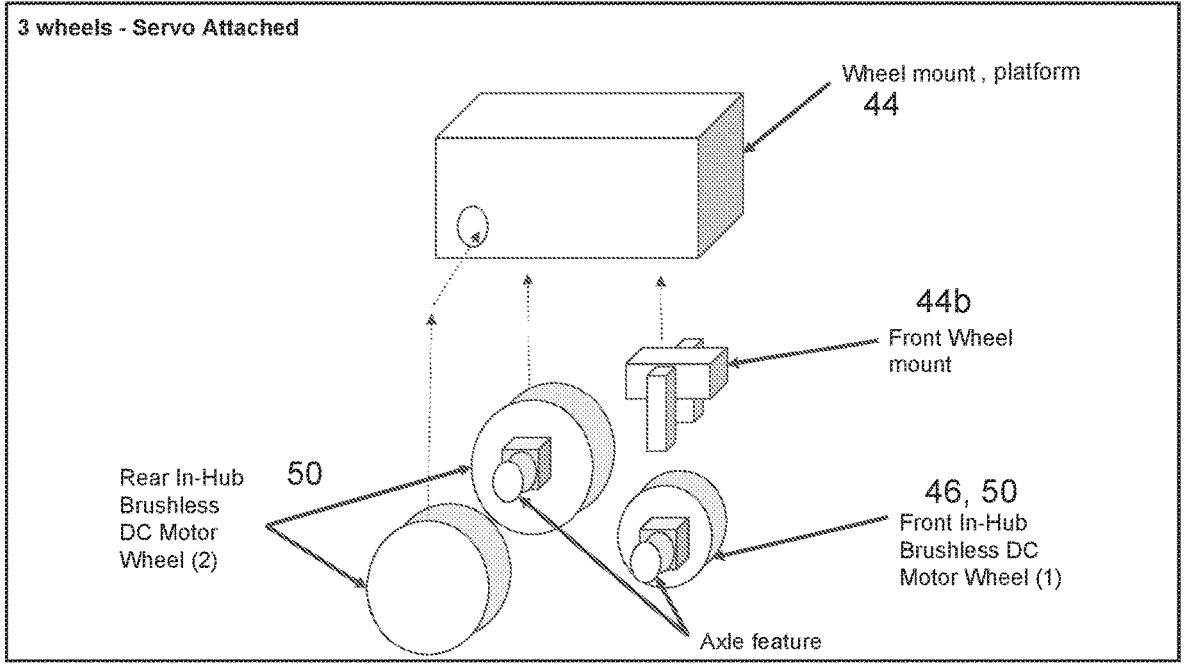
Figure 36:
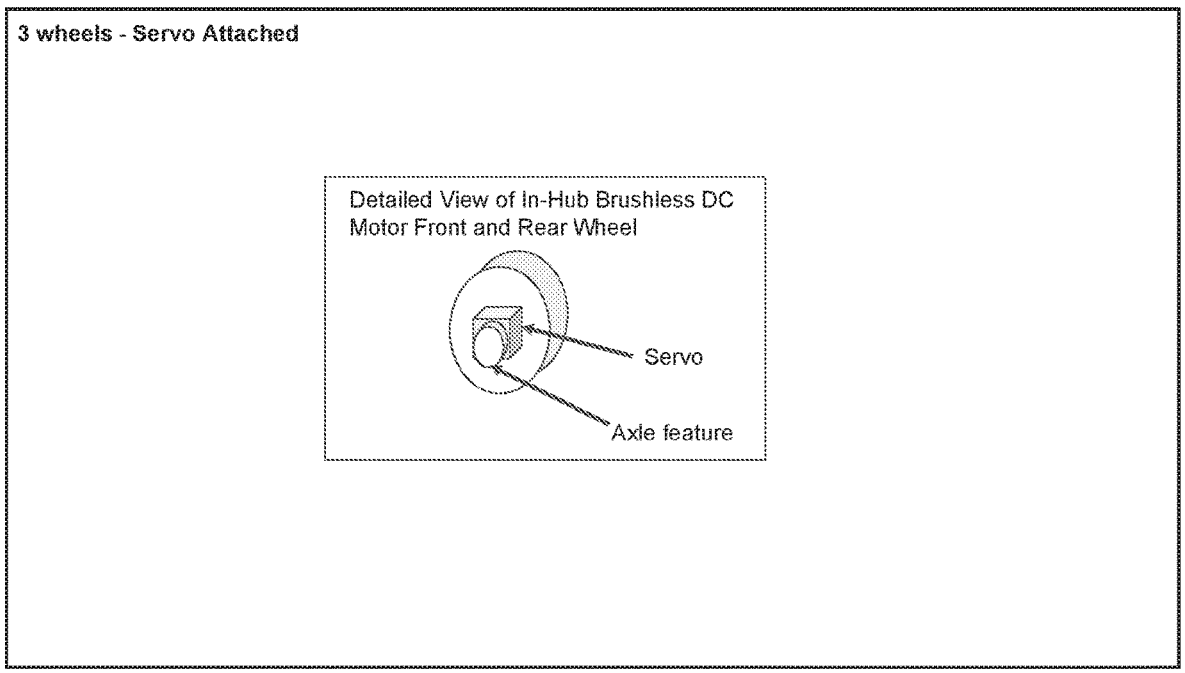
Figures 39, 40:
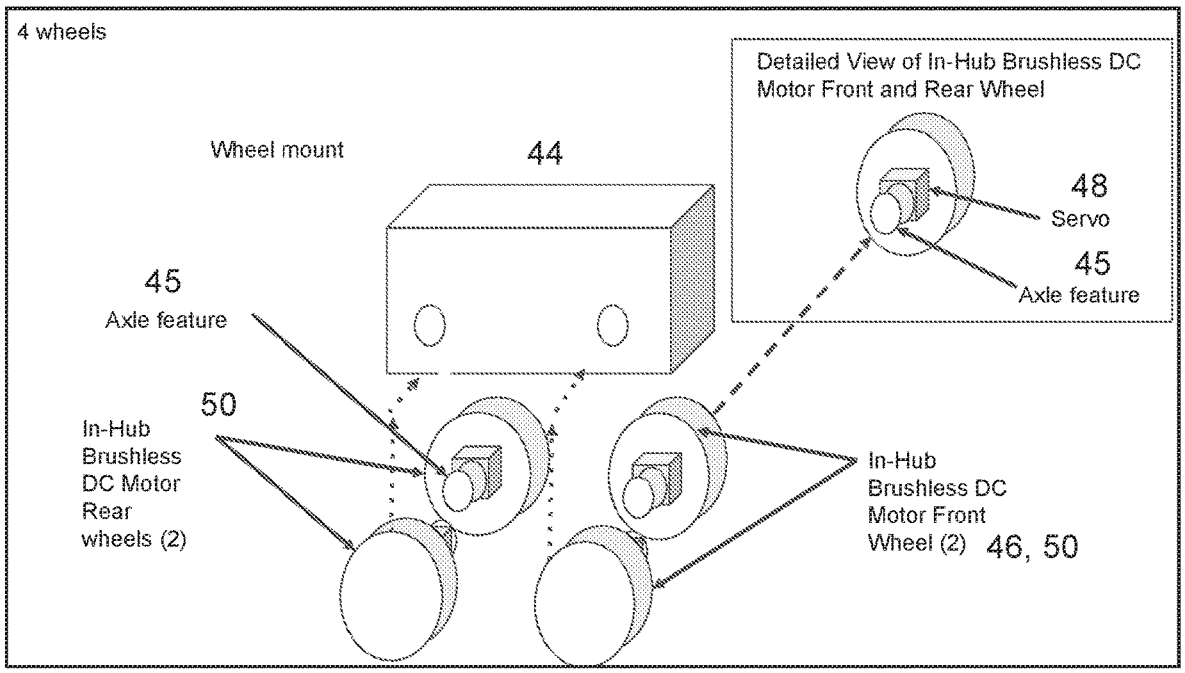
Figure 57:
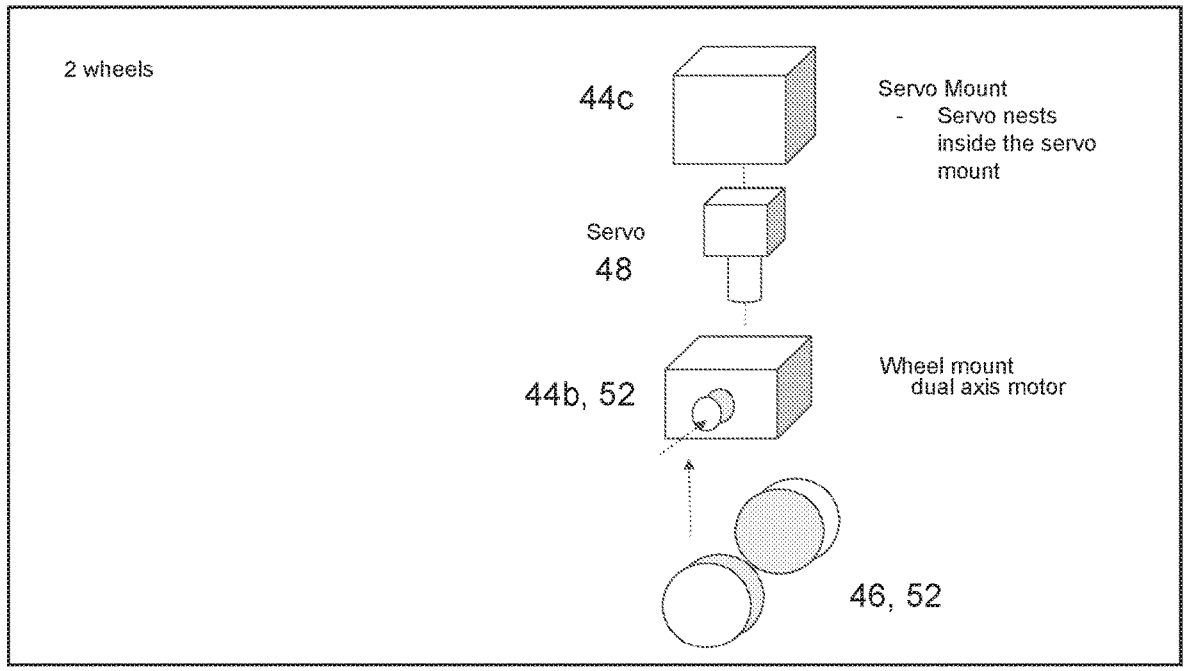
FIG. 57 shows various aspects of the configuration and mounting of 2 wheels to an assistance device.
Figure 58:
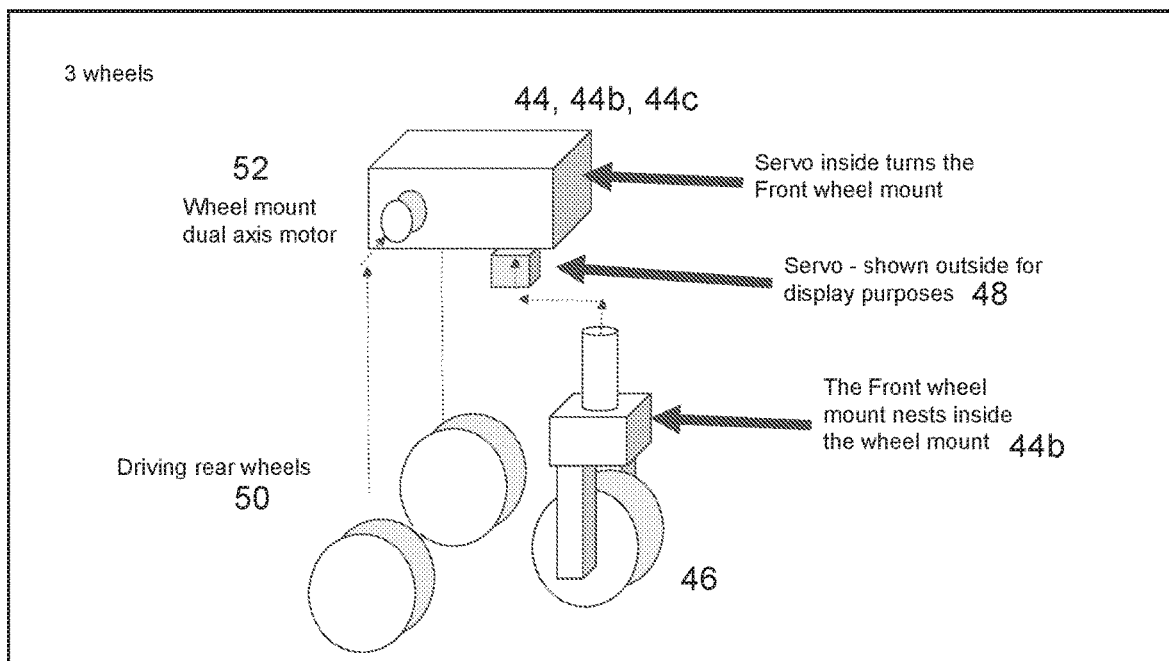
FIG. 58 shows various aspects of the configuration and mounting of 3 wheels to an assistance device.
Figure 59:
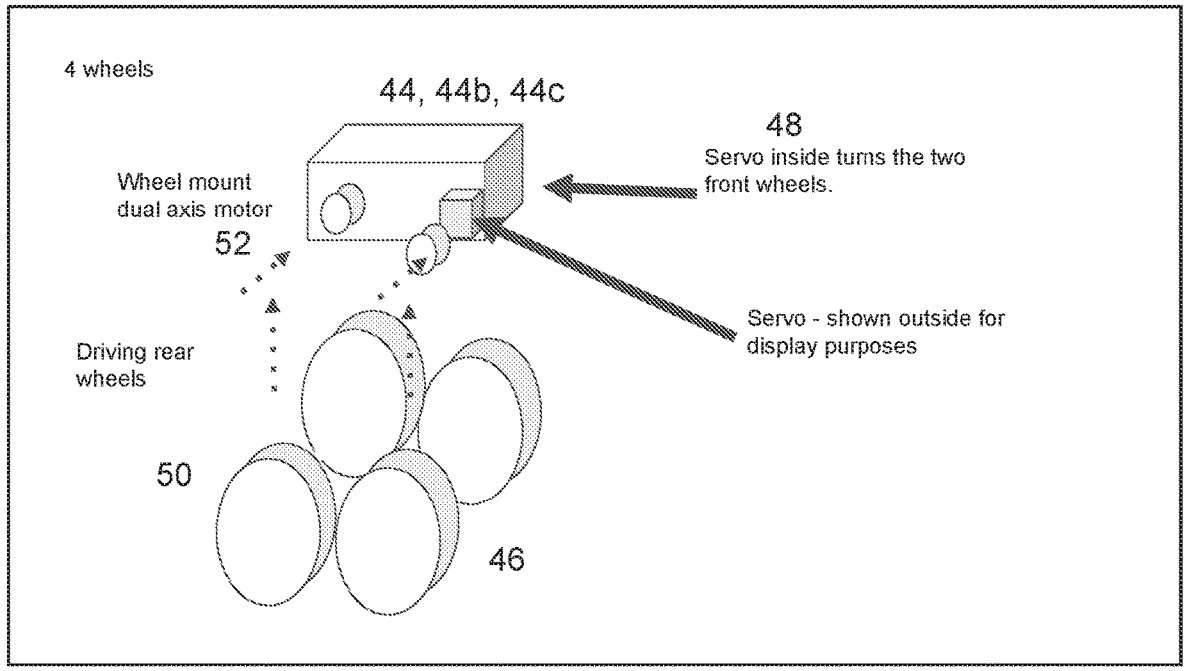
FIG. 59 shows various aspects of the configuration and mounting of 4 wheels to an assistance device.
Figure 60:
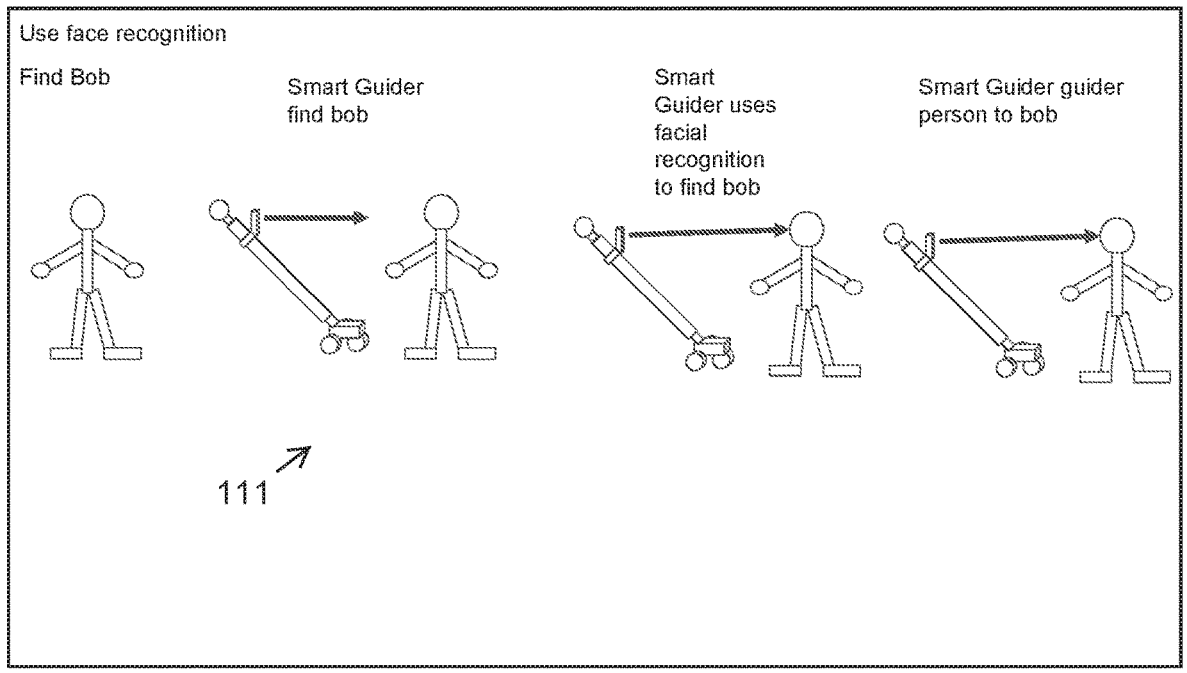
FIG. 60 is a schematic depiction of an assistance algorithm pertaining to facial recognition.
Figure 61:
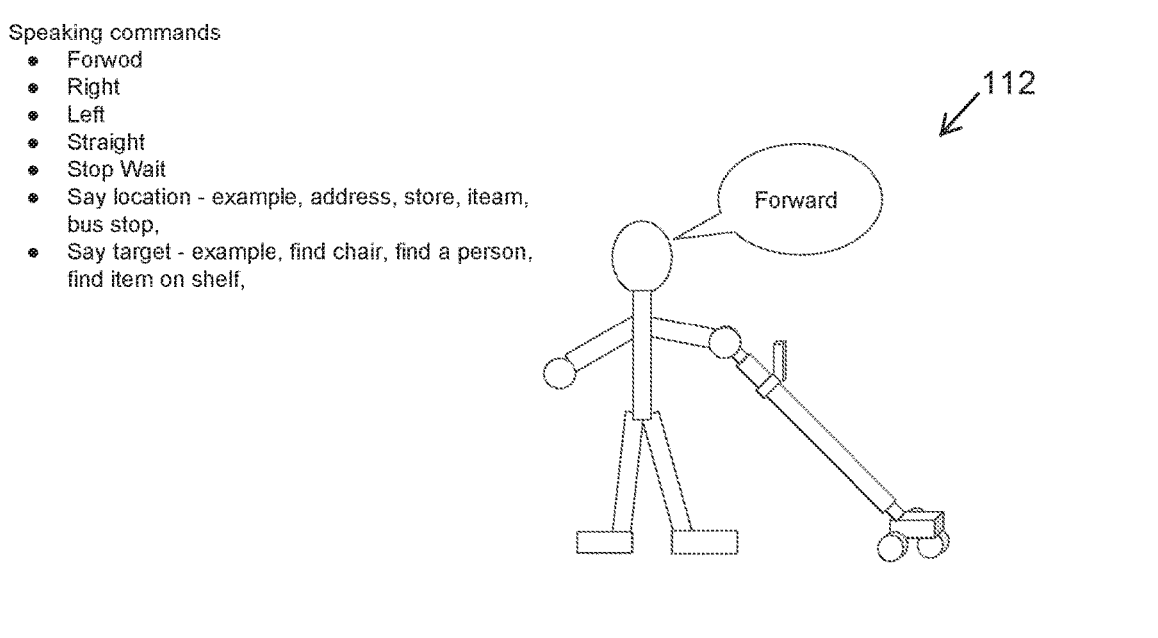
Figure 62:
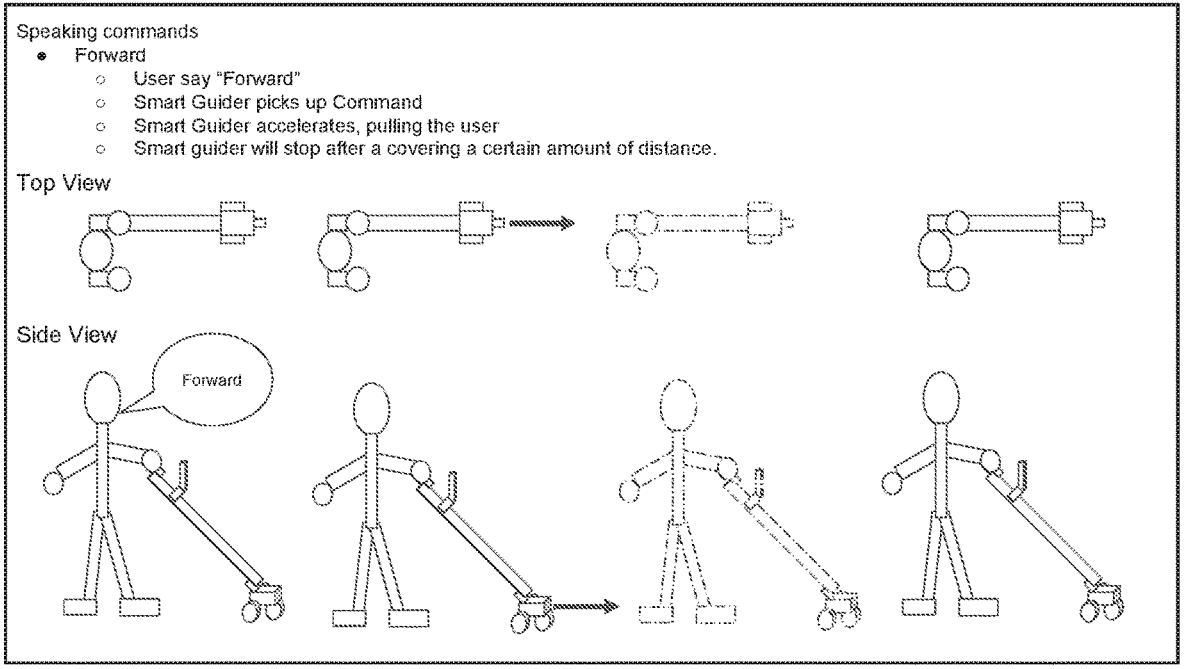
Figure 63:
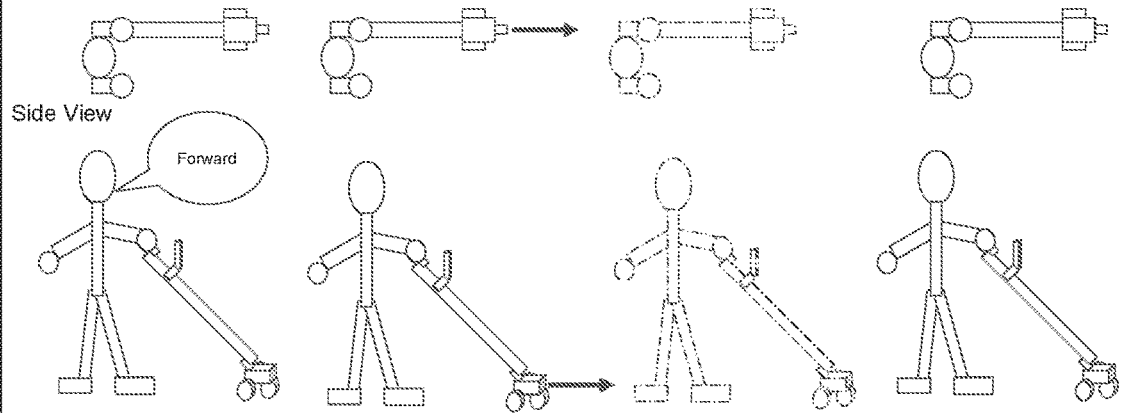
Figure 64:
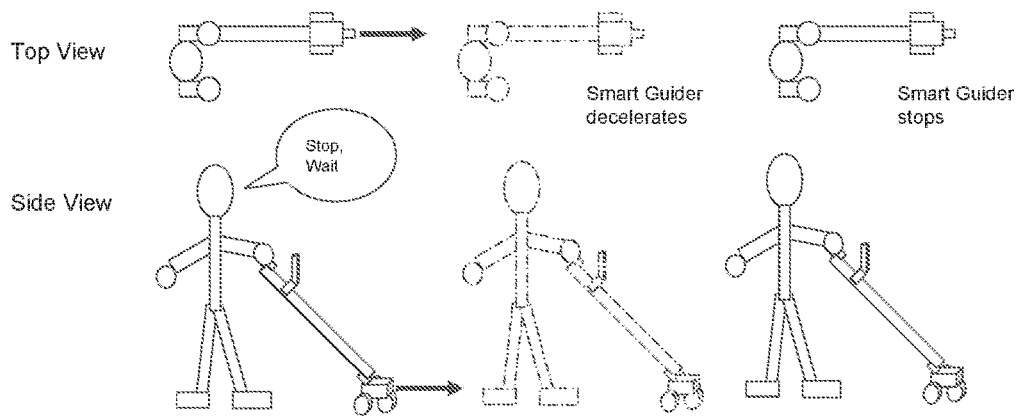
Figure 67:
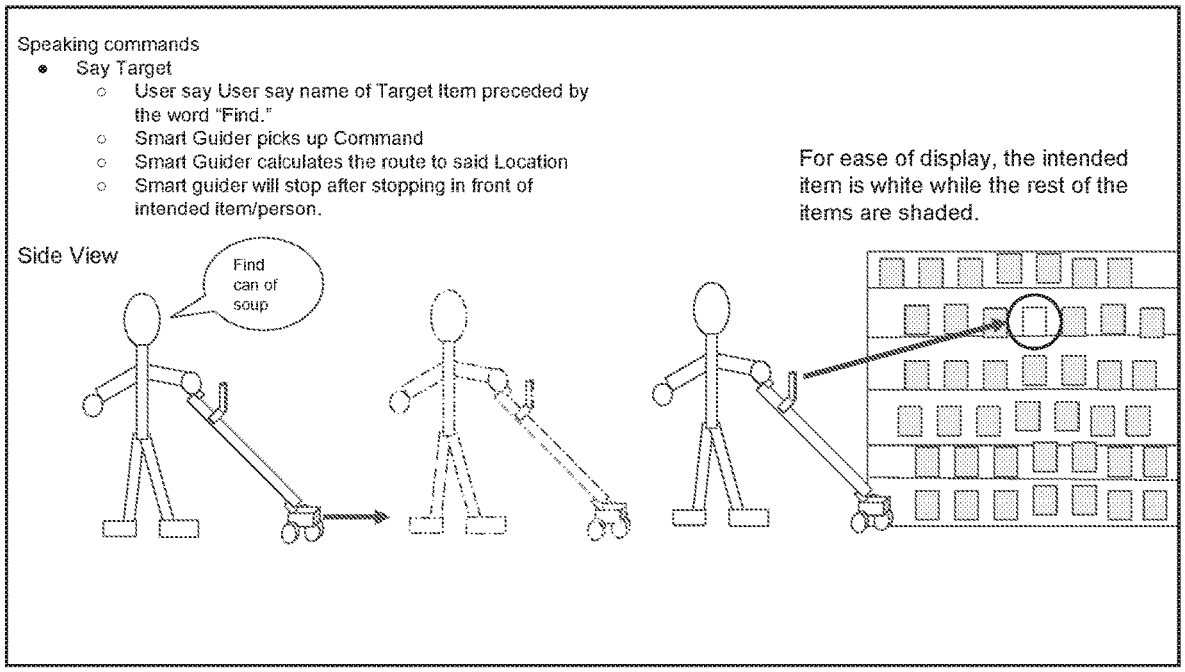
Figure 68:
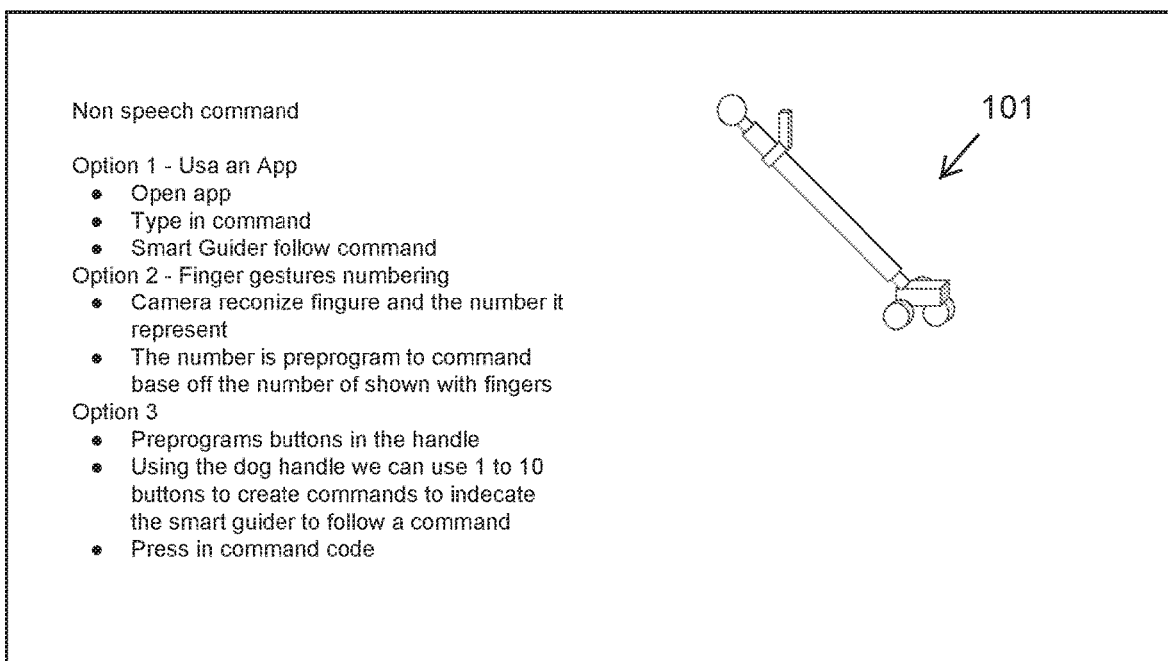
FIGS. 68, 69, 70, and 71 pertain to assistance algorithms utilizing non-speech commands, including the use of smart phone applications, keypads, and touch screens.
Figure 69:
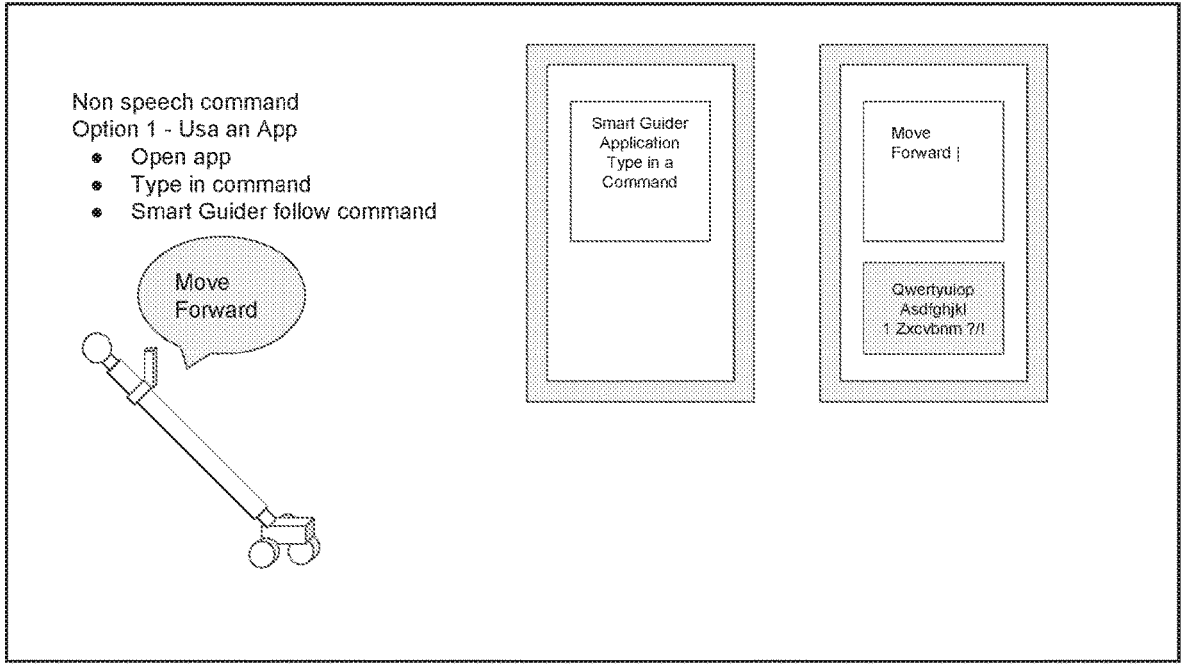
Figure 70:
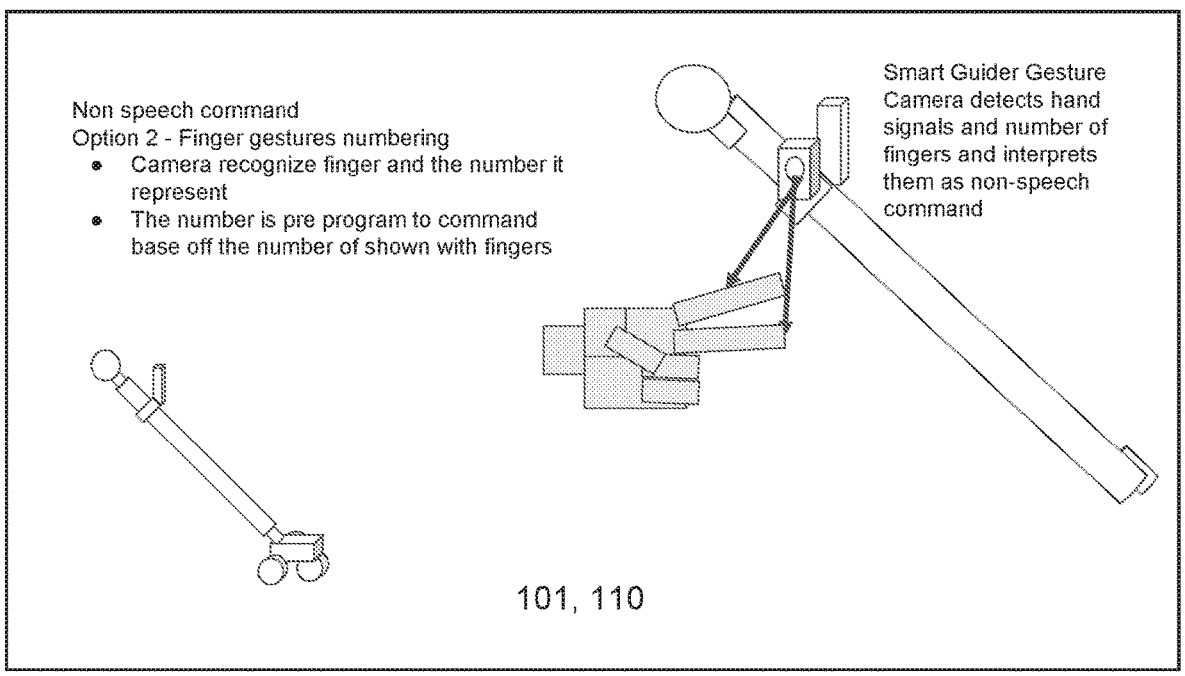
Figure 71:
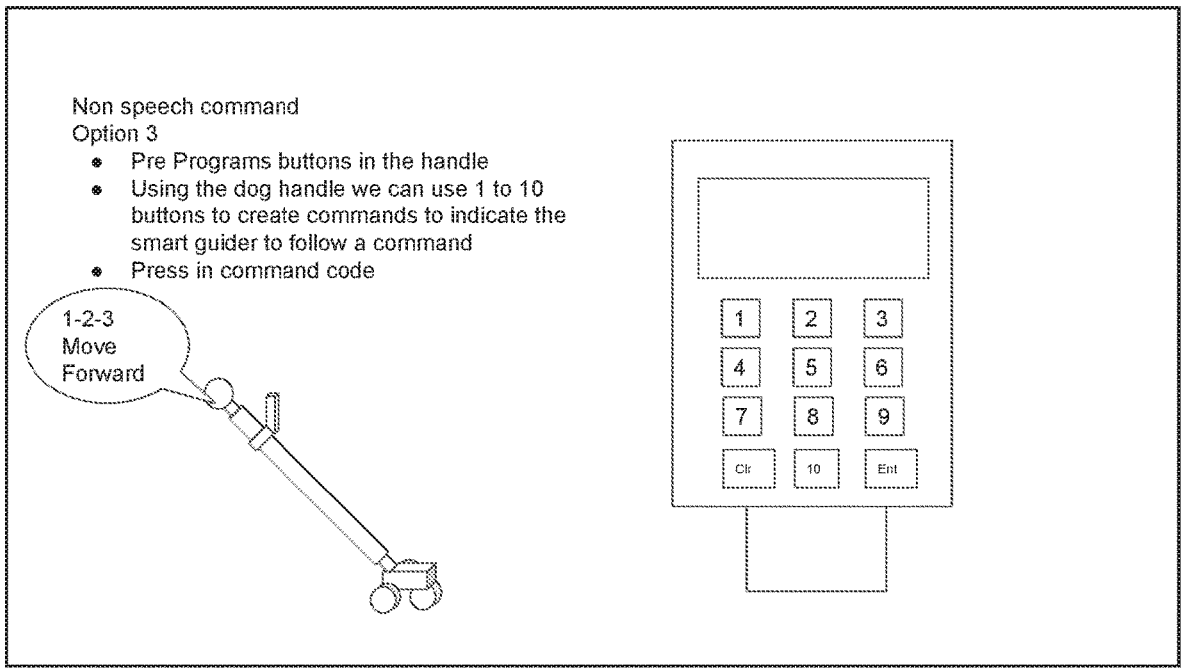
Figure 72:
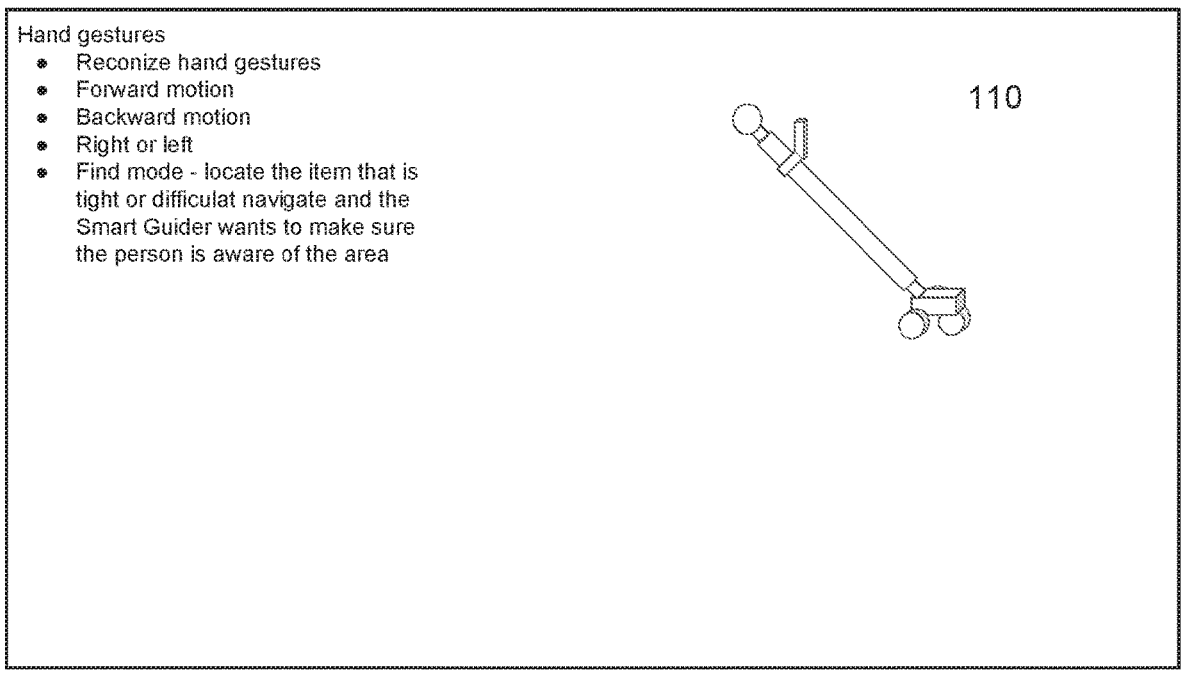
Figure 73:
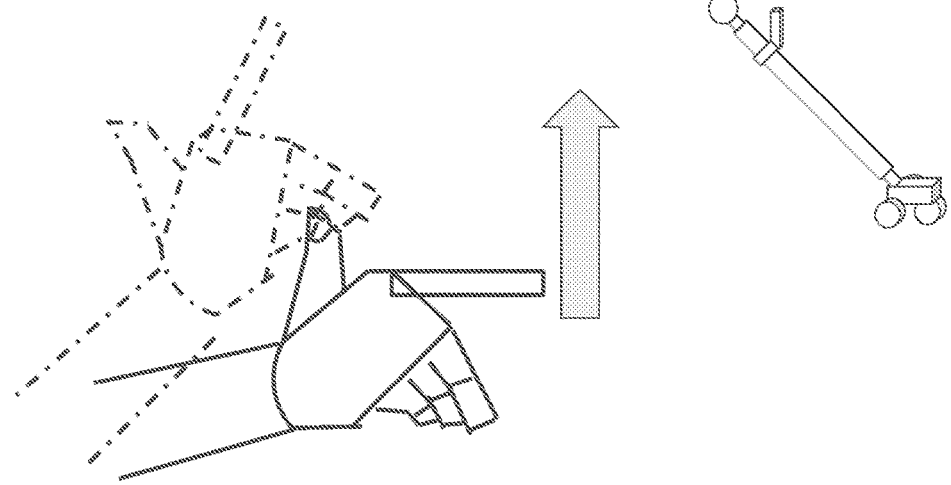
Figure 74:
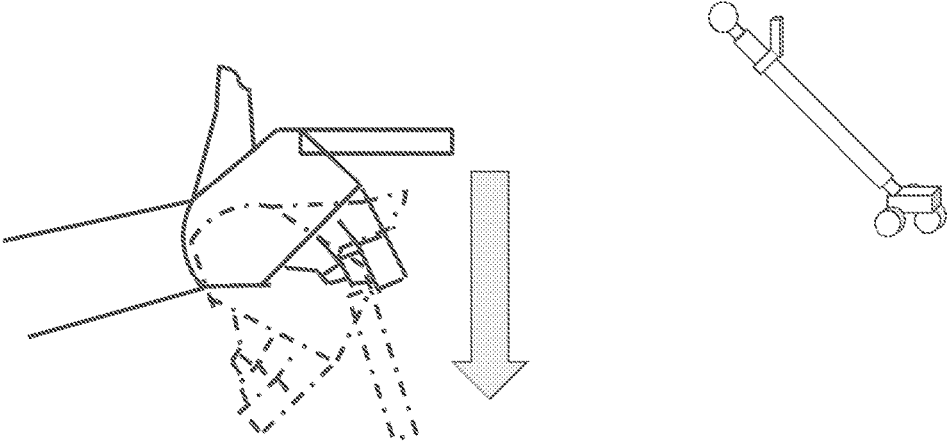
Figure 75:
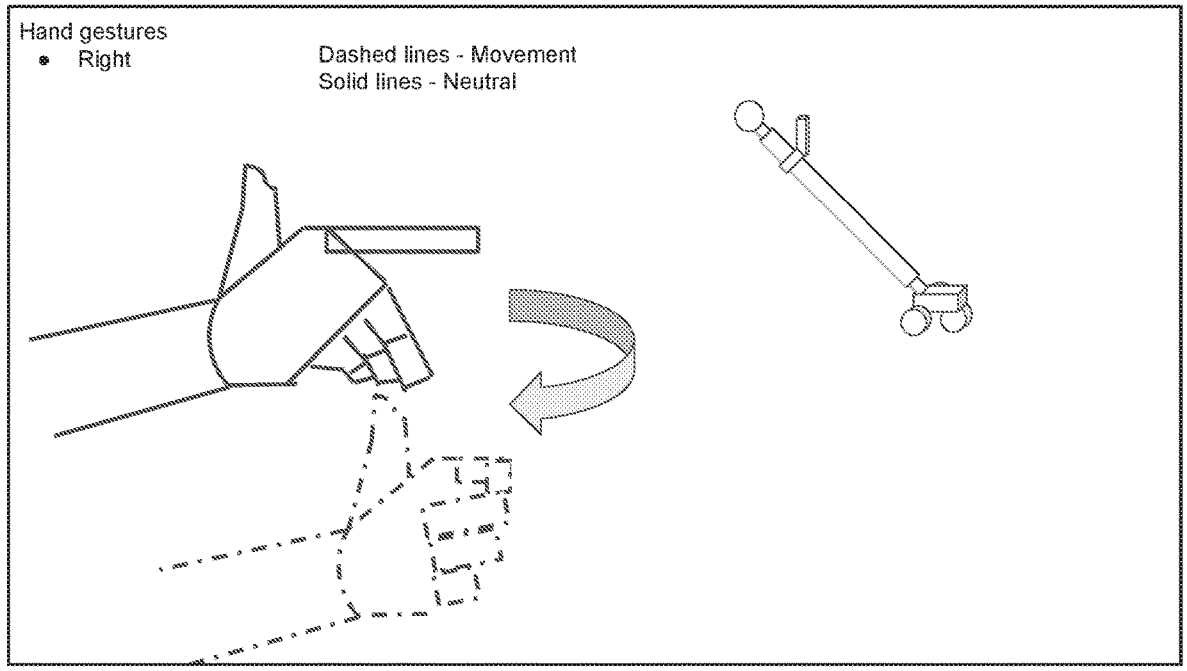
Figure 76:
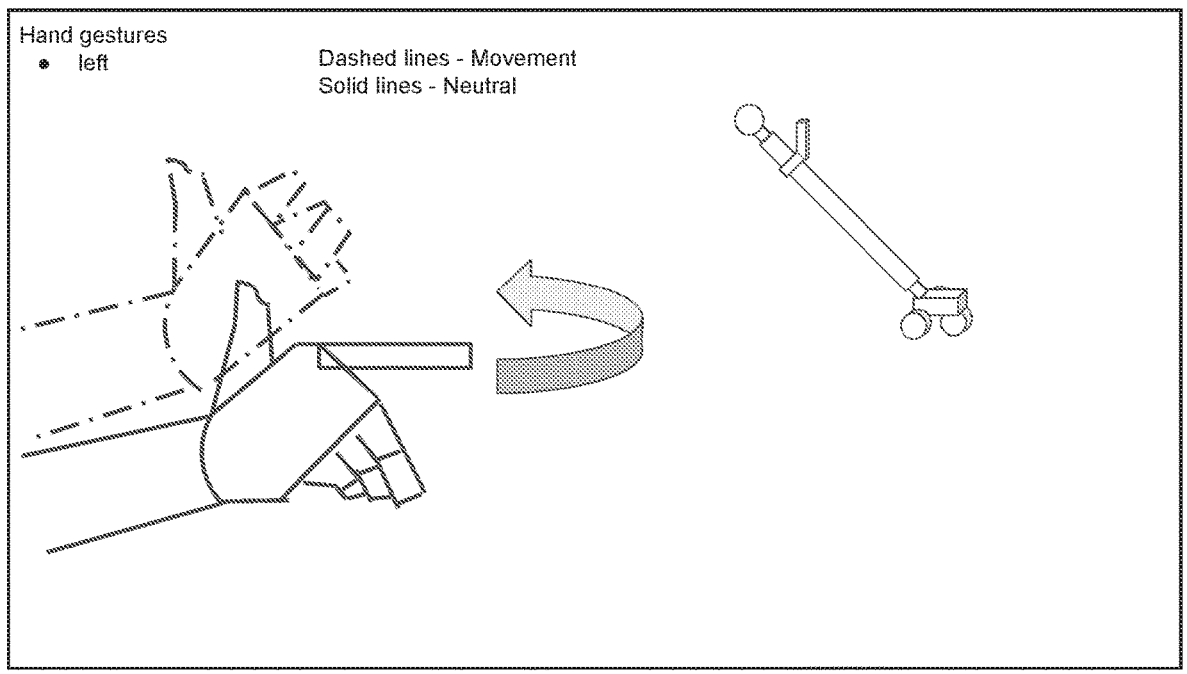
Figure 79:
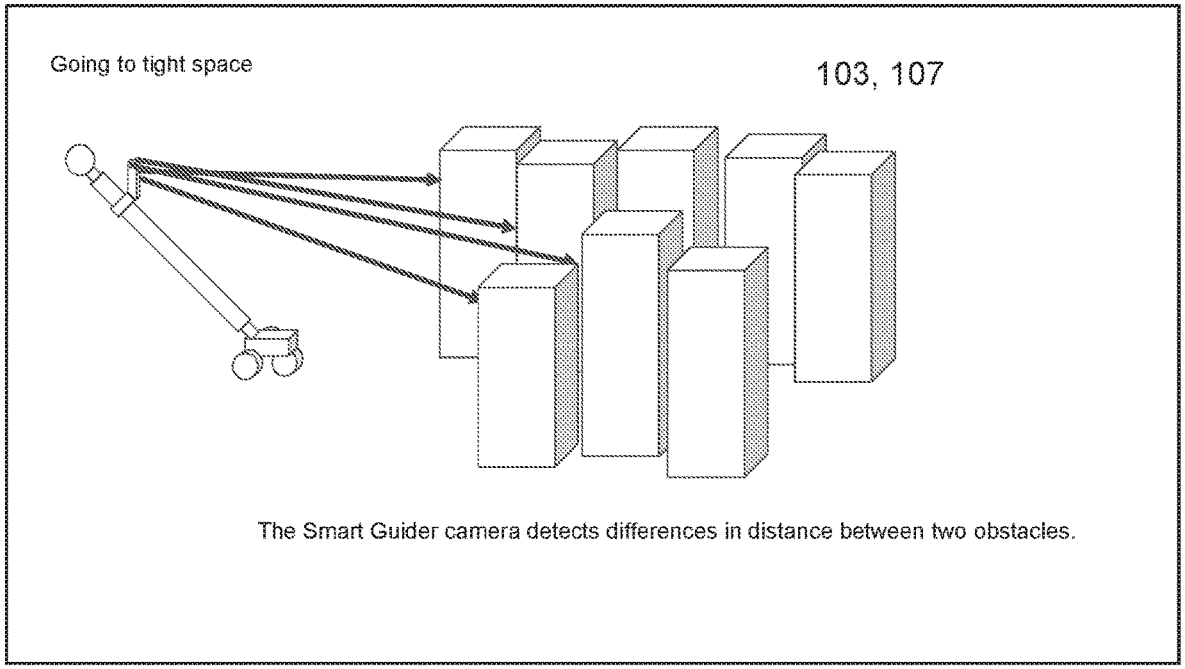
FIG. 79 pertains to an assistance algorithm in which the distance between obstacles is calculated.
Figure 80:
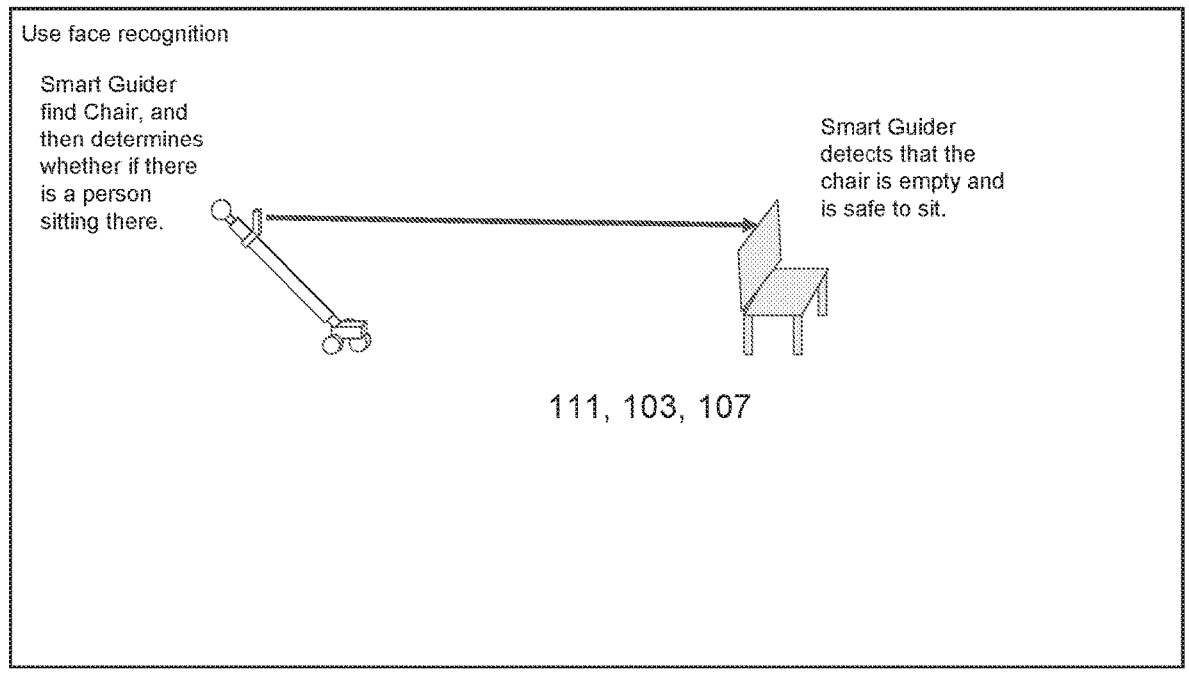
FIG. 80 pertains to an assistance algorithm in which facial recognition is utilized to determine if a chair is available for sitting.
Figure 81:
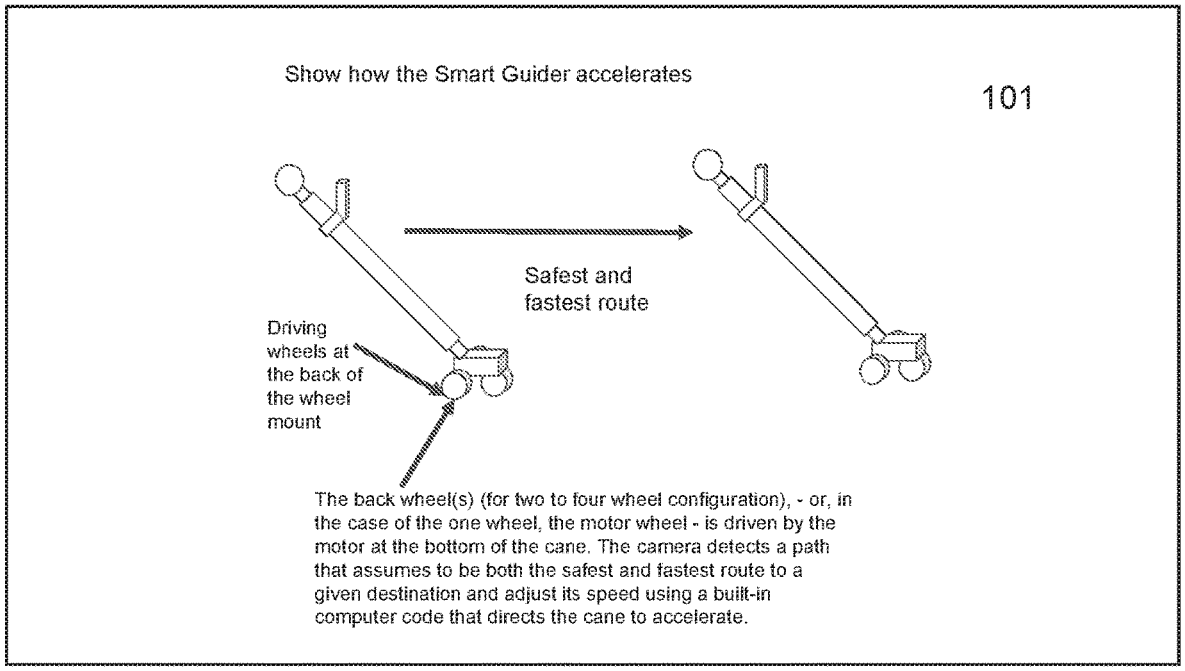
FIG. 81 pertains to an assistance algorithm in which a pathway or route is calculated, and the acceleration of the assistance device for moving along that pathway.
Figure 82:
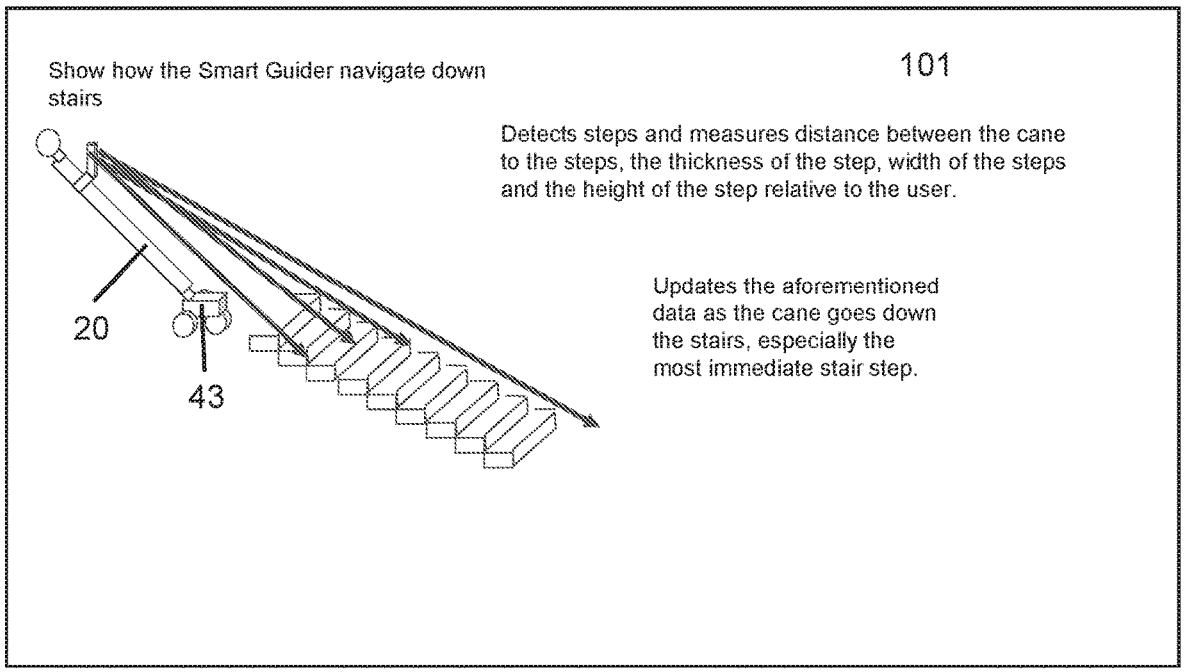
FIG. 82 pertains to an assistance algorithm for traversing stairs, and including a method in which a camera calibrates the distances in the image of the pathway in front of it by taking an image of a measurement device attached to the assistance device, the measurement device being of a known length.
Figure 83:
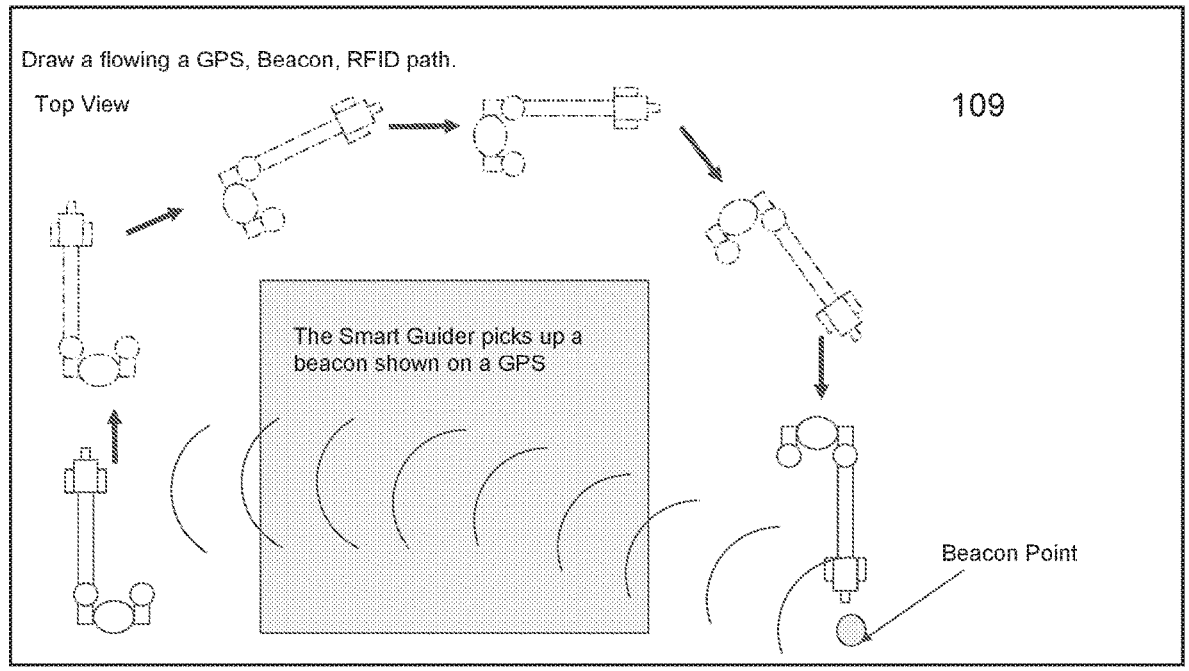
FIGS. 83 and 84 depict an assistance algorithm in which a pathway is determined by using one or more of a GPS signal, beacon point, or RFID tag.
Figure 84:
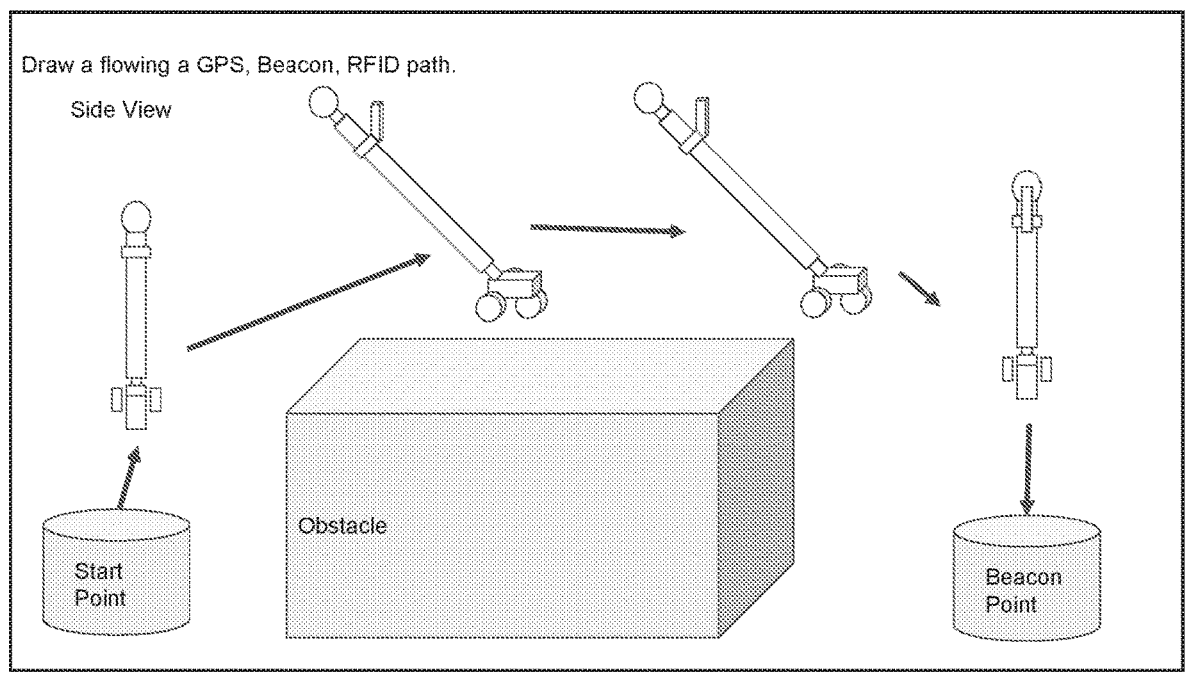
Figure 85:
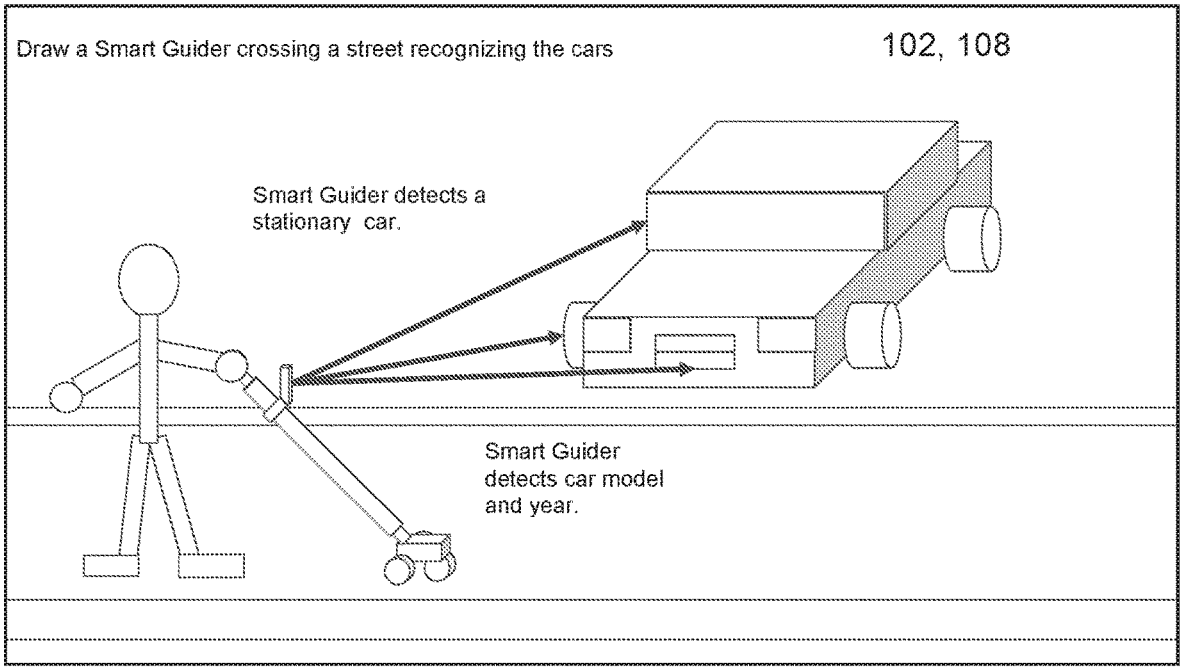
FIGS. 85 and 86 pertain to an assistance algorithm in which a safe path across a street with traffic is determined.
Figure 86:
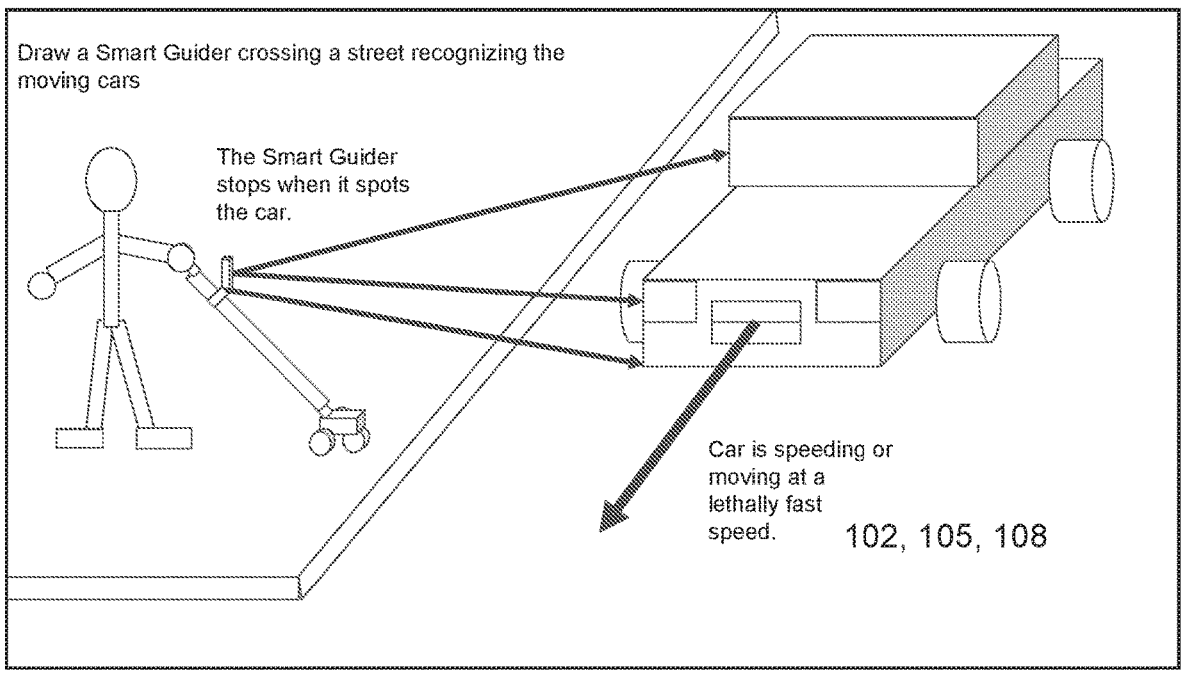
Figure 87:
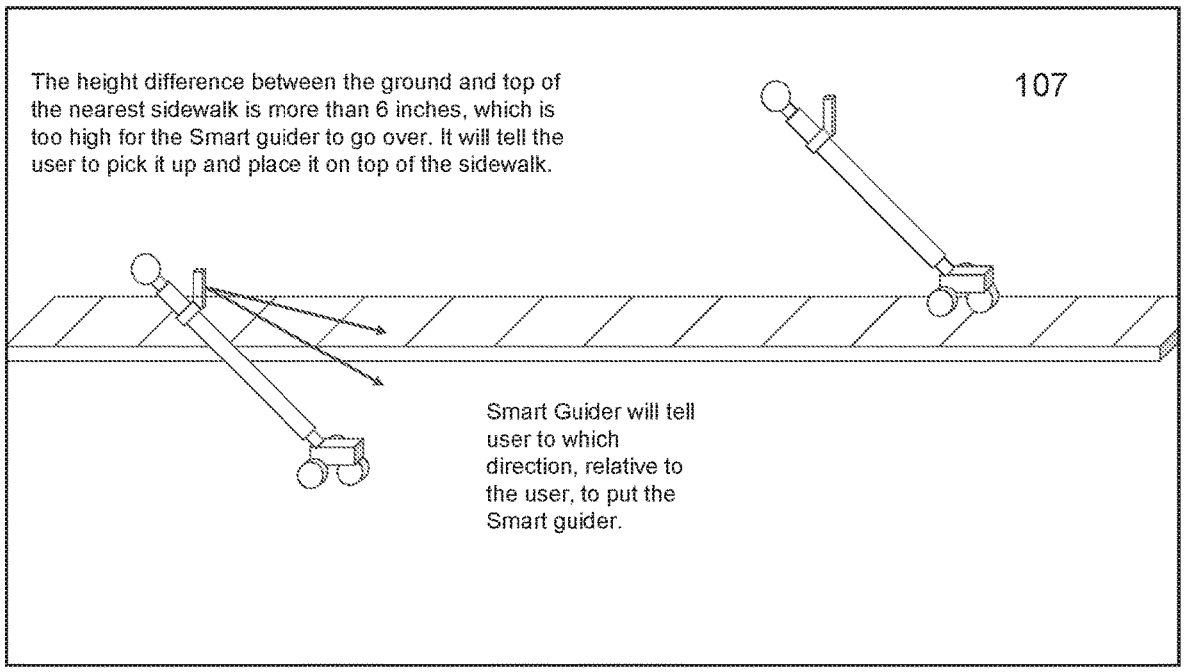
FIG. 87 pertains to an assistance algorithm in which a path is calculated relative to a sidewalk.
Figure 88:
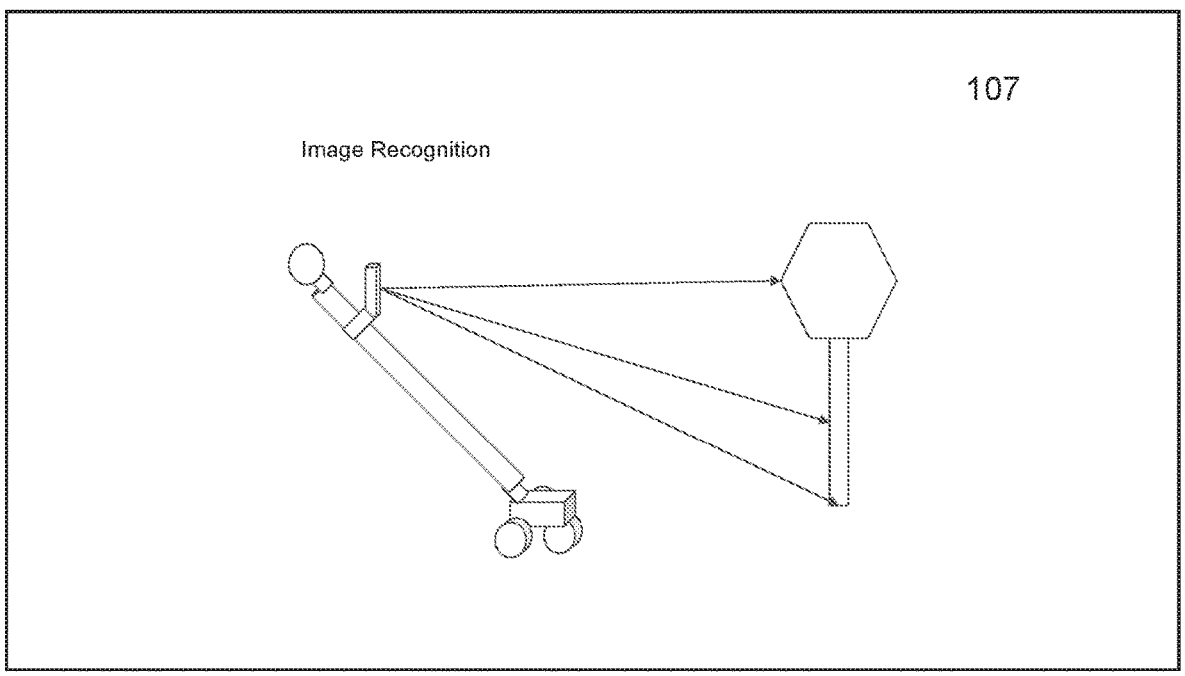
FIGS. 88 and 89 pertain to assistance algorithms involving image recognition.
Figure 89:
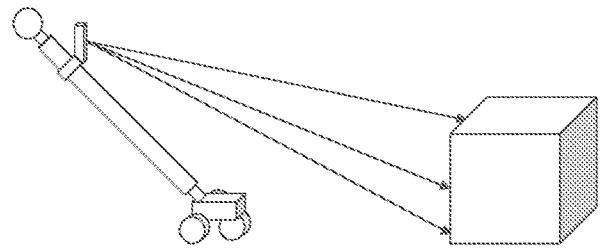
Figure 90:
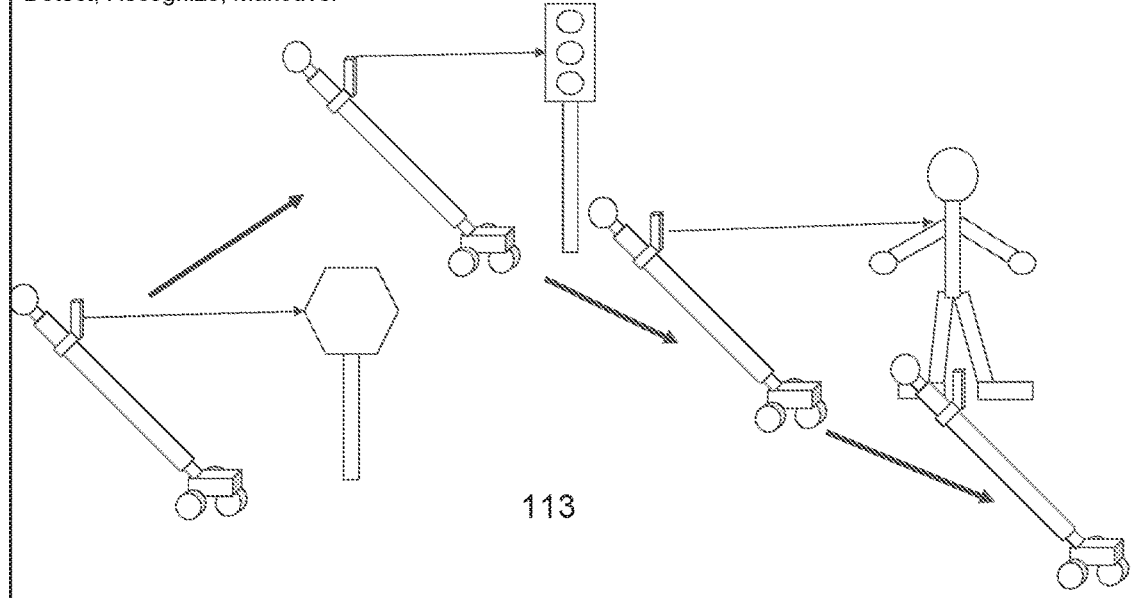
FIGS. 90, 91, 92, 93, and 94 pertain to an assistance algorithm in which a pathway is detected having multiple objects or persons, and a multi-segment pathway is determined, including detecting, recognizing, and maneuvering or navigating about multiple objects, each of the objects having different static and/or dynamic characteristics. For example, a stop sign is unchanging. A stop light remains in a static location, but has a dynamic meaning. Finally, a person is dynamic both with regards to where they are located, and further with regards to what future actions will be taken.
Figure 91:
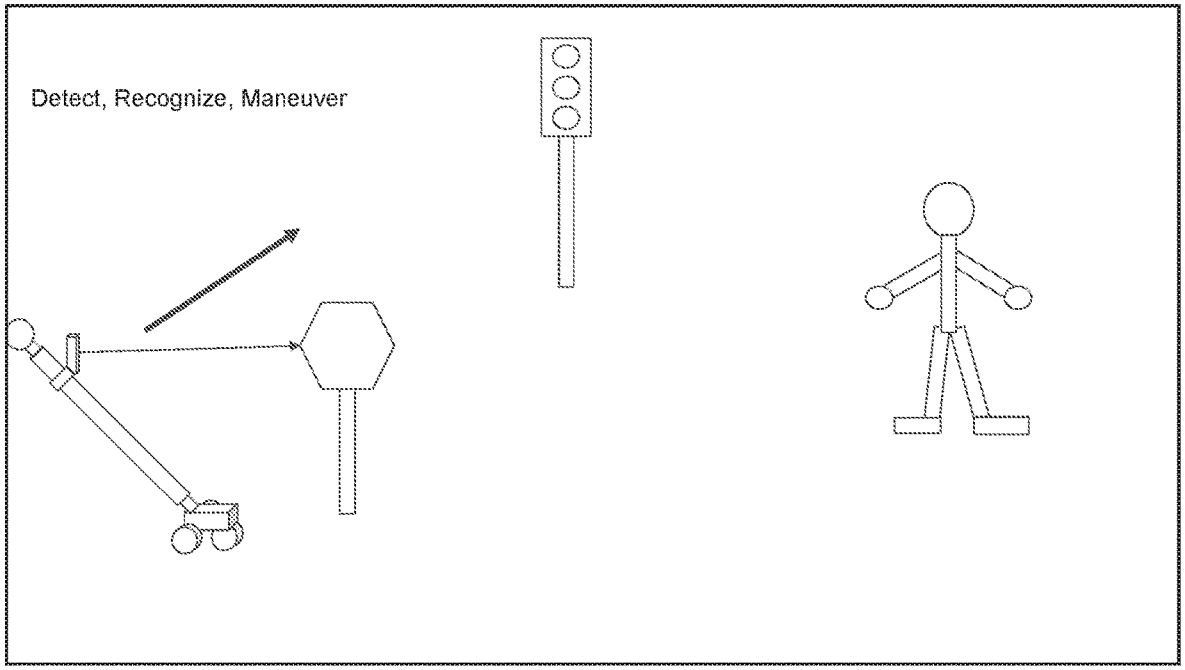
Figure 92:
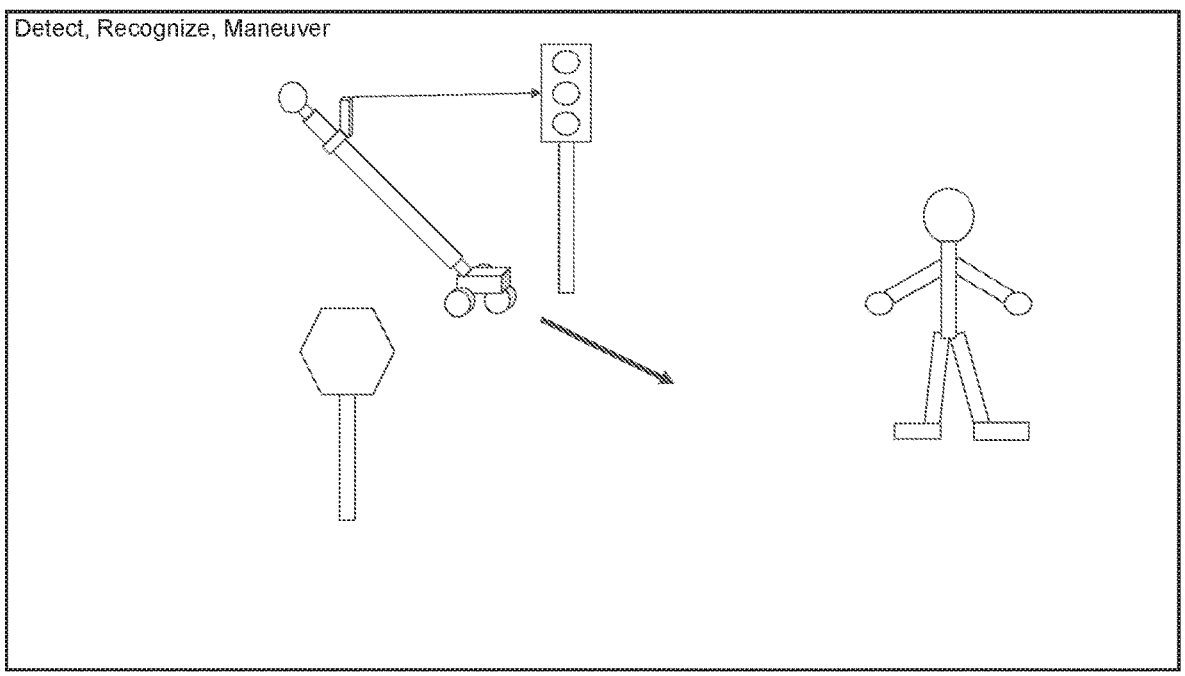
Figure 93:
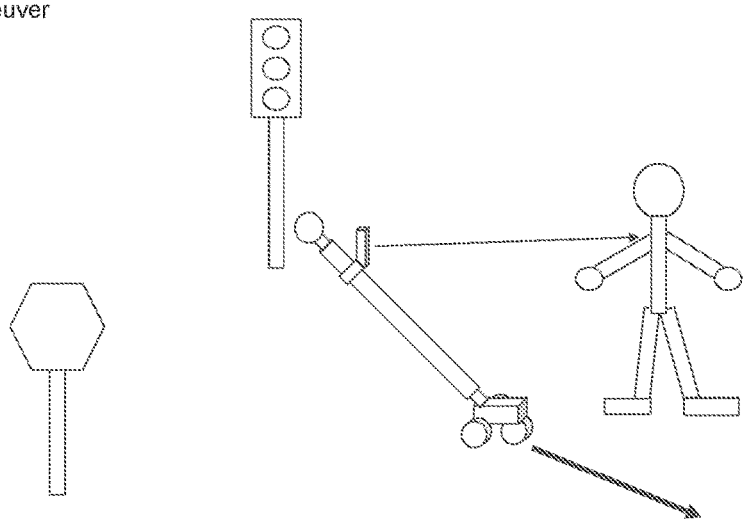
Figure 94:
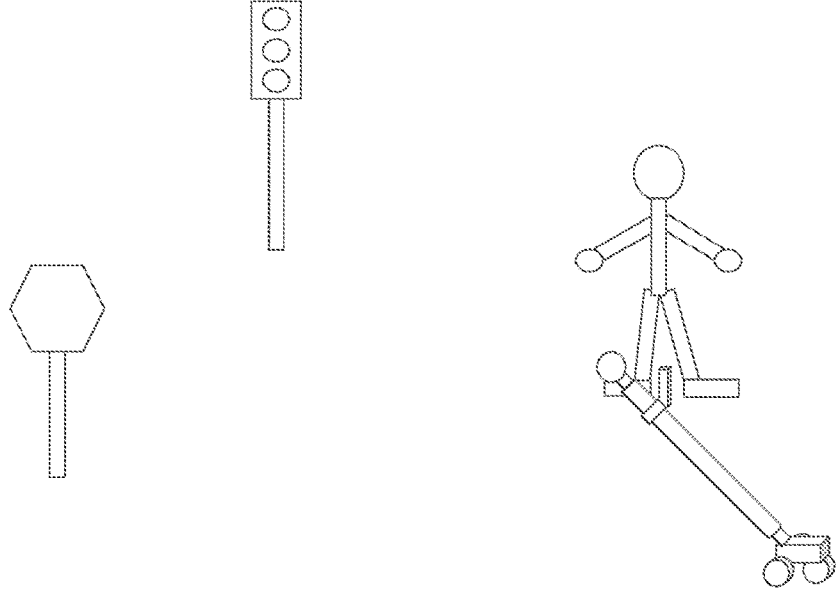
Figure 95:
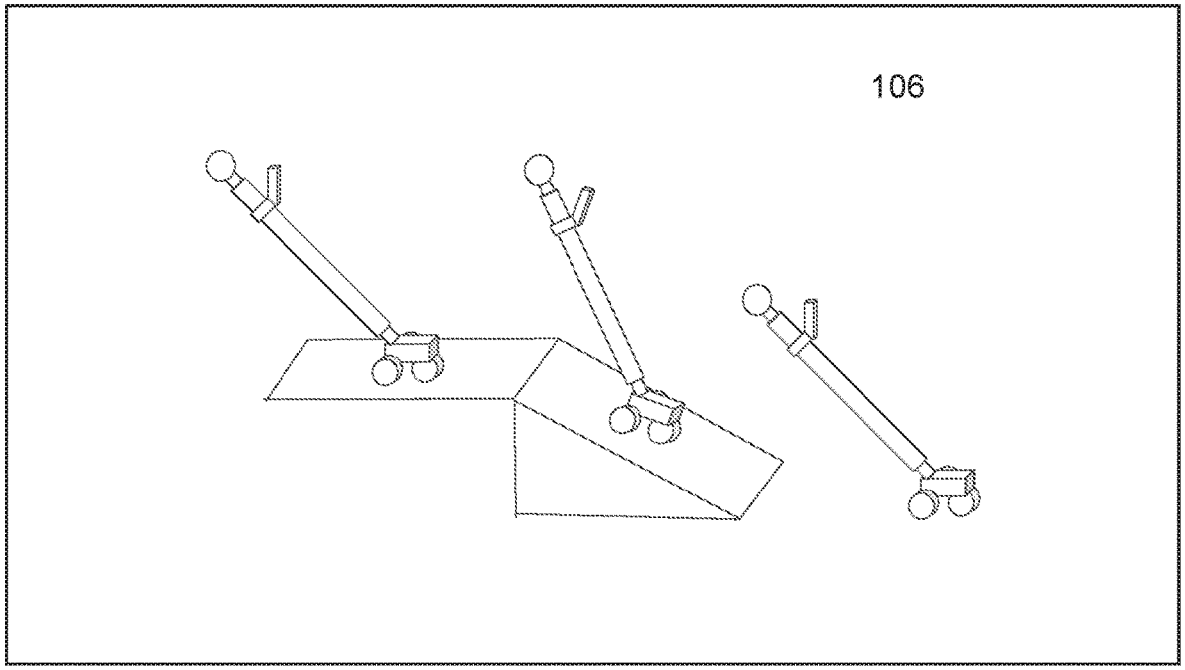
FIGS. 95 and 96 pertain to an assistance algorithm in which the pathway includes a ramp.
Figure 96:
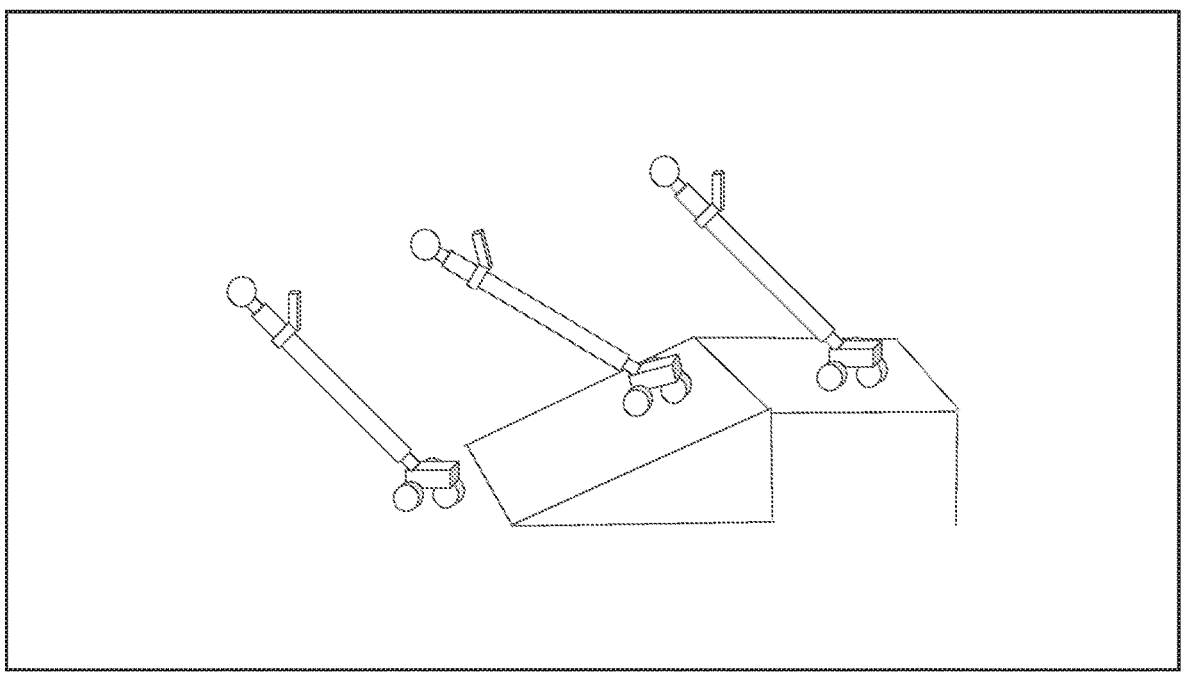
Figure 97:
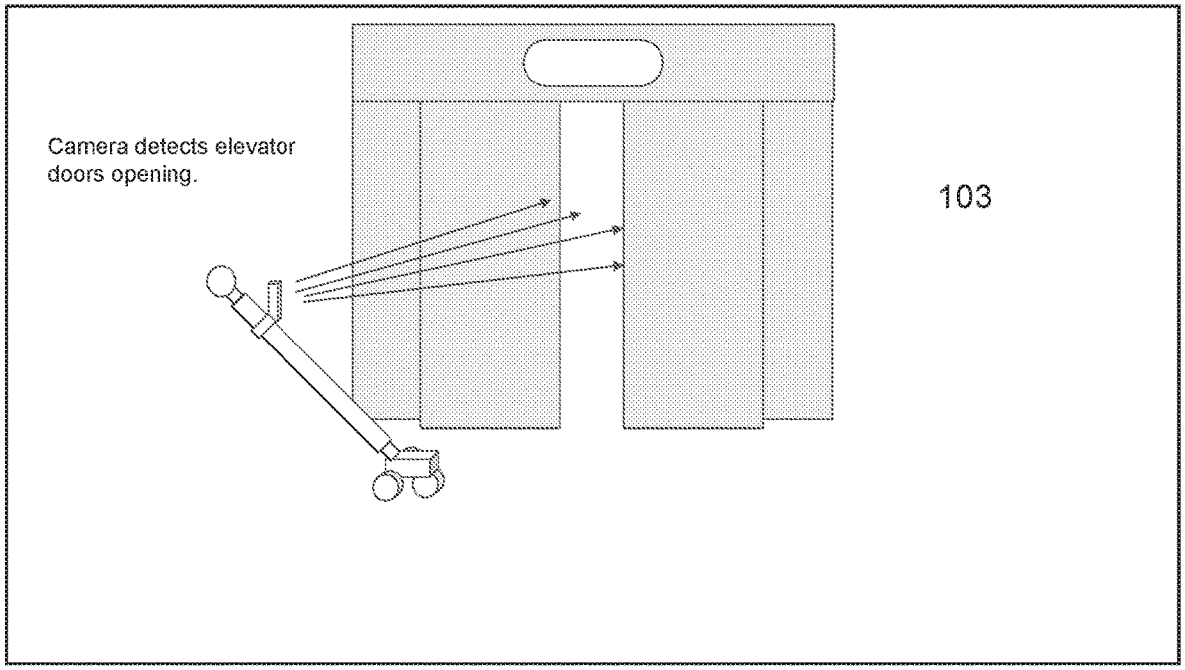
FIGS. 97, 98, 99 and 100 pertain to assistance algorithms in which various objects are detected, including elevator doors (esp. when sliding open or closed), doors having a sign, vehicles, and a room in a restaurant with multiple objects.
Figure 98:
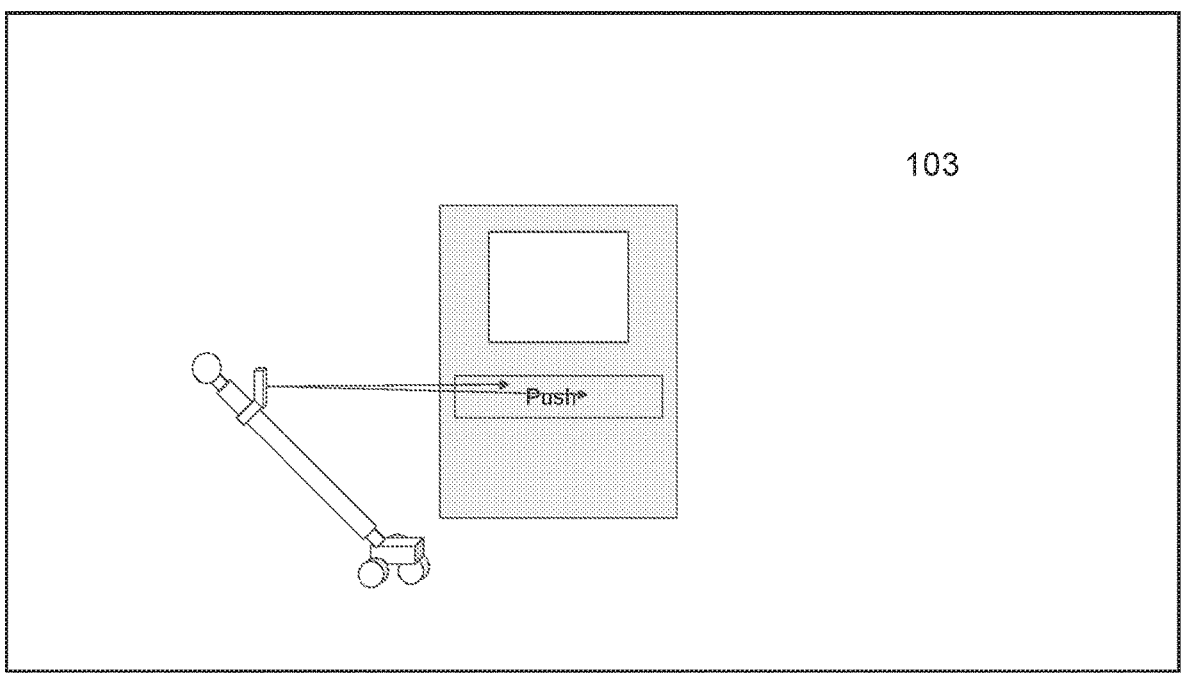
Figure 99:
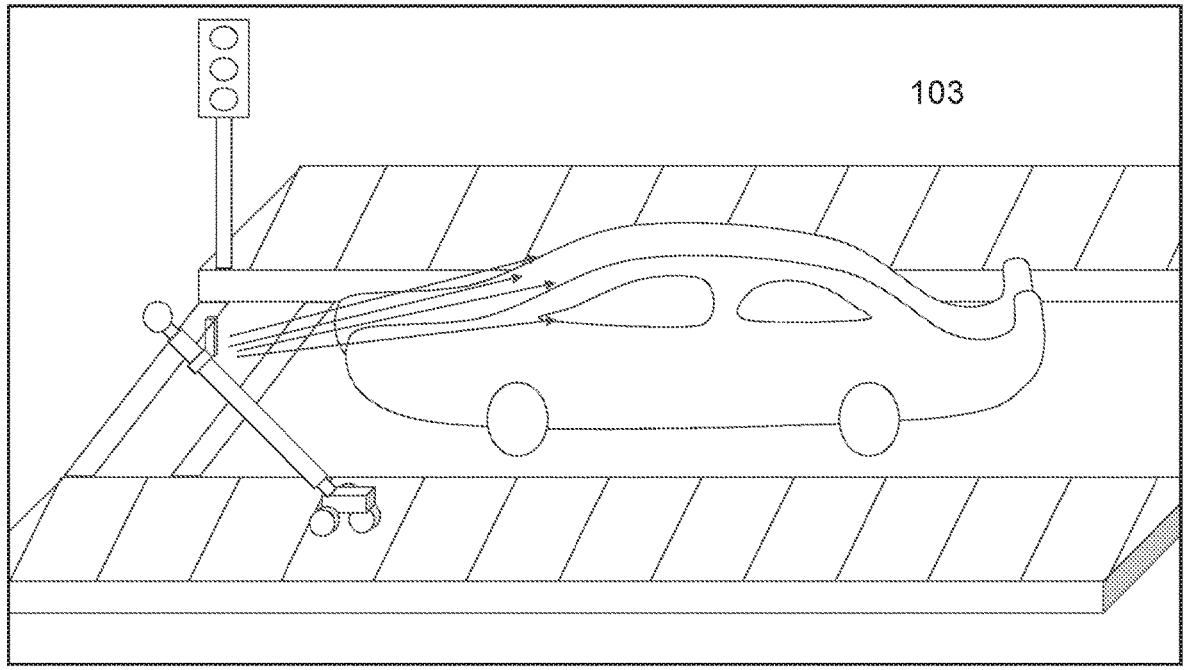
Figure 100:
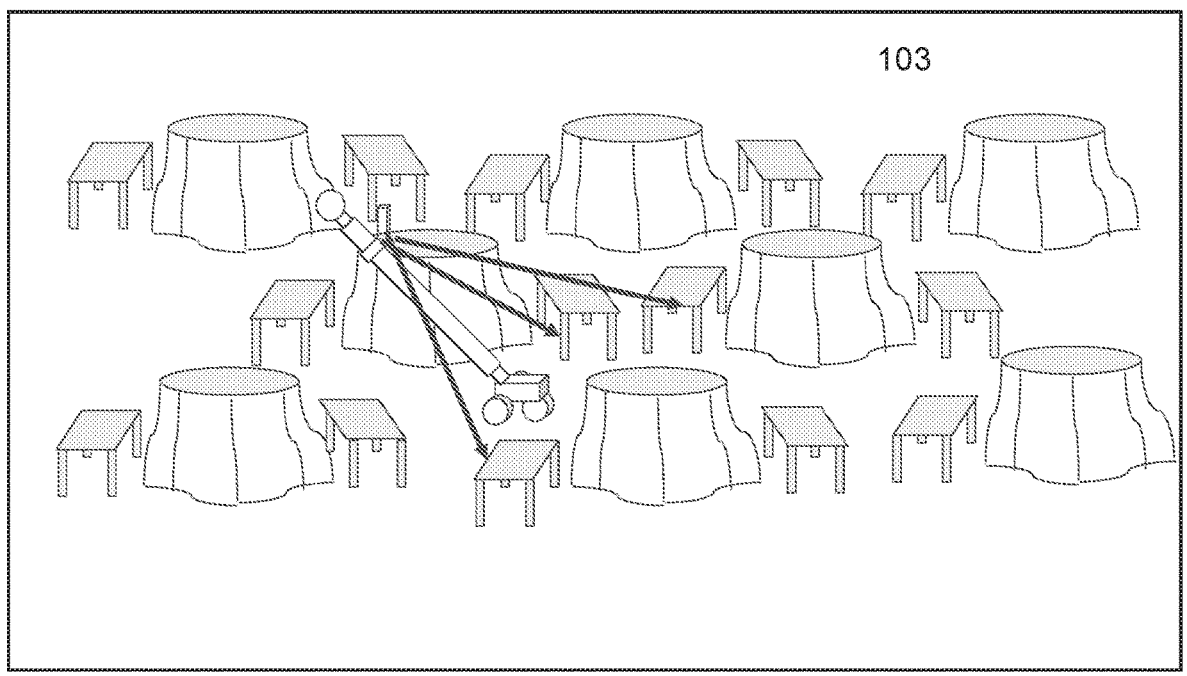
Figure 101:
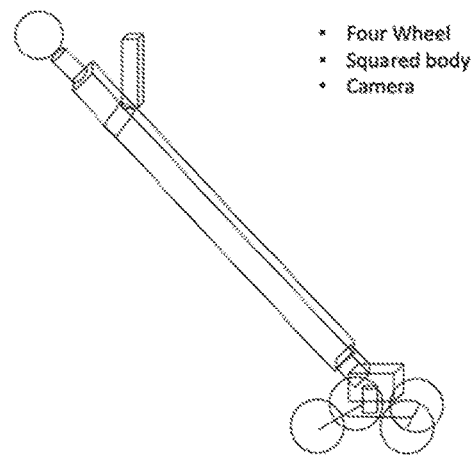
FIGS. 101-130 pertain to various configurations of assistance devices, including one or more wheels, various types of handles, various input devices, and various sensors.
Figure 102:
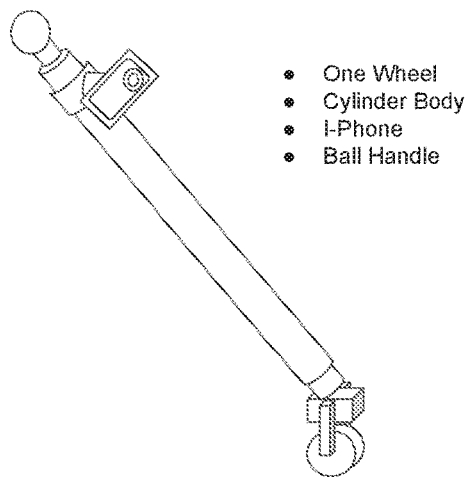
Figure 103:
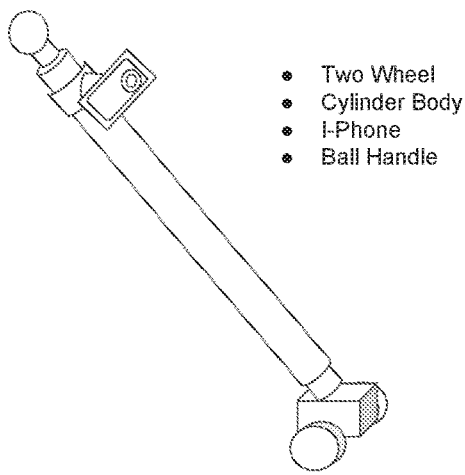
Figure 104:
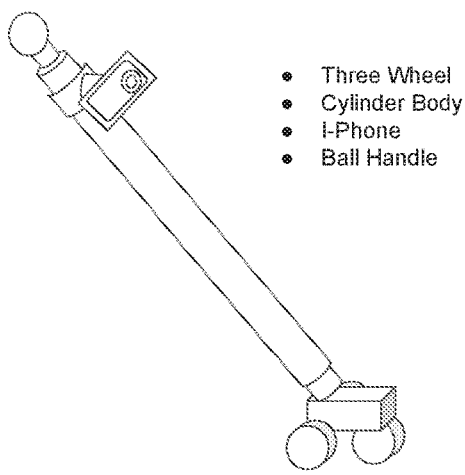
Figure 105:
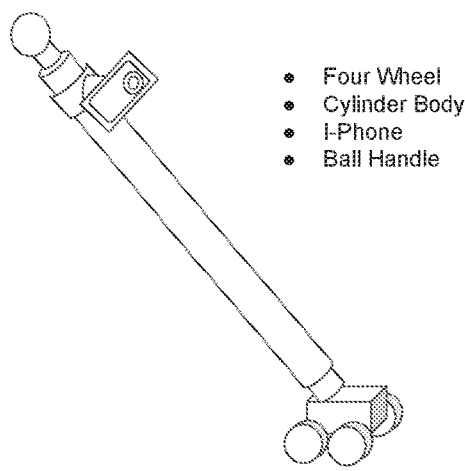
Figure 106:
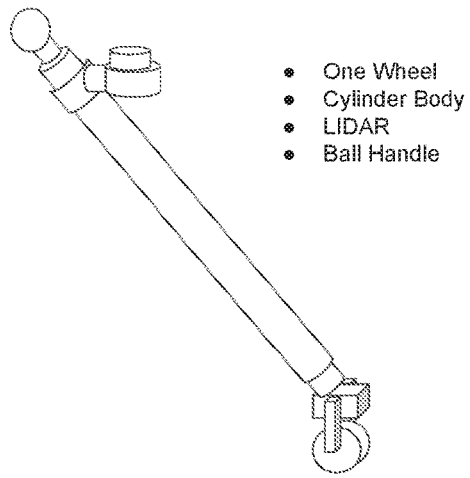
Figure 107:
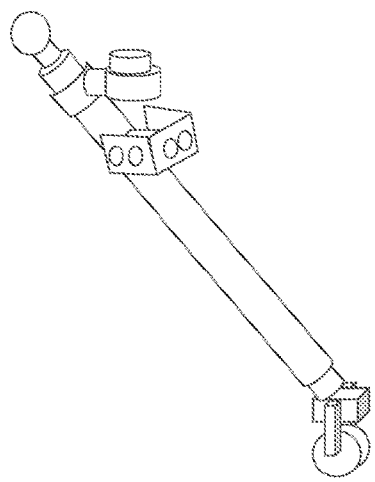
Figure 108:
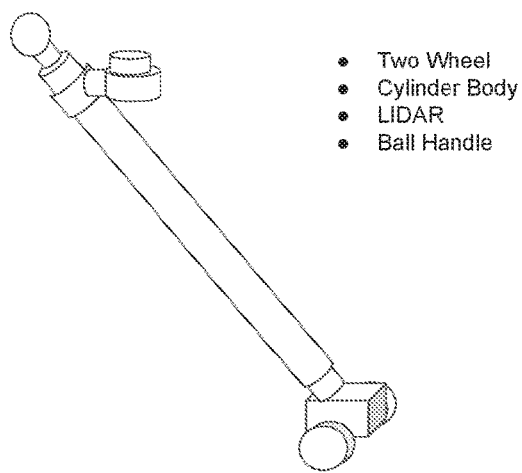
Figure 109:
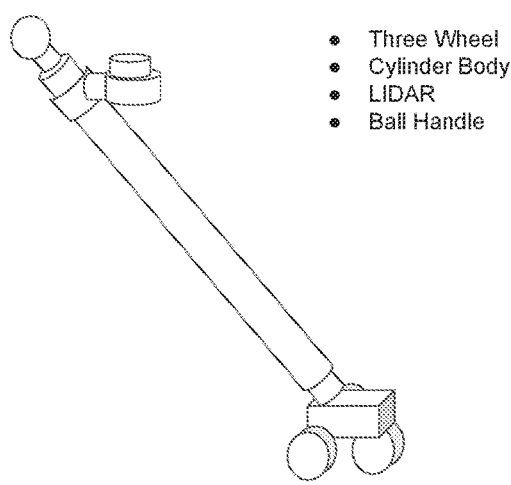
Figure 110:
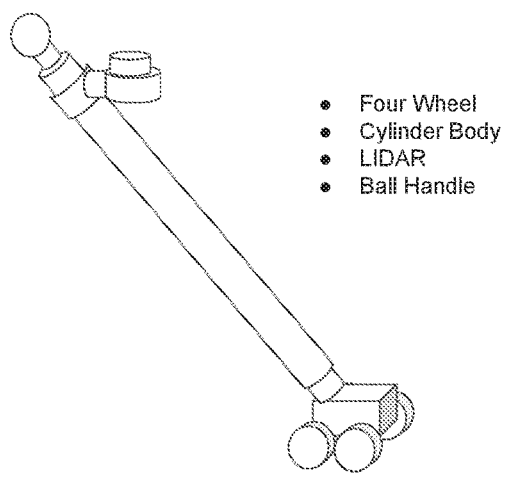
Figure 111:
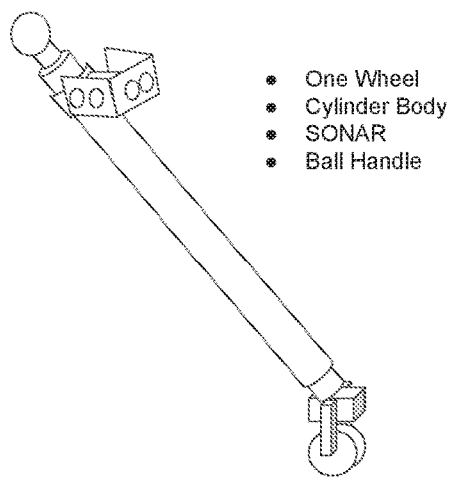
Figure 112:
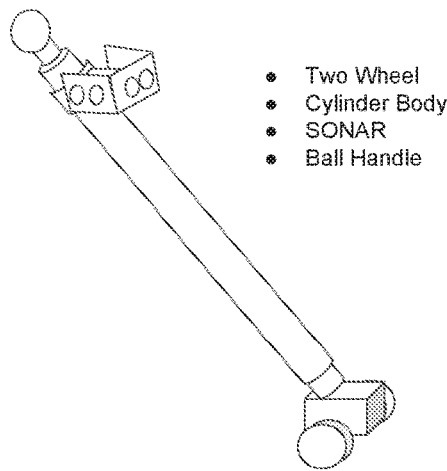
Figure 113:
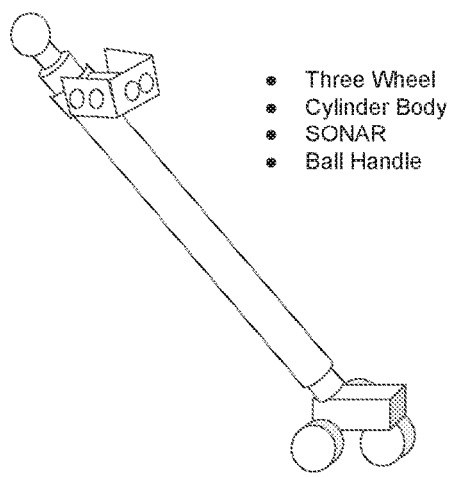
Figure 114:
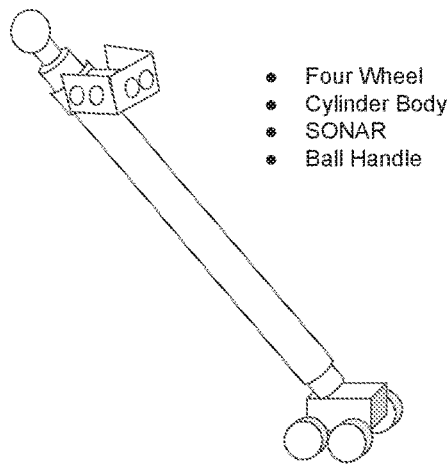
Figure 115:
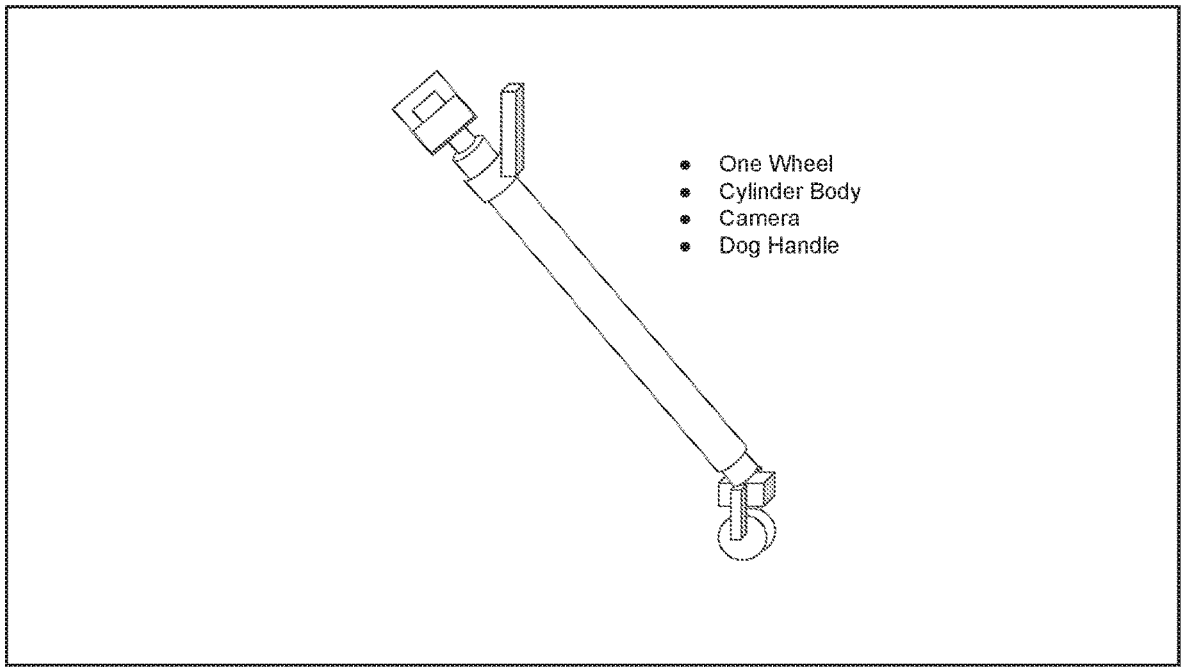
Figure 116:
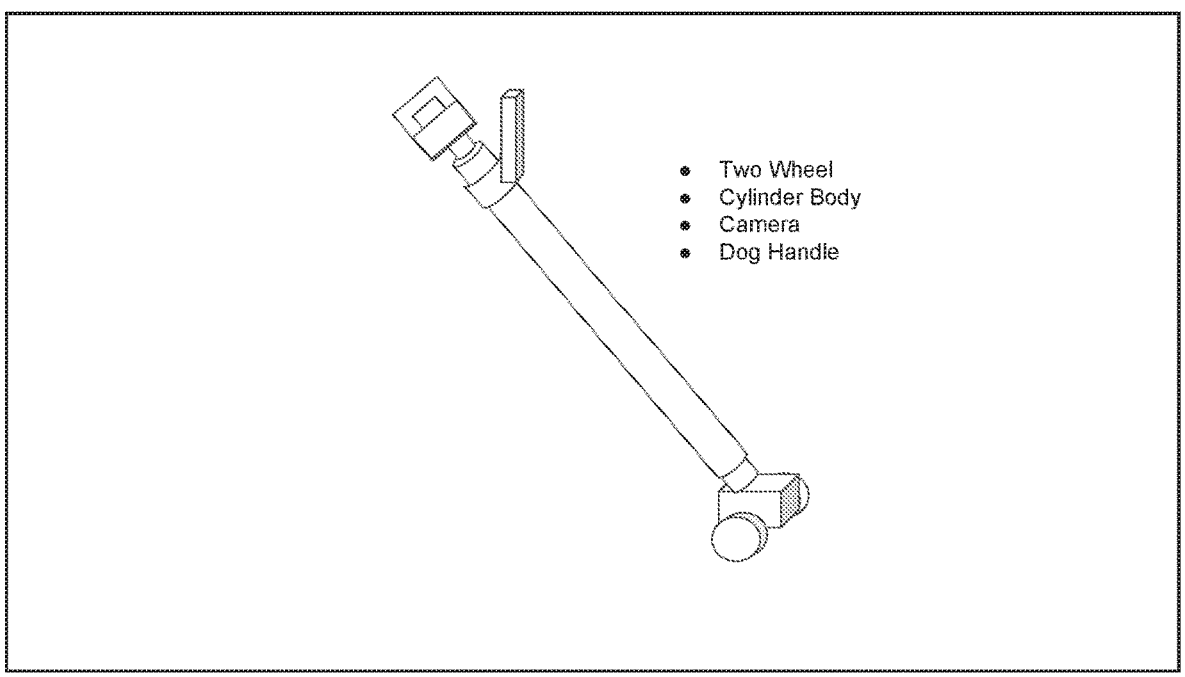
Figure 117:
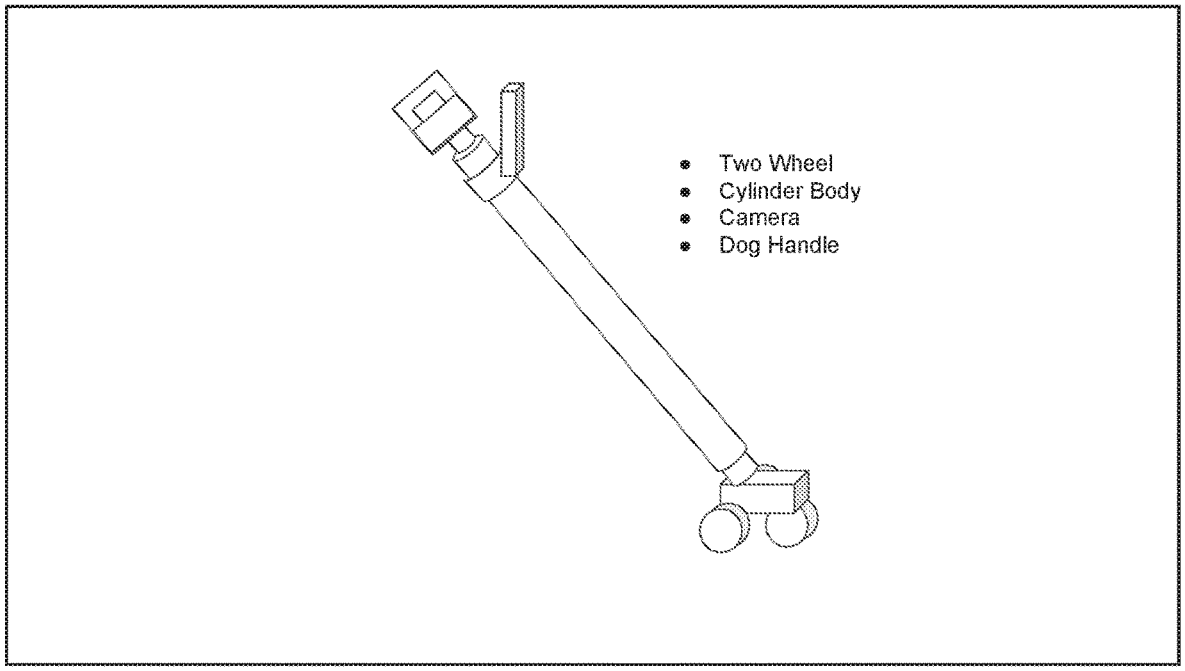
Figure 118:
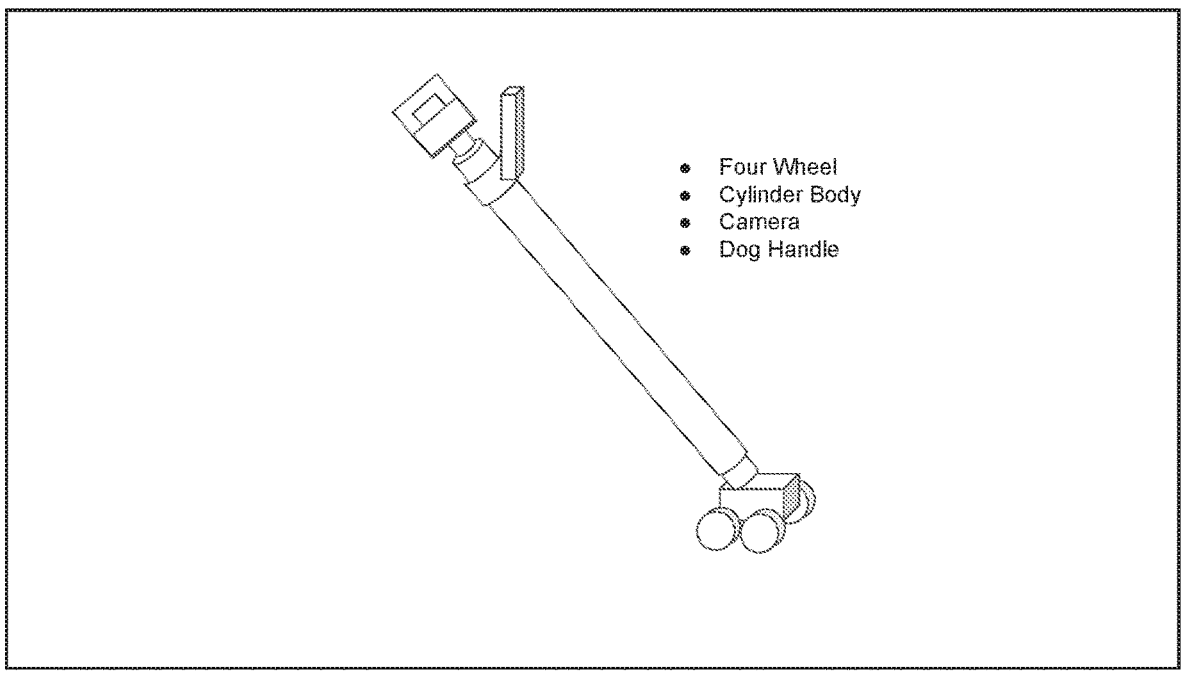
Figure 119:
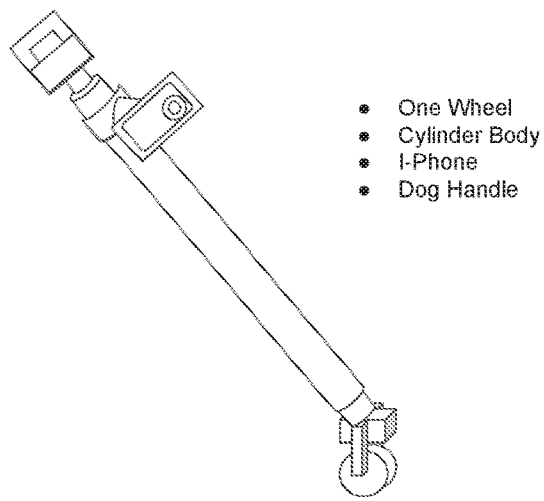
Figure 120:
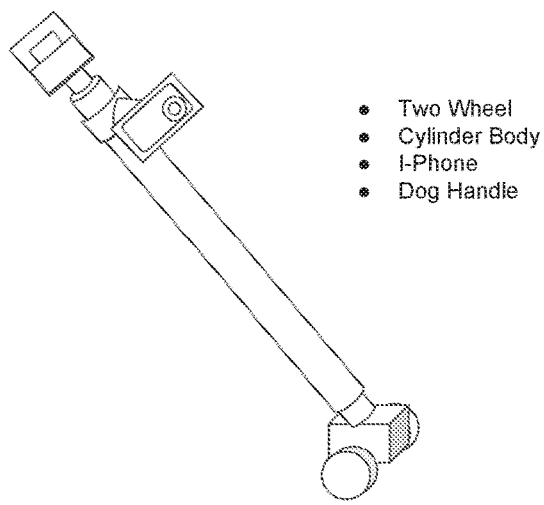
Figure 121:
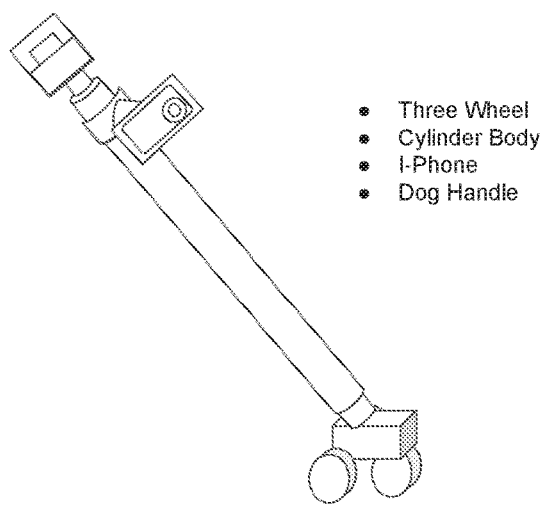
Figure 122:
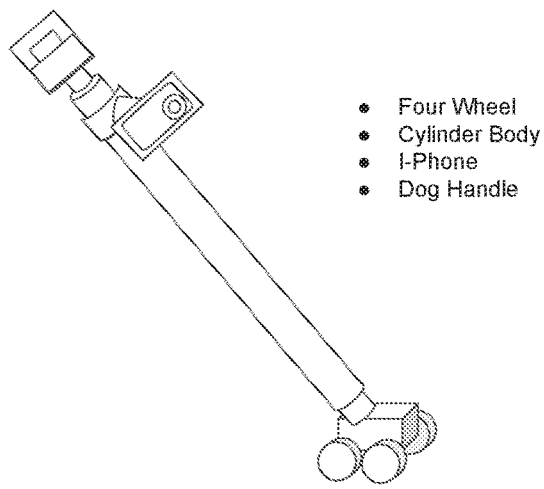
Figure 123:
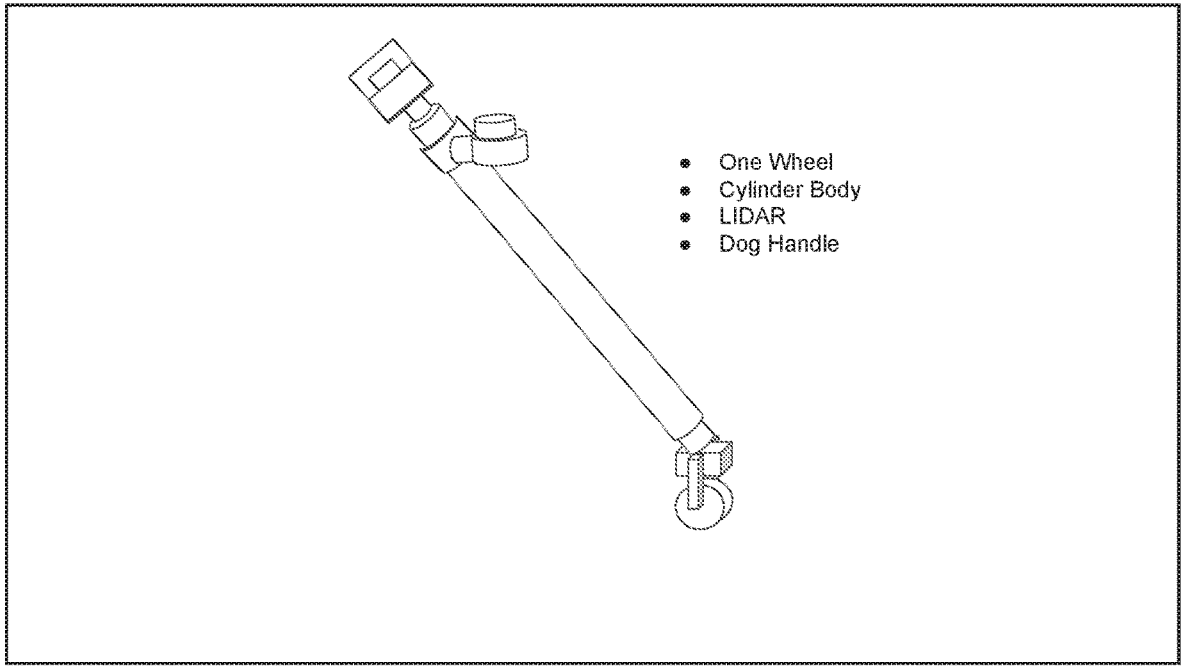
Figure 124:
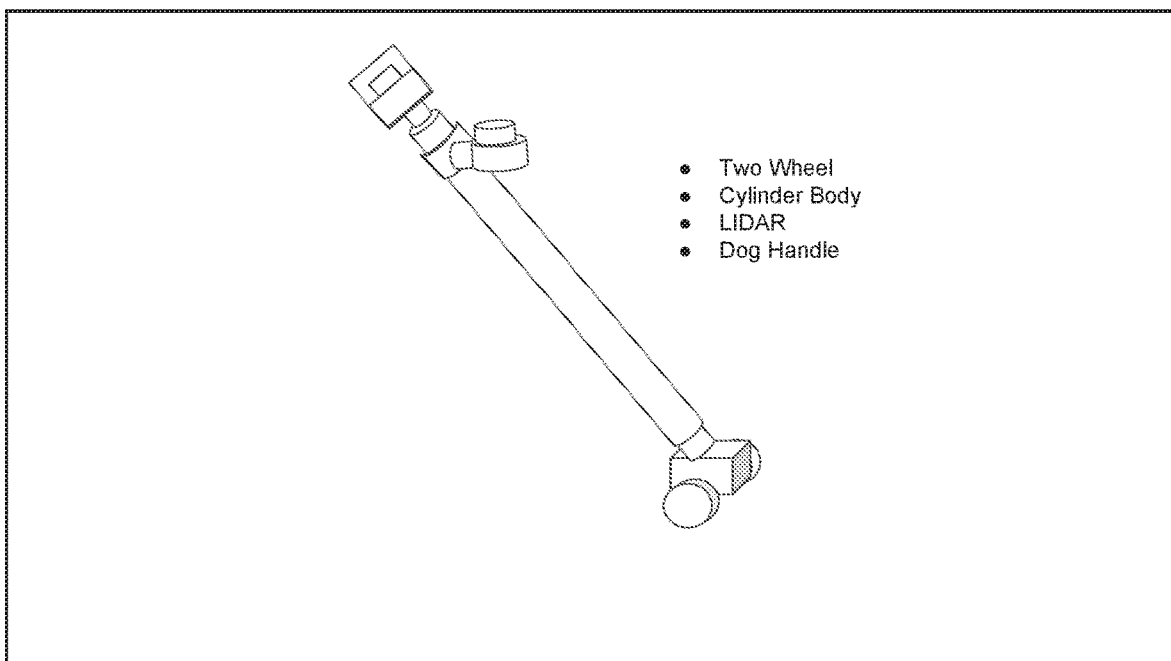
Figure 125:
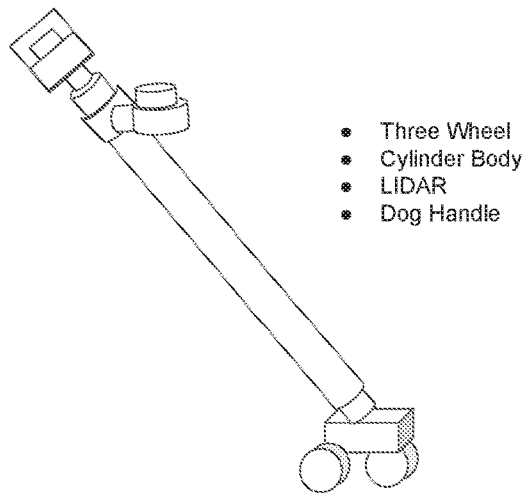
Figure 126:
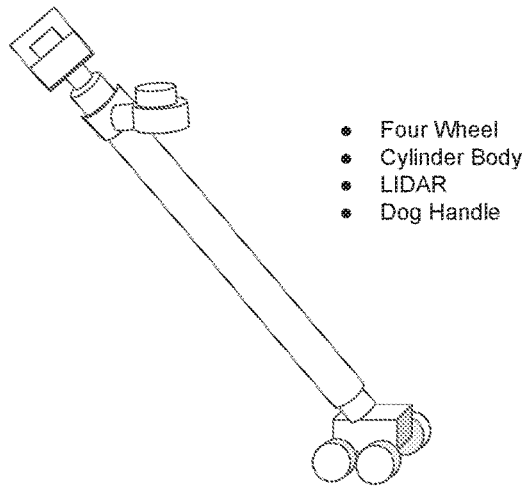
Figure 127:
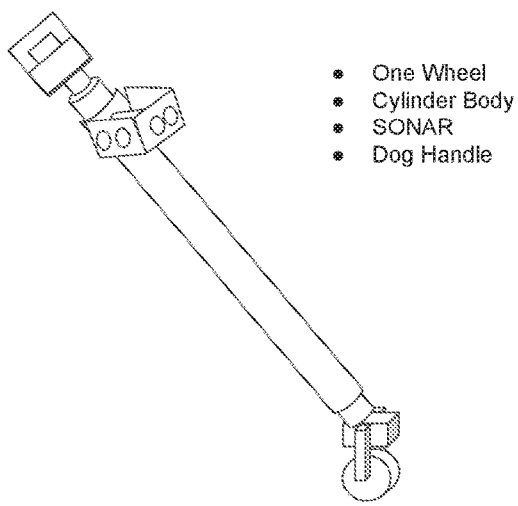
Figure 128:
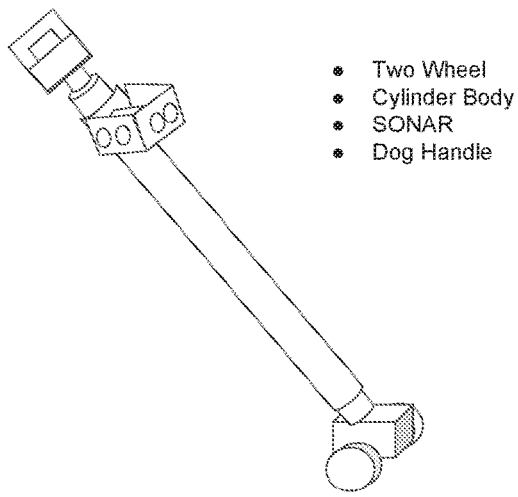
Figure 129:
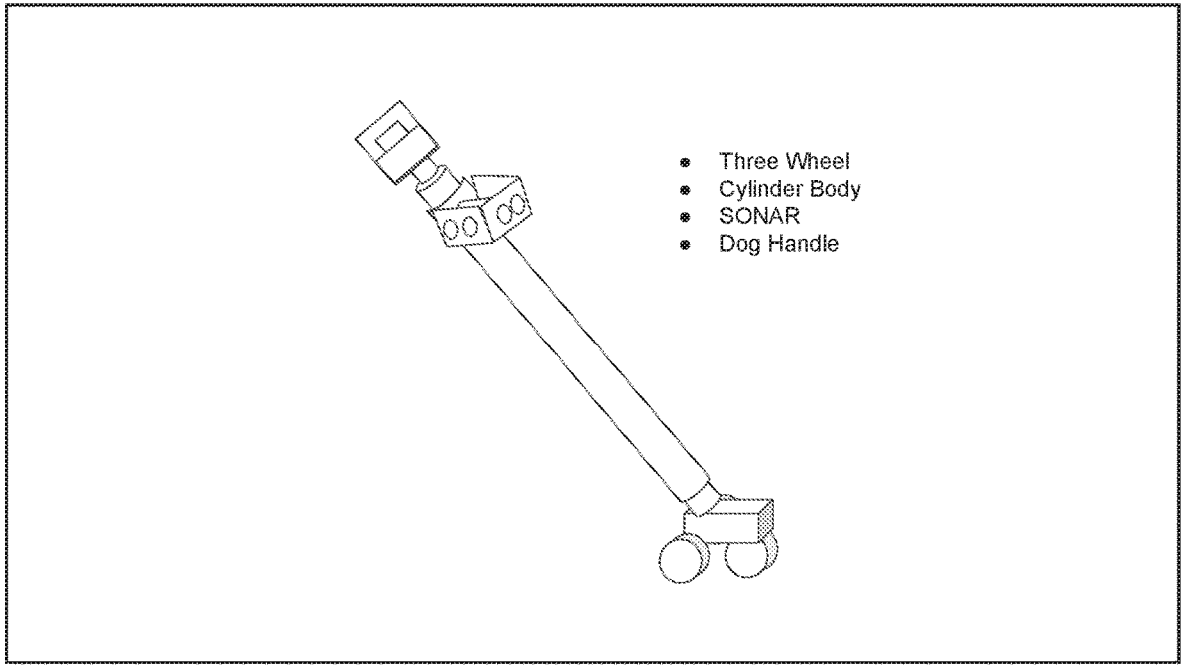
Figure 130:
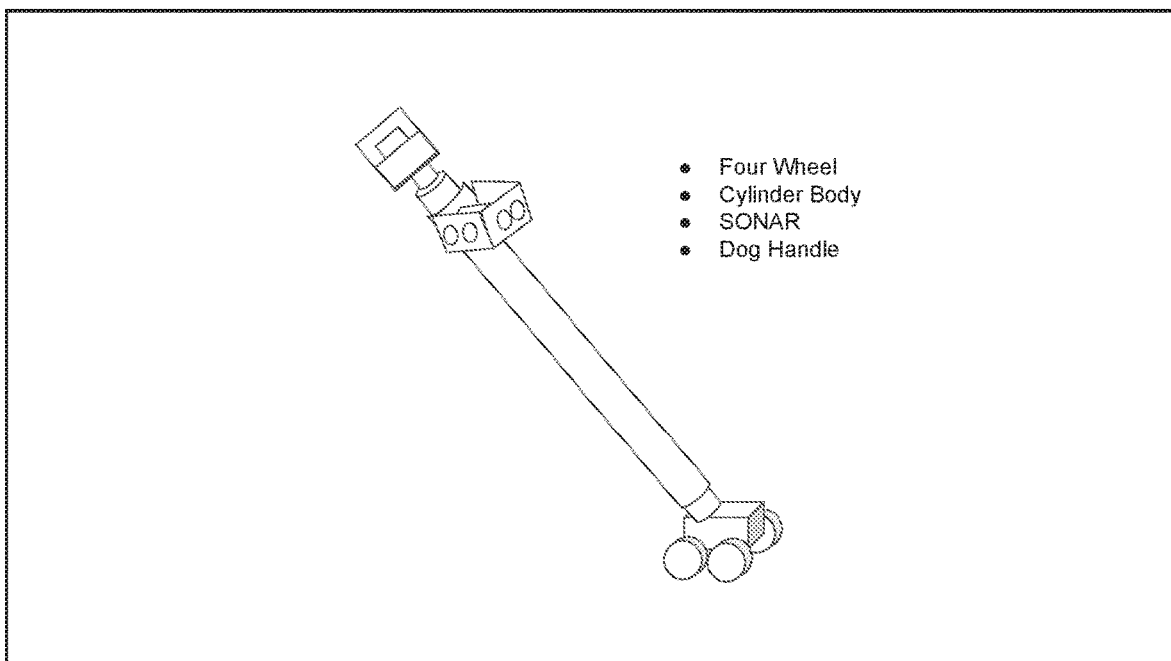

FIGS. 27 and 28 show another manner in which an assistance algorithm 110 can be used to provide commands to controller 56. In one embodiment, the input device includes a camera or other image detector that is adapted and configured to respond to a hand gesture by the user. As shown in FIGS. 27 and 28, the user has extended several fingers in a forward direction, and folded back the other fingers. This could be interpreted by an assistance algorithm 110 to steer and drive the wheels forward. As another example, a clinched fist could indicate that the driving wheels of the device should stop.

It is understood that various embodiments of the present invention can use any of a number of sensors to detect the environment of the assistance device 20. These sensor include GPS receivers, bar code readers, LIDAR, cameras, echo-location devices, infrared sensors, and others. It is understood that any of the algorithms and functions noted herein may use one or more of any of these sensors in order to determine the desired information. For example, a bench could be detected based on a camera image, an ultrasonic image, by LIDAR, or other.

It is further understood that the various embodiments of the present invention contemplate a variety of input devices by which the user can indicate the user's intentions to the controller. Such input devices include a camera to detect a gesture such as a hand gesture by the user, a microphone to detect a spoken command, a keypad to receive an alpha numeric command, selection of an app or other data from a smart phone, and the like.

This Guiding System 10 and assistance algorithms 100 preferably work by using 3D measurements of an object's depth and shape to determine the best direction of travel. Once the formula for the 3D camera is calculated the Guiding Systems proceeds using GPS navigation or RFID mapping to provide the best route to the destination.

RFID Mapping in some embodiments is conducted by using an RFID scanner that is set to locate a RFID chip. There are at least two types of RFID scans. The first scan will be for planted RFID chips through a route. The second one scans for all RFID chips in a location to provide navigation travel points. The RFID scanner will pull in the information and send it to a computer that analyses the information to create a plan of navigation.

The Guiding System is guided using a motorized wheel that moves forward. A second motor will turn the wheel to steer and alter the path of the Guiding System. These two motors are controlled using a microcontroller that communicates with the main computer which collects data from the 3D depth camera, GPS, RIFD and Scanner.

Car detecting technology is used by RFID, 3D camera, and radar detector. With this technology the Guiding System detects and determines when it might be safe to cross the street. The Guiding System will then guide the individual safely across the street.

Object navigation technology provides an individual a command that allows for the Guiding System to navigate safely to a desired location. This can be provided by RFID and 3D depth camera mapping.

Exploratory guiding navigation offers an individual to activate the command to explore the surrounding area base on different topics. This is provided by GPS, RFID, Image Detecting, and 3D depth camera mapping.

The following provides a brief overview of assistance algorithms 100 according to some embodiments of the present invention, along with a discussion of the vector math involved. The following statements are with regards FIGS. 2 to 6.

Algorithm 100 Goals include one or more of the following: safely guide user from point A to point B. (Vector AB); detect and avoid objects in the way. (Object Vectors through Intel Realsense); receives GPS input from smart phone (Point A, Point B); Control Brushless DC motor with encoder (Forward, Speed); Control Brushed DC motor with encoder (Steering, Angle); or Sidewalk/Safe path navigation System 20 Inputs according to some embodiments of the present invention include one or more of the following: A—Current GPS Location—Phone; B—Desired GPS Location—Phone; Drive Motor: Encoder Position/Velocity; Steering Motor: Encoder Position; On/Off Button/Throttle Signal; Angle sensor to keep all items in reference; or Real Time 3D Depth Map (grid from camera with distance at each point)-Intel realsense. System 20 Outputs according to some embodiments of the present invention include one or more of the following: Speed of Drive Motor; Angle of Steering Motor; Battery Life; Safety Beeper; or Destination Confirmation Program Structure:

The cane receives home vector ($\overline{H}$) input with desired H magnitude and direction. (This is the distance and angle the cane will want to move along to reach point B). When an object is present, the camera will receive the object vector ($\overline{S_1}$). (This is the distance and angle of the object with reference to the cane). There will be multiple object vectors ($\overline{S_1}$, $\overline{S_2}$, ... $\overline{S_{100}}$), one for each point (or area) the camera detects. To calculate the new path, the algorithm will create an output vector ($\overline{V}$) equal to the home vector ($\overline{H}$) minus the object vectors ($\overline{S_1}$, $\overline{S_2}$, ... $\overline{S_{100}}$). The resultant vector will direct the cane around the object, yet still in the direction of point B. When there are no objects in the way, the output vector ($\overline{V}$) will be equal to the home vector ($\overline{H}$), and the cane will be guided in a straight path to point B.

Equation:

$$\vec{V} = \vec{H} - \vec{S_1} - \vec{S_2} \ldots \vec{S_{100}}$$

Variables:
  $\vec{V}$: (Output Velocity Vector) Output vector.
  $\vec{H}$: (Input Home Vector) GPS vector AB towards desired location. (distance, angle)
  $\vec{S_1}$: (Input Sensor 1 Object Vector) measures (distance, angle)
  $\vec{S_2}$: (Input Sensor 2 Object Vector) measures (distance, angle)
  $\vec{S_{100}}$: (Input Sensor 100 Vector) measures (distance, angle)

Algorithm 100 Includes:
  1. Object Gap measurement
  2. Objects to detect/identify:
     a. Ground Level
        i. Sidewalk/curbs
        ii. Uneven Ground (sidewalk bumps)
        iii. Stairs
        iv. Potholes
        v. Change in elevation
     b. Mid-Level
        i. Chairs (thin chair legs)
        ii. Benches
        iii. Walls
        iv. Lamp post
        v. Cars
        vi. People
        vii. Trees The descriptions that follows pertains to the various embodiments shown in the figures. Persons of ordinary skill in the art will recognize that the many figures provided with this application depict a wide range of possible configurations for wheels, whether electronically steered, electronically powered, or both. Further, the discussion herein and many of the drawings depict various functions provided by the digital electronic controller, based on a variety of input commands and a variety of sensory data. Persons of ordinary skill in the art will recognize that the various assistance algorithms and the various configurations of assistance devices can be combined, without having to explicitly state each of these combinations.

The Wheel 46, 50

The RSGS includes an end effector locating at the distal end of the system that interacts with the surroundings at the ground level, and including the following components as examples. Touching the floor is a steering wheel 44 driving by in-wheel brushless motor 52. Bolted to the in-wheel brushless motor is the brushless motor mount. The mount also serves as a steering mechanism. Connected to the brushless motor mount are the servo hubs. The servo hubs connect the servomotor 48. The servomotor mount secures the servomotor to the end cap that connects to the protective covering trunk of the RSGS.

Inside the Trunk or shaft 22 of the RSGS 20

The trunk of the cane is comprised of an outside layer that protects the electronics bar, computer 56, brushless motor controller 54, voltage regulator, battery case and battery. Above the end cap is the electronics bar. Connected to the electronics bar is computer 56 which controls the end effector, including all the motors, and gives commands to the end effector for navigation, and further receives data from the end effector such as actuator position (such as a resolver or other sensor on the motor). Wired into computer 56 is the brushless motor controller. Mounted in the trunk or shaft 22 and above the brushless motor is the voltage regulator. Mounted within the trunk and above the voltage regulator is the Battery case. Inside the battery case are the batteries that power the systems of RSGS.

The Handle

The handle 24 is connected to the top of the trunk 22 via a handle mount. The handle acts and behaves similar to a guide dog harness handle. Attached to the front of the handle mount are the cameras 31, sensors 38, and lasers. Mounted to the handle mount are the embedded sensors, which includes as examples an ultrasonic sensor, LIDAR sensor 39, 3D camera, 360-degree camera, image recognition camera, infrared camera, and laser scanner navigation sensor. Mounted within the handle mount is computer #1 it is understood that although separate computers #1 and #2 are shown and described, none of the embodiments of the inventions shown herein are so limited, and also contemplate the use of a single digital electronic controller 56 to perform the various sensing, calculation, and operational algorithms, and also a plurality of distributed digital processors, with each being assigned various subtasks.

Computer #1 includes software and hardware for performing analysis of sensor data, communicating with the internet, accepting data from the command suite, and providing signals to the command suite. Computer #1 is connected to the cameras, sensors, laser scanners and laser navigation and accepts input from all of these devices and also gives commands to Computer #2. The handle contains various user input/output devices in a command suite, which includes as examples a fingerprint reader 36, facial recognition sensor 31, microphone 32, bar, switch, button or keypad 33 that allows the user to provide various inputs (i.e. right, left, back, forward or direct commands) for navigation and a power on and power off function, speaker, a connector to provide a signal to wired or wireless earphones, and a tactile actuator 40 with one or more devices that provides any of a variety of momentary tactile inputs to signal the user through the grip. In some embodiments these tactile inputs are coded sequences (for example, similar to Morse code) that inform the user of the status of the RSGS and the current environment. Examples of tactile actuators include vibration motor actuation, piezoelectric actuation, and electro-active polymer actuation. At the end of the handle is a grip on which the user holds.

Various assistance algorithms 100 that utilize the input devices and sensors shown herein include the following:

On Mode 101

The user turns on the RSGS, by using and activating the power on/power off function.
  The RSGS waits for a command from the user. Once the command is given, the RSGS calculates the command and selects the optimal path.
    If the commend is to go to a specific address:
      The RSGS calculates the optimal path using Global Positioning System (GPS) technology. The GPS provides an estimated time to complete the route, location of all intersections, crossings, and construction that might occur within the route. The GPS may also provide alternative navigation, including bus and train routes.
    If the command is to go to an object (go to the door, go to the curb, go to a car):
      The RSGS uses its embedded sensors to select the optimal route to the object.

Street Crossing Technology Mode 102

The RSGS uses embedded sensors and software to select an optimal path and determine when it is safe to cross the street. In some embodiments, the RSGS provides an audible and/or tactile signal to the user indicating that it is safe to cross. In yet other embodiments, the RSGS also sends and audible/tactile signal indicating that it is no longer safe to cross, or that some danger has been detected.

Optical Navigation Mode 103

By using the embedded sensors, the RSGS calculates an optimal path detecting objects and obstacles and selects the best choice to navigate around the objects. An example of using the optical navigation mode could include: user directed navigation inside a convention center, within a construction zone, within a restaurant, etc.

Car Detecting 104

The RSGS uses embedded sensors to detect car location, direction and speed

Curbs 105

Navigating to a curb
1) RSGS recognizes the curb by the embedded sensors.
2) RSGS moves to the curb with motion guided and influenced by the end effector.
3) RSGS taps the curb by the end effector.
4) The user places the RSGS on top of the curb.
5) RSGS waits for the user to step up on to the curb and give a command to move forward
6) RSGS moves forward by the end effector.

Navigating off a curb
1) RSGS recognizes the curb by the embedded sensors.
2) RSGS moves to the edge of curb and stops 6 inches before the curb with movement guided by the end effector.
3) RSGS uses its embedded sensors to scan for traffic and upon determining that it is safe to cross, moves forward 3 inches with the end effector toward the edge of the curb.
4) RSGS senses the user moving forward and the end effector moves down the curb
   a. If the user does not follow the RSGS, it moves back 3 inches until the user gives a suitable command, such as a voice command, wave forward command or button forward command. The end effector of the RSGS then moves down the curb
5) RSGS moves forward to give the user enough space to step off the curb and stops
6) Upon sensing the user stepping off the curb, the RSGS by way of the end effector moves forward Navigating up a curb slope (curb ramp)
1) RSGS moves to the curb slope
2) RSGS will slow down to almost a stop upon reaching the curb slope to notify the user that a change in incline is about to come. In addition, some embodiments include a notification to the user by way of the command suite.
3) RSGS slows down and then proceeds up the curb slope Navigating down a curb slope
1) RSGS moves forward to the top of the curb slope slowing down to indicate a change in slope.
2) RSGS continues down the curb slope stopping a short distance (such as by example 6 inches) from the bottom of the slope
3) RSGS uses its embedded sensors to scan for traffic and upon determining that it is safe to cross, moves forward a short distance (such as by example 3 inches).
4) RSGS senses the user moving forward and moves forward.
   a. If the user does not follow the RSGS, the end effector moves back a short distance (such as by example 3 inches) until the user gives an input from the command suite, such as a voice command, wave forward command or button forward command. The RSGS then moves forward.

Going down a high curb
1) RSGS recognizes the curb with the embedded sensors.
2) RSGS moves to the edge of the curb and stops a short distance (such as by example 6) inches before the curb
3) RSGS uses embedded sensors to determine the curb is too high to robotically guide the user off the curb and vibrates the handle telling the user of the danger.
4) RSGS uses embedded sensors to scan for traffic and upon determining that it is safe to cross, moves forward a short distance (such as by example 3 inches) toward the edge of the curb and vibrates the handle telling the user the RSGS should be lifted over the high curb.
5) Upon being relocated to street level, the RSGS moves forward to give the user enough space to step off the high curb and stops.
6) Upon sensing the user stepping off of the curb, the RSGS moves forward.

Stairs 106

Going down stairs
1) RSGS stops at the top of the stairs and gives a notification through the command suite that there are stairs, as examples via audible signal, vibration, braille and/or pop-up indicator.
2) RSGS waits until the user puts his/her foot on the edge of the step and user gives a voice command, wave forward command or button forward command.
3) RSGS moves forward down the steps
4) RSGS rolls down the steps at the speed of the user
5) Once at the bottom landing of the steps the end effector of the RSGS moves forward and stops, notifying the user via audible signal, vibration, braille and/or pop-up indicator or otherwise by the command suite that they have arrived at the bottom step
6) User gives an input to the command suite such as by voice command, wave forward command or button forward command. The RSGS then moves forward.

Going up stairs
1) RSGS will navigate to the bottom step
2) RSGS will hit the bottom step, tapping the step repeatedly, which notifies the user of the step.
3) The user will lift the RSGS and walk up the steps
4) User will navigate up the steps, keeping the RSGS pointed toward the stairs.
5) RSGS vibrates once it recognizes the top step landing.
6) User will set the RSGS down on the top step landing
7) RSGS waits for the input from the command suite, such as by voice command, wave forward command or button forward command. The RSGS then moves forward.

Object on stairs
1) Going up the stairs
   a. User navigates the stairs, the end effector keeping the RSGS pointed toward the stairs.

b. The embedded sensors of the RSGS recognize an object or person on the stairs.
   i. RSGS vibrates indicating an object via audible signal, vibration, braille and/or pop-up indicator.
c. User set downs the RSGS either on the step above where he/her is standing.
d. RSGS finds the best direction to move around the object and notify the user by turning left or right. The user moves in the direction provided by the RSGS.
   i. If there are no navigable options the RSGS notifies the user via audible signal, vibration, braille and/or pop-up indicator to turn around and return the way the user came.
e. RSGS will indicate to the user that it is safe to continue navigating up the stairs by vibrating or by other signal from the command suite.
f. RSGS goes back into stair mode once the user has given a command such as the voice command, wave forward command or button forward command.
g. User picks up the RSGS and continues up the stairs.
2) Going down the stairs:
a. similar algorithm to that used to go upstairs.

Stationary Object Navigation 107
Navigating one object with enough space around object
1) RSGS detects object with the embedded sensors
2) RSGS calculates the object distance
3) RSGS then calculates the space around the object
4) Once RSGS has the object distance and space around the object it prepares for object avoidance
5) the end effector of the RSGS starts turning itself to guide the person to move left or right of the object
6) RSGS guides the person around the object
7) the end effector of the RSGS then straighten outs and keep moving Navigating of 2 objects close together
1) RSGS detects 2 objects
2) RSGS calculates the objects distances
3) RSGS then calculates the object spacing around the two objects
4) RSGS calculates can both objects to see if RSGS can avoid both of the objects by going around them at the same time
   a. If the calculation shows that both objects can't be cleared at the same time then it treats each object as one object and prepares to navigate around the objects one at a time.
      i. RSGS guides the person around object one
      ii. RSGS guides the person around object two
   b. If the calculation shows that both object are making the path too small to pass by,
      i. Then the RSGS moves forward and slow down to indicate the person that the user is coming up to a tight space. Further indication may be provided by the command suite.
      ii. The person uses his/her hand to locate one of the objects to know how tight the space is navigate through
      iii. Person follows the RSGS slowly to pass forward of the two objects
      iv. RSGS picks up speed once passed the objects
   c. If the two objects are blocking all paths to get around it then the RSGS stops and makes a request for data from GPS, RIFD, Pinning Technology, Crowd Sourcing Mapping software, or similar software to look for a new path to point B.
      i. RSGS turns left then right to see if other options are available
      ii. With the GPS, RFID, Pinning Technology, and Crowd Sourcing Software the control software RSGS determines the best option around these two objects
      iii. RSGS indicates to the person by vibration or other aspect of the command suite that there is another option
      iv. With the user's voice, the user's wave forward movement, or Navigation of an object path
1) The RSGS detects with the path is block of travel because of an object
2) With the GPS, RFID, Pinning Technology, and Crowd Sourcing Software
3) The software calculates a new route
4) With a vibration to RSGS guides the person in the direction around the object Crossing Streets 108
Crossing the street
1) First the RSGS finds the curb and the command software determines the curb type by analyzing data from the embedded sensors.
   a. RSGS follows the steps to navigate the curb base on the curb type
   b. Once the RSGS has signal to the person about the curb the RSGS will start the car detection mode
2) RSGS goes into Car Detection Mode
   a. Using the following detecting, as examples:
      i. Cell Phone detecting
         1. Detect the speed at which a cell phone is traveling, by scanning the for the cell phone signals of the cell phone
         2. This counts how many cell phones are in the area
            a. If there is more than one cell phone in a car is okay because we are wanting to know the speed of the cell phone is going
            b. If the car has more than one cell phone they all will be going the same speed making a calculation for one car
      ii. FM Radio scanning
         1. By sending out an FM signal that detects the car FM Radio antenna
         2. The FM scanning algorithm counts the number of antennas in a particular area, such as a 100-yard radius
      iii. GPS Scanner
         1. GPS Scanner looks for any cars following the GPS signals
            a. This will allow the RSGS to know if a car is going to be turning
      iv. GPS Navigation
         1. This shows all the cars in an area
         2. This is able to calculate the speed of the cars
         3. This is able to see how many lanes there are
         4. The GPS is able to tell if the crossing is a light crossing, stop sign, or a no car stopping crossing
      v. Other car signals
      vi. Light single detection
         1. The RSGS scans for the light signal
            a. Once scanned the information of the scan when it is safe to cross is provided b. The number of lanes is provided
c. The information of a left turning car can be made when crossing signal is on
   vii. Image Recognition. The software uses the embedded sensors to detect:
      1. Stop signs
      2. Street lights
      3. Cross walk painted lines
      4. Stop painted lines
      5. Truncated domes
3) Gathering the information from the embedded sensors of from any of the sources named above, the RSGS calculates
   a. Speed cars
   b. Distance cars
   c. Distance needed of travel across the street
   d. Total of cars
   e. How many lanes
   f. What type of crossing
   g. How far the crossing is
4) The RSGS vibrates or makes other indication through the command suite to indicate when ready to move forward
5) The person gives the forward command voice, wave forward movement, or button command or other command through the command suite
6) The RSGS will be still be in cross street mode scanning for any new changes while crossing the street
7) The RSGS moves and indicates when it reaches the curb
8) Once the curb is reached the RSGS goes into navigation mode and works on navigating the curb Detect Hand Signals 110

The Smart Guider uses handler's hand signals as a method of communication and direction. As an example, when the handler feels it is safe to move forward, the handler gives a "forward" hand signal to the Smart Guider to move forward. The "forward" hand signal is similar to the signal used when handling and directing a Guide Dog. As an example, when you want the Guide Dog to move forward, the handler waves his hand in a forward direction, telling the Guide Dog to move forward.

The Smart Guider uses a camera to detect the hand signals. For example, the Smart Guider could use the handler's smart phone camera using both the front and back camera mode, with the phone mounted on the Smart Guider. This is not limited to a phone camera, the Smart Guider could also use a 3D camera, a directional camera, a basic camera, LIDAR, ultrasonic, or anything that can recognize a hand gesture.

The Smart Guider uses image recognition software that is already on the market to match the different hand commands given by the handler. As an example, if a handler wanted to go a curb, but the handler did not know the curb's location, the Smart Guider would recognize a handler's command if the handler put his palm face down, keeping all their fingers together and moved the hand in a forward motion. This hand gesture would be recognized by the Smart Guider that the handler wants to find the curb. The camera would recognize this hand gesture using the preprogramed image recognition signs to find a curb. Similarly, if the handler wanted to go to the right, the handler could use their index finger, pointing to the right to command the Smart Guider to go right.

Ball/Oval Handle 24

The ball handle is designed to provide a smaller grip for a blind person to hold onto. This type of handle provides the ability to fit a wide range of hands without having to change the design.

The ball handle is designed to be no bigger than the size of a baseball or tennis ball. The handler holds the ball handle as if they were holding a syringe. The ball sits in the palm of the handler's hand. The tubing fits between his two fingers (handler's choice of fingers). At the top of the ball handle is a throttle that controls speed and drives the wheel forward. The handler uses his palm, pushing forward in the throttle to move the wheel of the Smart Guider.

The oval handle is designed to help with holding onto the cane. This allows for a wide range of hands and is more ergonomically designed than the ball handle. The oval handle uses the same palm/finger placement as the ball handle.

Both the Ball handle and the Oval handle are hollow inside, providing the best haptic feedback from the Smart Guider wheel and hollow body. Within the handle, there can be a computer, a cell phone, circuit board, pocket to hold things, batteries, buttons, an RFID scanner, beacon scanner, camera, LIDAR, ultrasonic, radar, and/or GPS device. The ball/oval grip can be a rubber grip, plastic grip, carbon fiber grip, fiberglass grip, wood grip, metal grip, cork grip, smart fabric grip, smart touch rubber, touch screen glass grip, computer communication grip, hand sensor temperature measurement grip, camera design grip, LIDAR scanning grip, ultrasonic grip, activation button grip, and/or fabric touch technology grip. The body of the ball/oval handle can be made with metal, wood, plastic, fiberglass, cork, graphite, carbon fiber, epoxies, silicon, resin, and/or stone.

Smart Guider Body 22—Cylinder/Oval/Square/Rectangular

The Smart Guider body or shaft 22 can be cylindrical, oval, square or rectangular in shape, however a Smart Guider body must be hollow. The hollow body of the Smart Guider provides the best haptic information to the handler, which in turn is the most optimal communication. Each handler may have a preference, however the key is for the handler to select the body shape of the Smart Guider that carries clearest information about his environment. Optimally, the Smart Guider's primary communication would be through haptic feedback as opposed to the Smart Guider's vibration motors, or speakers.

A cylinder body is the most commonly used shape in a blind cane, however different shapes of blind canes provide different haptic feedback and information. For example, if a blind person has trained themselves to use square hollow body blind cane, that person knows there will be more haptic feedback on the right or left, front or back of the hollow body. Again, body shape of the can will depend on the blind person's preference.

Dog Handle 25

The dog handle is normally made with metal or plastic. Some dog handles have a leather wrap around the handle. The guide dog handle connects to the front part of the guide dog harness body. The dog handle clips into both side of the harness straps. When the dog put pressure into the harness it provides tension to the handle providing feedback to the hander. Keeping tension between the dog handle and the dog takes practice. If the dog turns left, the dog will put more tension onto the left side of the hardness, and less tension onto the right side of the harness indicating to the handler that the dog is moving left. This is same when the dog guides their handler to a curb. The dog will stop in front of the curb put their front paws on the curb. By the tension of the hardness the handler has a good idea of how high the curb is.

GPS, Navigation Beacons, RFID, Human Following 109

The Smart Guider is able to navigate indoors and outdoors. We do this by using GPS navigation, Beacon sensors, and RFID sensors. When using GPS, the Smart Guider navigates from point A to point B using consumer software commonly found on a smart phone as an app. Once the handler puts their destination address into the GPS app, the Smart Guider follows the path of travel.

Sometimes the GPS directions are not accurate, therefore the Smart Guider uses navigation beacons to pinpoint its exact location. By using the beacons, the Smart Guider provides more details about the route and the environment to the handler, allowing the handler to customize the route of travel. The great thing about navigation beacons is they work well both indoors and outdoors. Indoors, the Smart Guider uses navigation beacons allow a handler to navigate within a building without any assistance.

The Smart Guider uses an RFID scanner as a finding tool for items within a 100 feet radius. Since RFID technology does not pinpoint an exact location of an item, the Smart Guider can't guide a person to the RFID chip by itself, however, the RFID technology does inform the Smart Guider that the item might be within 100 feet. As the Smart Guider gets closer to the item, it shortens the RFID scan, insuring the handler is moving in the right direction. The Smart Guider must use the GPS navigation and beacons together with the RFID technology to create a path of travel that is safe and trackable, finding the item or destination.

When placed in the human following mode, the Smart Guider will follow (see human following mode explanation)

General Algorithm 101

The handler turns the Smart Guider on (powering it up) by using a switch, button, phone, voice, heat, thermal energy, or recognition. The handler needs to identify a travel destination for the Smart Guider. Using the travel destination, the Smart Guider creates a path for travel using GPS, navigation beacons, RFID, a memorized route, or human following. Once a path of travel is selected, the Smart Guider will wait for the command from the handler to move forward. This command can be provided by voice, hand signs, braille buttons, or phone app. Once the Forward command is provided, the Smart Guider receives input from its various sensors, using a formula of positive and negatives to identify an object and its range. Taking this data, the Smart Guider uses a pre-determined decision matrix, incorporating a series of IF/THEN statements and calculations to make decisions, deciding the best way to avoid the object, while staying on track to the destination location. However, if the object is not avoidable, the Smart Guider will recalculate and choose an alternative path of travel. Once the Smart Guider arrives at the destination, the handler must provide basic turning and forward commands within destination, or chose another navigation choice, such as the Human Following Mode.

Various aspects of different embodiments of the present invention are expressed in paragraphs X1, X2, and X3 as follows:

X1. One aspect of the present invention pertains to a device for assisting a person walking. The device preferably includes a shaft, a handle mounted to the shaft, and an input device providing a first electronic command signal. The device preferably includes a first wheel pivotally coupled by a servomotor to the shaft. An electronic controller is operably connected to the input device and the servomotor to pivot the wheel in a desired direction.

X2. Another aspect of the present invention pertains to a method for assisting a person walking. The method preferably includes a shaft, an electronically steerable wheel, a sensor providing a first electronic signal corresponding to an object in the environment, and a digital electronic controller receiving the first electronic signal and operably connected to the electronically steerable wheel. The method preferably includes sensing an object in the environment, determining the position of the object, and steering the wheel by the electronic controller toward in a direction relative to the object.

X3. Still further aspects of the present invention pertain to methods for assisting a person walking. The method preferably includes a cane or walking stick having an electronically steerable wheel in contact with the ground. An electronic controller steers the wheel in a direction based on various inputs from the user, and further based on data acquired by various sensors.

It is also understood that any of the aforementioned X paragraphs include listings of individual features that can be combined with individual features of other X paragraphs. Yet other embodiments pertain to any of the previous statements X1, X2, or X3, which are combined with one or more of the following other aspects:

wherein the input device prepares commands to the electronic controller based on data from an imaging device that detects gestures made by the user; or a microphone detecting sounds made by the user; or a key pad that provides an alphanumeric command from the user; an RFID sensor that senses data from an RFID tag presented by the user; GPS data enabled by the user; a touch pad sensitive to finger motions made by the user; a fingerprint reader, by which each of the separate fingerprints of the user can be interpreted as command signals of any type; a barcode reader that reads a barcode prepared by the user that indicates a destination or pathway.

wherein the sensor of the assistance device is a wireless transmitter/receiver; a receiver for GPS data; a barcode reader adapted and configured to read a barcode in the surroundings of the user; a microphone to hear acoustic waves in the vicinity of the user (such as a sound made by a street crossing beacon); an echo-locating transmitter and receiver; a light detection and ranging sensor (LIDAR); an infrared sensor, including an imaging infrared sensor; a radar detector for detecting radar signals from vehicles such as automobiles.

wherein the assistance algorithms determining an initial direction or pathway; modify the direction or pathway based on the detection of objects; detect objects based on imaging (including infrared, visual, radar, and pressure wave); automobile detection; street and curb detection; stair and ramp detection; electronic navigation from one way point to another way point, wherein the way points can be provided by one or more of a GPS signal, RFID signal, or an acoustic, radar, or visual beacon; facial recognition; recognition of hand gestures; and recognition of voices and dialogue.

wherein said first wheel is a motorized wheel operably connected to said electronic controller.

which further comprises second and third motorized wheels attached to said shaft and operably connected to said electronic motor, wherein said electronic controller commands said second and third motorized wheels to rotate in response to said first electronic signal.

wherein said second motorized wheel and said third motorized wheel are independently rotatable by said electronic controller, and in response to said first electronic signal said electronic controller commands said second and third wheels at rotate different rotational speeds.

which further comprises second and third motorized wheels attached to said servomotor and adapted and configured to swivel relative to the shaft, wherein said electronic controller commands said second and third motorized wheels to swivel in response to said first electronic signal.

which further comprises a pivoting platform, said first wheel being attached to said platform, said platform being attached to said servomotor, wherein a command from said electronic controller pivots the platform with the attached said first wheel relative to said shaft.

which further comprises second and third motorized wheels attached to said pivoting platform and operably connected to said electronic motor, wherein said second and third motorized wheels pivot with said platform and said first wheel in response to said first electronic signal.

wherein said input device is a camera.

wherein the first electronic signal corresponds to a hand gesture made by the person.

which further comprises a measurement target attached to the shaft and said electronic controller uses an image of said target taken by said camera to calibrate a distance in a different image.

wherein said input device is a microphone and the first electronic signal corresponds to a spoken command from the person.

wherein said input device is a keypad having a plurality of actuatable alphanumeric switches and the first electronic signal corresponds to a predetermined sequence of switch actuations.

wherein said input device is a sensor responsive adapted and configured for communication with an RFID device, and the first electronic signal corresponds to the detection of an RFID device.

which further comprises a tactile actuator attached to said handle and adapted and configured to provide a tactile input to the hand of the user as commanded by said electronic controller.

which further comprises a suspension component that isolates displacement of said first wheel from said shaft.

wherein the suspension component is a spring or a hydraulic damper.

which further comprises a dog handle attached to said shaft.

wherein said shaft includes an elastic and flexible section.

wherein a motorized wheel is coupled to the shaft and which further comprises driving the motor by the electronic controller.

which further comprises detecting a command by the user and said driving is in response to the command.

wherein said detecting is a spoken command from the user.

wherein said detecting is a hand gesture by the user.

wherein the electronically steerable wheel is motorized and the electronic controller is operably connected to the motor, and which further comprises rotating the wheel to move in the direction.

wherein the object is a closed door and said rotating is to move the wheel in a direction away from the closed door.

wherein the object is a closed door and which further comprises preventing the wheel from rotating.

wherein the shaft includes a second motorized wheel at the other end and the electronic controller is operably connected to the motor, and which further comprises driving the motor of the second motorized wheel by the electronic controller.

wherein the object is a closed door and said driving is in a direction away from the closed door.

wherein the object is a closed door and which further comprises preventing the second motorized wheel from rotating.

wherein the electronically steerable wheel is pivotally coupled to the shaft by a platform, the second motorized wheel is attached to the platform, and said steering is by pivoting the platform wherein said sensor comprises a pressure wave transmitter and a pressure wave receiver, and said sensing is by echo-locating the object.

wherein the shaft includes an input device providing a second electronic signal to the electronic controller, and which further comprises establishing an objective by the electronic controller with the second electronic signal, and said steering is to accomplish the objective.

wherein the input device is a GPS device and the objective is to direct the person to a position.

wherein the input device is a keypad and the second electronic signal is an alphanumeric command entered on the keypad.

wherein the input device is a touch pad and the second electronic signal corresponds to a tactile command entered on the touch pad.

wherein the sensor is a camera providing an electronic signal corresponding to an image of the object.

wherein the object is a bar code.

wherein the object is another person and the electronic controller performs a facial recognition algorithm on the image.

wherein the object includes text and the electronic controller interprets the text.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A system for assisting a person walking, comprising:
a shaft having a distal end and a proximal end, a handle adapted and configured for gripping by the hand of the person and mounted to the proximal end of said shaft, said handle including a camera providing a first electronic signal;
a first wheel;
a servomotor supported by the distal end of said shaft and supporting said first wheel and adapted and configured to swivel said first wheel relative to the shaft;
an electronic controller operable connected to said camera and said servomotor;
a measurement target attached to the shaft, said electronic controller uses an image of said target taken by said camera to calibrate a distance in a different image; and said electronic controller receives the first electronic signal and provides a corresponding command to said servomotor to swivel said first wheel.

2. The system of claim 1 wherein said first wheel is a motorized wheel operably connected to said electronic controller.

3. The system of claim 1 which further comprises second and third motorized wheels attached to said shaft and operably connected to said electronic motor, wherein said electronic controller commands said second and third motorized wheels to rotate in response to said first electronic signal.

4. The system of claim 3 wherein said second motorized wheel and said third motorized wheel are independently rotatable by said electronic controller, and in response to said first electronic signal said electronic controller commands said second and third wheels at rotate different rotational speeds.

5. The system of claim 1 which further comprises second and third motorized wheels attached to said servomotor and adapted and configured to swivel relative to the shaft, wherein said electronic controller commands said second and third motorized wheels to swivel in response to said first electronic signal.

6. The system of claim 1 which further comprises a pivoting
platform, said first wheel being attached to said platform, said platform being attached to said
servomotor, wherein a command from said electronic controller pivots the platform with the attached said first wheel relative to said shaft.

7. The system of claim 6 which further comprises second and third motorized wheels attached to said pivoting platform and operably connected to said electronic motor, wherein said second and third motorized wheels pivot with said platform and said first wheel in response to said first electronic signal.

8. The device of claim 1 wherein the first electronic signal corresponds to a hand gesture made by the person.

9. The system of claim 1 further comprising a microphone.

10. The system of claim 1 further comprising a keypad having a plurality of actuatable alphanumeric switches.

11. The system of claim 1 further comprising a sensor responsive adapted and configured for communication with an RFID device.

12. The system of claim 1 which further comprises a tactile actuator attached to said handle and adapted and configured to provide a tactile input to the hand of the user as commanded by said electronic controller.

13. The system of claim 1 which further comprises a suspension component that isolates displacement of said first wheel from said shaft.

14. The system of claim 13 wherein the suspension component is a spring.

15. The system of claim 13 wherein the suspension component is a hydraulic damper.

16. The system of claim 1 which further comprises a dog handle attached to said shaft.

17. The system of claim 1 wherein said shaft includes an elastic and flexible section.

* * * * *